United States Patent
Papasakellariou

(10) Patent No.: US 10,492,184 B2
(45) Date of Patent: Nov. 26, 2019

(54) MULTIPLEXING CONTROL INFORMATION IN A PHYSICAL UPLINK DATA CHANNEL

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 15/820,051

(22) Filed: Nov. 21, 2017

(65) Prior Publication Data

US 2018/0167931 A1 Jun. 14, 2018

Related U.S. Application Data

(60) Provisional application No. 62/432,215, filed on Dec. 9, 2016, provisional application No. 62/436,705, filed
(Continued)

(51) Int. Cl.
*H04W 72/04* (2009.01)
*H04L 5/00* (2006.01)
(Continued)

(52) U.S. Cl.
CPC ......... *H04W 72/0413* (2013.01); *H04L 1/00* (2013.01); *H04L 1/1671* (2013.01); *H04L 1/18* (2013.01); *H04L 1/1812* (2013.01); *H04L 1/1861* (2013.01); *H04L 1/1887* (2013.01); *H04L 5/0055* (2013.01); *H04L 5/0091* (2013.01);
(Continued)

(58) Field of Classification Search
CPC ..................................................................
H04W 72/0413; H04W 88/02; H04W 88/08; H04L 5/0055; H04L 1/00; H04L 1/18; H04L 1/1671; H04L 1/1861; H04L 1/1887; H04L 1/1822; H04L 1/1864; H04L 5/0091; H04L 5/001; H04L 5/0023; H04L 5/0035
See application file for complete search history.

(56) References Cited

U.S. PATENT DOCUMENTS

2013/0235853 A1 9/2013 Papasakellariou et al.
2013/0336273 A1* 12/2013 Takeda .................. H04L 1/0027
370/329
(Continued)

OTHER PUBLICATIONS

"Annex A (informative): Change history," 3GPP TS 36.213, Release 13, V13.2.0, Jun. 2016, pp. 371-381.
(Continued)

*Primary Examiner* — Ajay Cattungal

(57) ABSTRACT

Methods and apparatuses for multiplexing control information in a physical uplink data channel. A method of a user equipment (UE) includes receiving a configuration for a first set of values and receiving a downlink control information (DCI) format scheduling a transmission of a physical uplink shared data channel (PUSCH) over a set of resource elements (REs) and including a field providing an index. The method further includes determining a first value from the first set of values based on the index, determining a first subset of REs from the set of REs, for multiplexing first uplink control information (UCI), based on the first value, and transmitting the first UCI in the PUSCH.

20 Claims, 23 Drawing Sheets

Related U.S. Application Data on Dec. 20, 2016, provisional application No. 62/469,843, filed on Mar. 10, 2017, provisional application No. 62/509,831, filed on May 23, 2017.

(51) Int. Cl.
  *H04L 1/18* (2006.01)
  *H04L 1/00* (2006.01)
  *H04L 1/16* (2006.01)
  *H04W 88/02* (2009.01)
  *H04W 88/08* (2009.01)

(52) U.S. Cl.
  CPC .......... *H04L 1/1822* (2013.01); *H04L 1/1864* (2013.01); *H04L 5/001* (2013.01); *H04L 5/0023* (2013.01); *H04L 5/0035* (2013.01); *H04W 88/02* (2013.01); *H04W 88/08* (2013.01)

(56) References Cited

U.S. PATENT DOCUMENTS

| | | | |
|---|---|---|---|
| 2014/0056278 A1* | 2/2014 | Marinier | H04W 72/044 370/330 |
| 2014/0133418 A1* | 5/2014 | Takeda | H04W 72/042 370/329 |
| 2014/0269453 A1* | 9/2014 | Papasakellariou | H04B 7/2643 370/280 |
| 2014/0293932 A1 | 10/2014 | Papasakellariou et al. | |
| 2015/0103774 A1* | 4/2015 | Nagata | H04B 7/024 370/329 |
| 2015/0365937 A1* | 12/2015 | Etemad | H04W 4/90 370/329 |
| 2016/0007350 A1* | 1/2016 | Xiong | H04W 24/10 370/252 |
| 2016/0295561 A1* | 10/2016 | Papasakellariou | H04W 72/042 |
| 2017/0019882 A1* | 1/2017 | Nimbalker | H04W 72/042 |
| 2017/0019883 A1* | 1/2017 | Nimbalker | H04L 5/0053 |
| 2017/0041922 A1* | 2/2017 | Chen | H04W 72/1268 |
| 2018/0026769 A1* | 1/2018 | Lee | H04L 1/00 370/329 |
| 2018/0139014 A1* | 5/2018 | Xiong | H04L 1/18 |
| 2018/0139041 A1* | 5/2018 | Choi | H04L 9/06 |

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.

"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 5 pages.

"Foreword," 3GPP TS 36.213, Release 13, V13.2.0, Jun. 2016, pp. 7-44.

"Random Access Procedure," 3GPP TS 36.213, Release 13, V13. 2.0, Jun. 2016, pp. 45-254.

"Physical Uplink Control Channel Procedures," 3GPP TS 36.213, Release 13, V13.2.0, Jun. 2016, pp. 255-334.

"UE Procedures Related to Sidelink," 3GPP TS 36.213, Release 13, V13.2.0, Jun. 2016, pp. 335-370.

"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.

Huawei et al.; "UCI multiplexing on data channel"; 3GPP TSG RAN WG1 Meeting #87; R1-1611663; Reno, USA; Nov. 14-18, 2016; 2 pages.

Guangdong OPPO Mobile Telecom; "Multiplexing of UCI and UL data"; 3GPP TSG RAN WG1 Meeting #87; R1-1611699; Reno, USA; Nov. 14-18, 2016; 3 pages.

Samsung; "Discussion on UCI and data multiplexing"; 3GPP TSG RAN WG1 Meeting #87; R1-1612530; Reno, USA; Nov. 14-18, 2016; 3 pages.

International Search Report from PCT Patent Application No. PCT/KR2017/014394 dated Apr. 30, 2018; 4 pages.

Written Opinion of the International Searching Authority from PCT Patent Application No. PCT/KR2017/014394 dated Apr. 30, 2018; 4 pages.

\* cited by examiner

MULTIPLEXING CONTROL INFORMATION IN A PHYSICAL UPLINK DATA CHANNEL

CROSS-REFERENCE TO RELATED APPLICATIONS AND CLAIM OF PRIORITY

The present application claims priority to U.S. Provisional Patent Application Ser. No. 62/432,215, filed on Dec. 9, 2016; U.S. Provisional Patent Application Ser. No. 62/436,705, filed on Dec. 20, 2016; U.S. Provisional Patent Application Ser. No. 62/469,843, filed on Mar. 10, 2017; and U.S. Provisional Patent Application Ser. No. 62/509,831, filed on May 23, 2017. The content of the above-identified patent documents is incorporated herein by reference.

TECHNICAL FIELD

The present application relates generally to a wireless communication system. More specifically, this disclosure relates to supporting transmissions of multiplexing control information in a uplink data channel.

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-Generation (5G) or 5G communication system to be provided for supporting higher data rates beyond $4^{th}$-generation (4G) communication system such as long term evolution (LTE). The present disclosure relates to multiplexing uplink control information (UCI) in a physical uplink shared channel (PUSCH). The present disclosure also relates to determining a number of coded symbols per layer for transmission of a UCI type in a PUSCH conveying an initial transmission of a data transport block (TB) or an adaptive retransmission of the data TB. The present disclosure additionally relates to determining a number of coded symbols per layer for transmission of a UCI type in a PUSCH conveying an adaptive retransmission of data code blocks (CBs) where the adaptive retransmission includes different data CBs than the initial transmission of the data CBs. The present disclosure further relates to determining a number of coded symbols per layer for transmission of a UCI type in a PUSCH when the PUSCH conveys only UCI. The present disclosure additionally relates to multiplexing coded symbols for various UCI types in a PUSCH so that an impact on data reception reliability is minimized and UCI reception reliability is improved. The present disclosure also relates to supporting encoding of UCI payloads that are smaller than or equal to a predetermined value using an encoding method that is applicable to UCI payloads above the predetermined value. The present disclosure additionally relates to enabling a gNB to schedule a retransmission of a HARQ-ACK codeword from a UE. The present disclosure further relates to enabling transmission of HARQ-ACK information per code block group. The present disclosure additionally relates to applying a different adjustment for parameters of a PUSCH transmission from a UE in slots with UCI or SRS multiplexing than in slots without UCI or SRS multiplexing and also accounting for potentially different variable DMRS resources.

In one embodiment, a UE includes a receiver configured to receive a configuration for a first set of values and a downlink control information (DCI) format scheduling a transmission of a PUSCH over a set of resource elements (REs) and including a field providing an index. The UE further includes a processor configured to determine a first value from the first set of values based on the index; and a first subset of REs, from the set of REs, for multiplexing first uplink control information (UCI) based on the first value. Additionally, the UE includes a transmitter configured to transmit the first UCI in the PUSCH.

In another embodiment, a base station includes a transmitter configured to transmit a configuration for a first set of values; and a DCI format scheduling a reception of a PUSCH over a set of REs and including a field providing an index. The base station. A processor configured to determine a first value from the first set of values based on the index; and a first subset of REs, from the set of REs, for de-multiplexing first UCI based on the first value. A receiver configured to receive the first UCI in the PUSCH.

In yet another embodiment, a method of a UE includes receiving a configuration for a first set of values and receiving a downlink control information (DCI) format scheduling a transmission of a physical uplink shared data channel (PUSCH) over a set of resource elements (REs) and including a field providing an index. The method further includes determining a first value from the first set of values based on the index, determining a first subset of REs from the set of REs, for multiplexing first uplink control information (UCI), based on the first value, and transmitting the first UCI in the PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
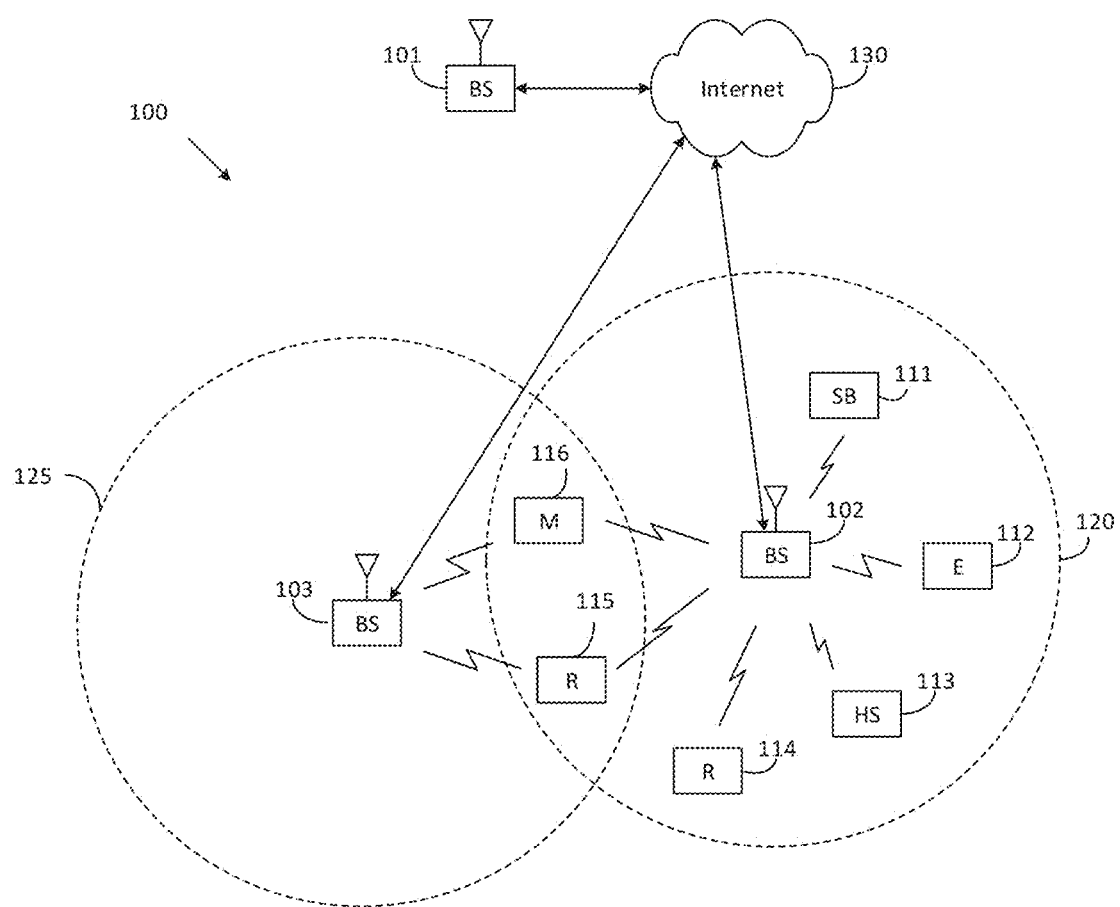
FIG. 1 illustrates an example wireless network according to embodiments of the present disclosure.
Figure 2:
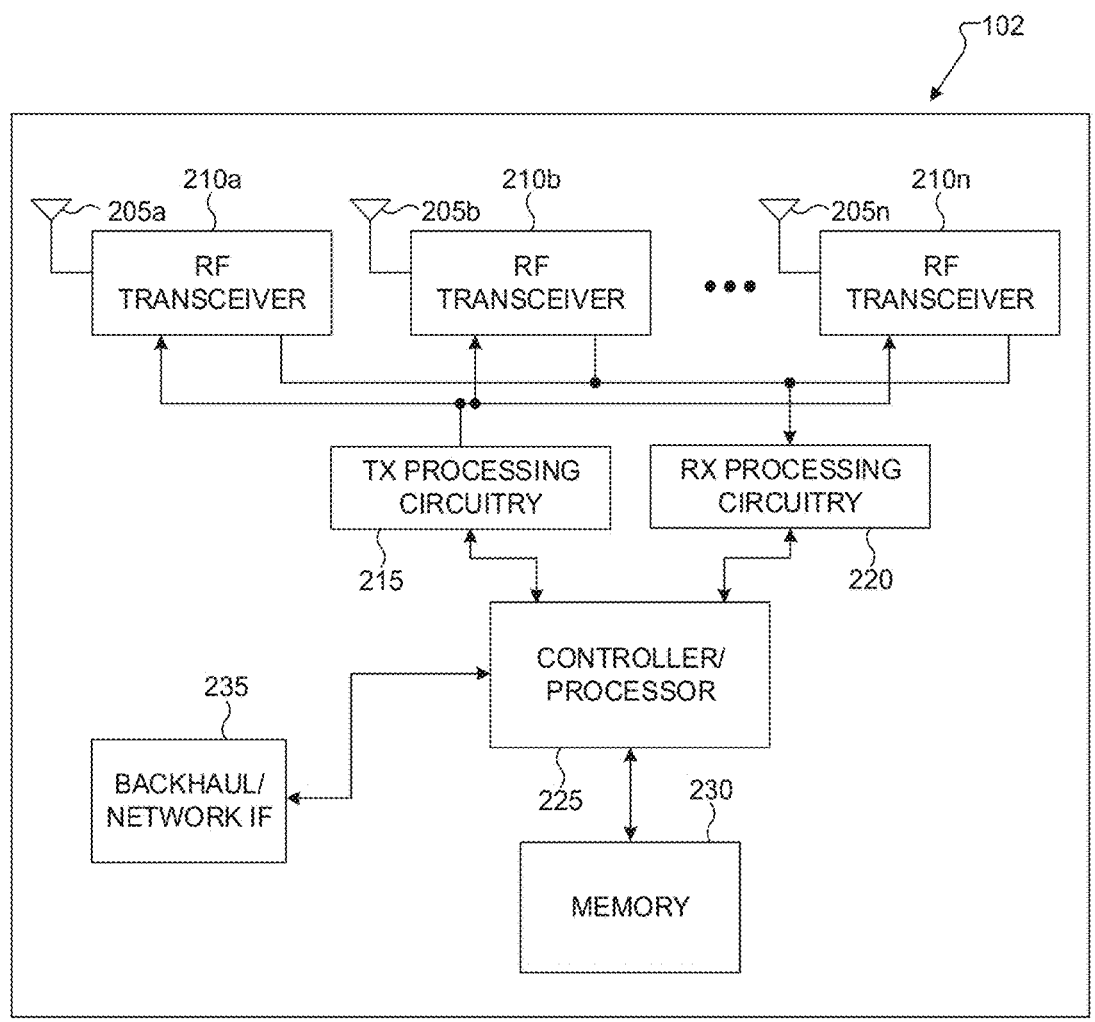
FIG. 2 illustrates an example gNB according to embodiments of the present disclosure.
Figure 3:
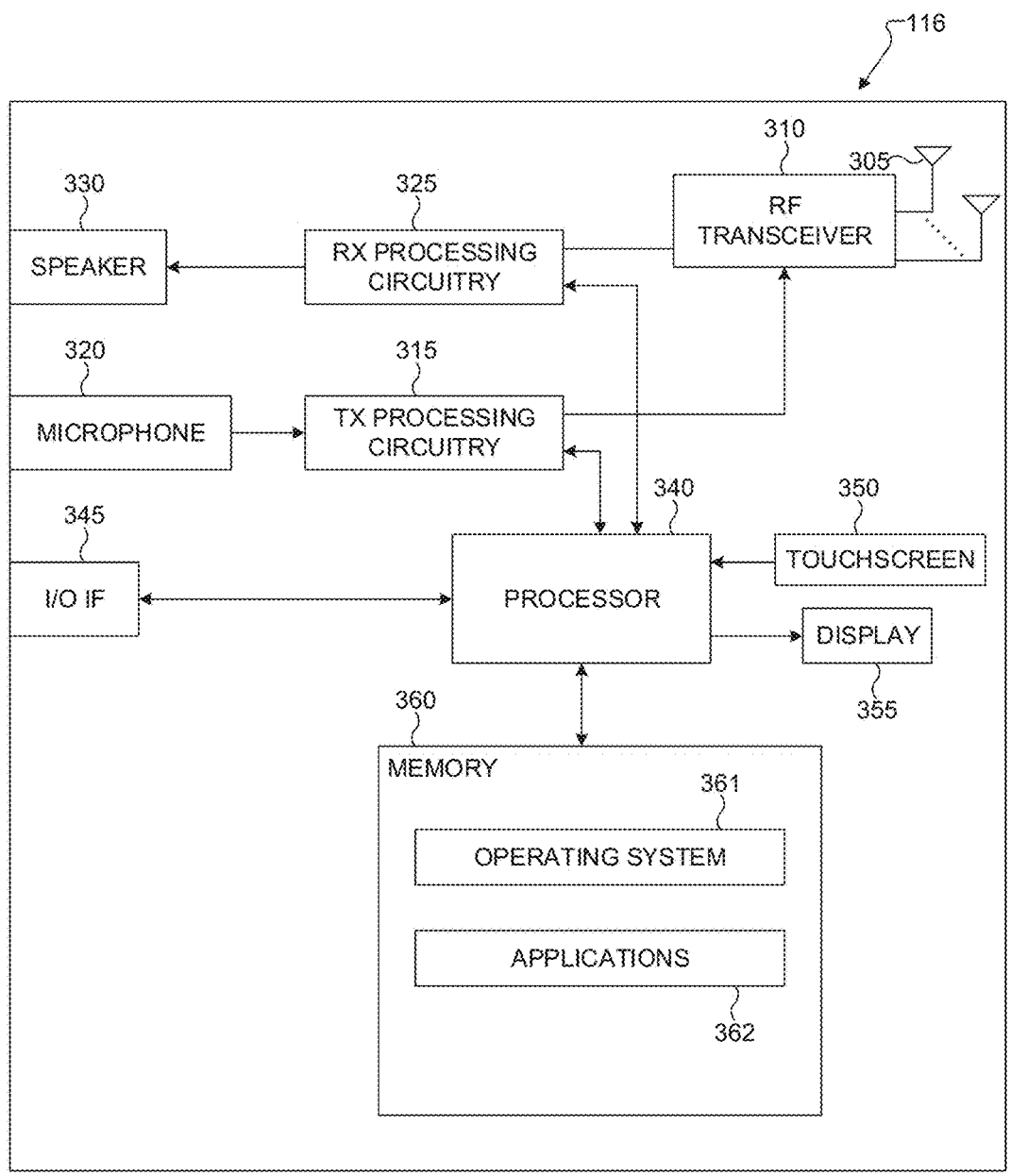
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary internet protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for transmitting uplink control information (UCI) on an uplink shared data channel or for determining a codeword with acknowledgement information in an advanced wireless communication system. In certain embodiments, and one or more of the gNBs 101-103 includes circuitry, programming, or a combination thereof, for receiving UCI on an uplink shared data channel or for or for determining a codeword with acknowledgement information in an advanced wireless communication system.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing. In some embodiments, the RF transceivers 210a-210n are capable of transmitting a physical downlink control channel (PDCCH) conveying a downlink control information (DCI) format, a physical downlink shared channel (PDSCH) conveying one or more data transport blocks scheduled by the DCI format, and configuration information for reception of a physical uplink control channel (PUCCH) conveying acknowledgement information in response to transmitting the one or more data transport blocks.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
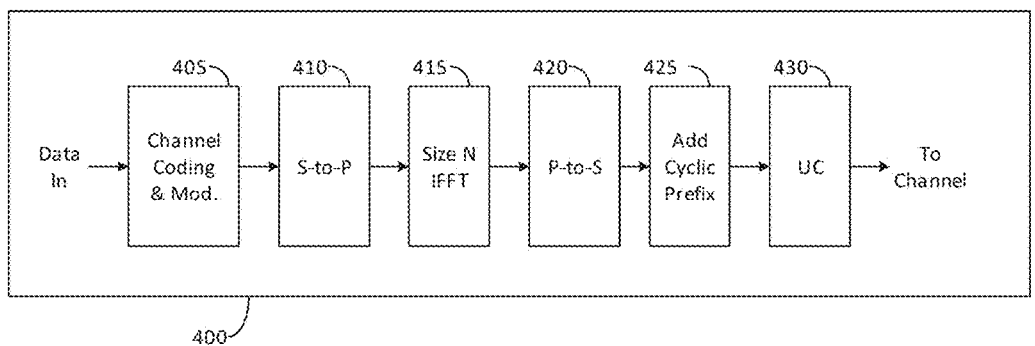
FIG. 4A illustrates a high-level diagram of an orthogonal frequency division multiple access transmit path according to embodiments of the present disclosure.
Figure 4B:
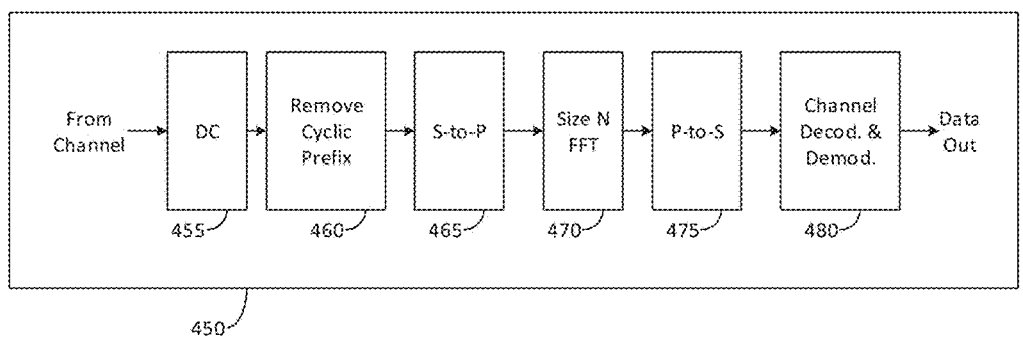
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an OFDMA communication. In FIGS. 4A and 4B, for downlink communication, the transmit path circuitry 400 may be implemented in a base station (e.g., gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, size N inverse fast Fourier transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size n fast Fourier transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of size N may be modified according to the implementation.

Furthermore, although this disclosure is directed to an embodiment that implements the fast Fourier transform and the inverse fast Fourier transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

DL transmissions or UL transmissions can be based on an OFDM waveform including a variant using DFT precoding that is known as DFT-spread-OFDM that is typically applicable to UL transmissions.

A reference time unit for DL signaling or for UL signaling on a cell is referred to as a slot and can include one or more slot symbols. A bandwidth (BW) unit is referred to as a resource block (RB). One RB includes a number of sub-carriers (SCs). For example, a slot can have duration of half millisecond or of one millisecond, include 7 symbols or 14 symbols, respectively, and a RB can have a BW of 180 KHz and include 12 SCs with inter-SC spacing of 15 KHz or a BW of 720 KHz and include 12 SCs with inter-SC spacing of 60 KHz. A BW reception capability or a BW transmission capability for a UE can be smaller than a DL system BW or an UL system BW, respectively, and different UEs can be configured DL receptions or UL transmissions in different parts of a DL system BW or of an UL system BW, respectively, per slot. A slot can be a full DL slot, or a full UL slot, or a hybrid slot that includes both symbols for DL transmissions and symbols for UL transmissions, similar to a special subframe in time division duplex (TDD) systems. When a OFDM waveform is used for transmission, resource elements (REs) are equivalent to SCs. When a DFT-S-OFDM waveform is used for transmission, REs are equivalent to virtual SCs. The two terms are used interchangeably in this disclosure.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including channel state information RS (CSI-RS) and demodulation RS (DMRS). A CSI-RS is intended for UEs to perform measurements and provide channel state information (CSI) to a gNB. A DMRS is typically transmitted only in a BW of a respective PDCCH or PDSCH and a UE can use the DMRS to demodulate DCI or data information. A DL DMRS or CSI-RS can be constructed by a Zadoff-Chu (ZC) sequence or a pseudo-noise (PN) sequence.

For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process including NZP CSI-RS and CSI-IM resources. A UE can determine CSI-RS transmission parameters through higher layer signaling, such as radio resource control (RRC) signaling from a gNB. Transmission instances and resources of a CSI-RS can be indicated by DL control signaling or configured by higher layer signaling. A DMRS is transmitted only in the BW of a respective PDCCH or PDSCH and a UE can use the DMRS to demodulate data or control information.

Figure 5:
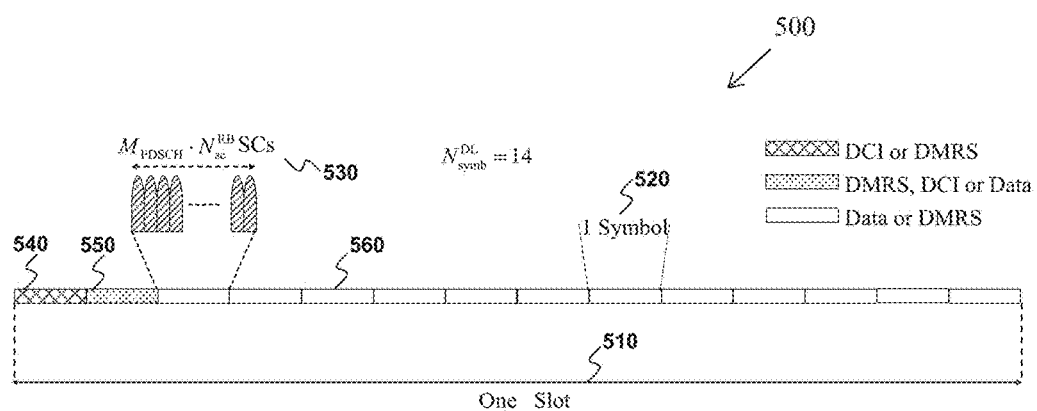
FIG. 5 illustrates an example DL slot structure for PDSCH transmission or PDCCH transmission according to embodiments of the present disclosure.

FIG. 5 illustrates an example DL slot structure 500 for transmission or PDCCH transmission according to embodiments of the present disclosure. An embodiment of the DL slot structure 500 for transmission or PDCCH transmission shown in FIG. 5 is for illustration only. Other embodiments may be used without departing from the scope of the present disclosure.

A slot 510 includes $N_{symb}^{DL}$ symbols 520 where a gNB transmits data information, DCI, or DMRS. A DL system BW includes $N_{RB}^{DL}$ RBs. Each RB includes $N_{sc}^{RB}$ SCs. For example, $N_{sc}^{RB}=12$. A UE is assigned $M_{PDSCH}$ RBs for a total of $M_{sc}^{PDSCH}=M_{PDSCH} \cdot N_{sc}^{RB}$ SCs 530 for a PDSCH transmission BW. A first slot symbol 540 can be used by the gNB to transmit DCI and DMRS. A second slot symbol 550 can be used by the gNB to transmit DCI, DMRS, or data information. Remaining slot symbols 560 can be used by the gNB to transmit data information, DMRS, and possibly CSI-RS. In some slots, the gNB can also transmit synchronization signals and system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of data transport blocks (TBs) in a PDSCH, scheduling request (SR) indicating whether a UE has data in the UE's buffer, and CSI reports enabling a gNB to select appropriate parameters for PDSCH or PDCCH transmissions to a UE.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. RI and CSI can also be jointly coded with CSI and CSI can include two parts where CSI part 1 can include RI, CRI, and some predetermined part of CSI while CSI part 2 can include the remaining CSI. UL RS includes DMRS and SRS. DMRS is transmitted only in a BW of a respective PUSCH or PUCCH transmission. A DMRS or an SRS can be represented by a ZC sequence or a computer generated (CG) sequence with predefined properties. A cyclic shift (CS) associated with a ZC sequence or a GC sequence can hop in time. For example, a gNB can explicitly or implicitly indicate to a UE a CS for a GC sequence that is applicable for a first DMRS transmission in a PUSCH or a PUCCH and the UE can determine a CS for subsequent DMRS transmissions in the PUSCH or the PUCCH based on a predefined CS hopping pattern. A gNB can use a DMRS to demodulate information in a respective PUSCH or PUCCH. SRS is transmitted by a UE to provide a gNB with an UL CSI and, for a TDD system, a SRS transmission can also provide a PMI for DL transmission. Additionally, in order to establish synchronization or an initial RRC connection with a gNB, a UE can transmit a physical random access channel.

Figure 6:
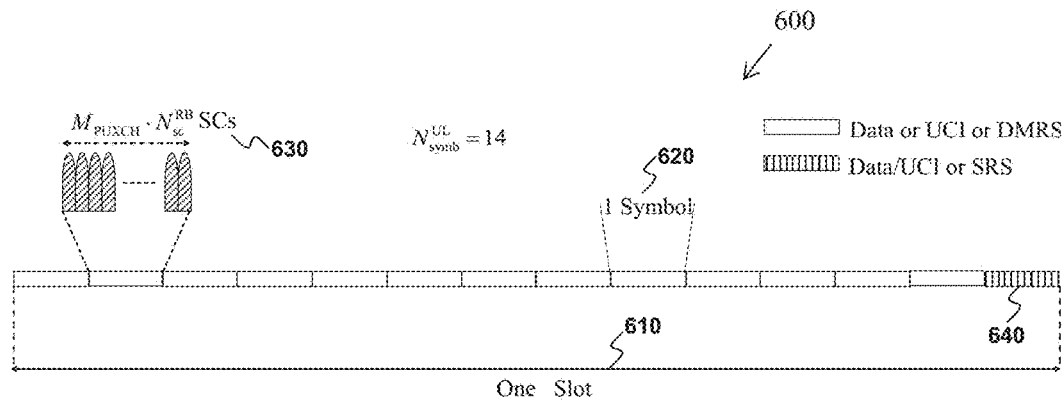
FIG. 6 illustrates an example UL slot structure for PUSCH transmission or PUCCH transmission according to embodiments of the present disclosure.

FIG. 6 illustrates an example UL slot structure 600 for PUSCH transmission or PUCCH transmission according to embodiments of the present disclosure. An embodiment of the UL slot structure 600 for PUSCH transmission or PUCCH transmission shown in FIG. 6 is for illustration only. Other embodiments may be used without departing from the scope of the present disclosure.

A slot 610 includes $N_{symb}^{UL}$ symbols 620 where a UE transmits data information, UCI, or RS including at least one symbol where the UE transmits DMRS 630. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH} = M_{PUXCH} \cdot N_{sc}^{RB}$ SCs 640 for a PUSCH transmission BW ("X"="S") or for a PUCCH transmission BW ("X"="C"). One or more last slot symbols can be used to multiplex SRS transmissions 650 (or PUCCH transmissions) from one or more UEs. A number of UL slot symbols available for data/UCI/DMRS transmission is $N_{symb}^{PUXCH} = 2 \cdot (N_{symb}^{UL} - 1) - N_{SRS}$. $N_{SRS} > 0$ when $N_{SRS}$ last slot symbols are used SRS transmissions (or PUCCH transmissions) from UEs that overlap at least partially in BW with a PUXCH transmission BW; otherwise, $N_{SRS} = 0$ Therefore, a number of total SCs for a PUXCH transmission is $M_{sc}^{PUXCH} \cdot N_{symb}^{PUXCH}$. PUCCH transmission and PUSCH transmission can also occur in a same slot; for example, a UE can transmit PUSCH in earlier slot symbols and PUCCH in later slot symbols.

A hybrid slot includes a DL transmission region, a guard period region, and an UL transmission region, similar to a special subframe in LTE. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

A PDCCH transmission can be over a number of control channel elements (CCEs). A UE typically performs multiple PDCCH decoding operations to detect DCI formats in a TTI. The UE determines locations of CCEs for a PDCCH reception (PDCCH candidate) according to a search space function for a corresponding CCE aggregation level. A DCI format includes cyclic redundancy check (CRC) bits in order for the UE to confirm a correct detection of the DCI format. A DCI format type is identified by a radio network temporary identifier (RNTI) that scrambles the CRC.

In the following, a DCI format scheduling a PDSCH transmission to a UE is referred to as DL DCI format or DL assignment while a DCI format scheduling a PUSCH transmission from a UE is referred to as UL DCI format or UL grant. A DL DCI format or an UL DCI format includes a new data indicator (NDI) field indicating whether a data transport block (TB) transmission scheduled by the DL DCI or the UL DCI in a PDSCH or a PUSCH, respectively, is a new data TB or a previously transmitted data TB for an associated HARQ process.

Figure 7:
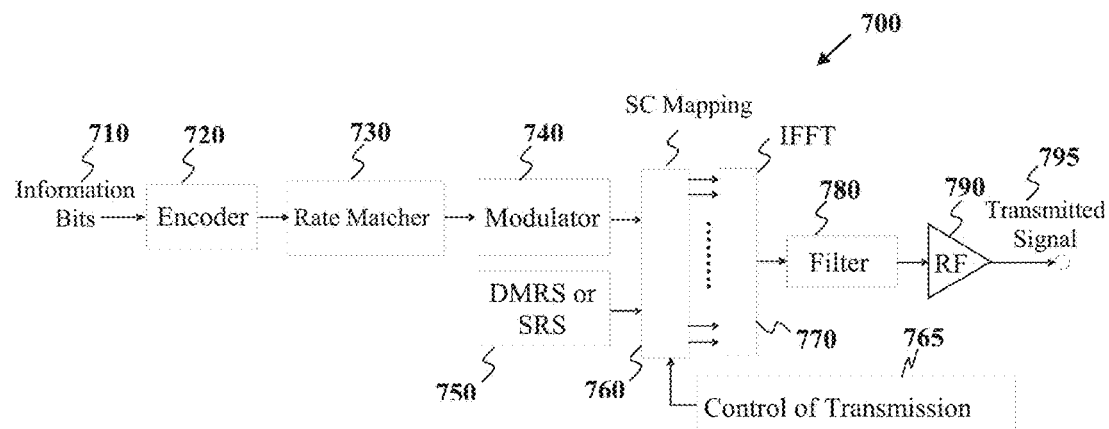
FIG. 7 illustrates an example transmitter structure using OFDM according to embodiments of the present disclosure.

FIG. 7 illustrates an example transmitter structure 700 using OFDM according to embodiments of the present disclosure. An embodiment of the transmitter structure 700 shown in FIG. 7 is for illustration only. Other embodiments may be used without departing from the scope of the present disclosure.

Information bits, such as DCI bits or data bits 710, are encoded by encoder 720, rate matched to assigned time/frequency resources by rate matcher 730, and modulated by modulator 740. Subsequently, modulated encoded symbols and DMRS or SRS 750 are mapped to SCs 760 by SC mapping unit 765, an inverse fast Fourier transform (IFFT) is performed by filter 770, a cyclic prefix (CP) is added by CP insertion unit 780, and a resulting signal is filtered by filter 790 and transmitted by an radio frequency (RF) unit 795.

Figure 8:
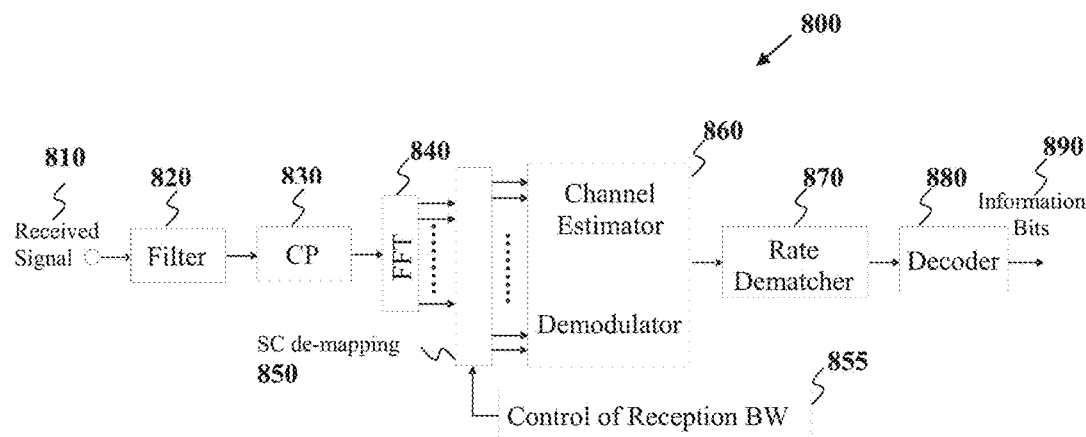
FIG. 8 illustrates an example receiver structure using OFDM according to embodiments of the present disclosure.

FIG. 8 illustrates an example receiver structure 800 using OFDM according to embodiments of the present disclosure. An embodiment of the receiver structure 800 shown in FIG. 8 is for illustration only. Other embodiments may be used without departing from the scope of the present disclosure.

A received signal 810 is filtered by filter 820, a CP removal unit removes a CP 830, a filter 840 applies a fast Fourier transform (FFT), SCs de-mapping unit 850 de-maps SCs selected by BW selector unit 855, received symbols are demodulated by a channel estimator and a demodulator unit 860, a rate de-matcher 870 restores a rate matching, and a decoder 880 decodes the resulting bits to provide information bits 890.

When a UE transmits HARQ-ACK bits, RI bits, or CSI-RS resource indicator (CRI) bits in a PUSCH that conveys one data TB, the UE determines a number of coded modulation symbols per layer Q' for HARQ-ACK as in Equation 1. A similar determination applies when a PUSCH conveys more than one data TB such as two data TBs.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{(Equation 1)}$$

where O is the number of HARQ-ACK bits, RI bits, or CRI bits, $M_{sc}^{PUSCH}$ is a scheduled PUSCH transmission BW, in number of SCs, in a current slot for the data TB, and $N_{symb}^{PUSCH-initial}$ is a number of slot symbols for initial PUSCH transmission for the same data TB, $\beta_{offset}^{PUSCH} = \beta_{offset}^{HARQ-ACK}$ for HARQ-ACK transmission or $\beta_{offset}^{PUSCH} = \beta_{offset}^{RI}$ is a parameter configured to the UE by a gNB through higher layer signaling, $M_{sc}^{PUSCH-initial}$, C, and $K_r$ are obtained from the DCI format conveyed in initial DL control channel for the same data TB. If there is no initial DL control channel for the same data TB, $M_{sc}^{PUSCH-initial}$, C, and $K_r$ are determined from the most recent semi-persistent scheduling (SPS) assignment when the initial PUSCH for the same data TB is SPS or from the random access response grant for the same data TB when the PUSCH is initiated by the random access response grant. Further, C is a number of code blocks (CBs) in the data TB and $K_r$ is a size of CB r, ⌈ ⌉ is the ceiling function that rounds a number to the next higher integer, and min(x, y) is the minimum function resulting the smaller of x or y.

When a UE transmits CQI or PMI in a PUSCH (denoted as CQI/PMI and jointly referred to as CSI for brevity), the UE determines a number of coded modulation symbols per layer Q' as in Equation 2. For multi-beam operation with analog or hybrid beamforming, a CSI report can include, in addition to CQI and PMI, beam state information (BSI) or beam related information (BRI).

$$Q' = \min\left(\left\lceil \frac{(O+L) \cdot M_{sc}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right) \quad \text{(Equation 2)}$$

where O is the number of CQI/PMI bits, and L is the number of cyclic redundancy check $$(CRC) \text{ bits given by } L = \begin{cases} 0 & O \le 11 \\ 8 & \text{otherwise} \end{cases},$$

and $\beta_{offset}^{PUSCH} = \beta_{offset}^{CQI}$ is a parameter configured to the UE by a gNB through higher layer signaling $Q_{CQI} = Q_m^{(x)} \cdot Q'$ and $\beta_{offset}^{PUSCH} = \beta_{offset}^{CQI}$, where $\beta_{offset}^{CQI}$ may be determined according to the LTE specification depending on the number of transmission codewords for the corresponding PUSCH, and on the UL power control set for the corresponding PUSCH when two UL power control sets are configured by higher layers for the cell.

If RI is not transmitted then $Q_{RI}^{(x)} = 0$. Remaining notation is similar to the one described for HARQ-ACK and is not described for brevity. The variable "x" in $K_r^{(x)}$ represents a TB index corresponding to a highest MCS value indicated by an initial UL DCI format.

Control and data multiplexing is performed such that HARQ-ACK information is present on both slots and is mapped to resources around the DMRS. The inputs to the data and control multiplexing are the coded bits of the control information denoted by $q_0, q_1, q_2, q_3, \ldots, q_{N_L \cdot Q_{CQI}-1}$ and the coded bits of the UL-SCH denoted by $f_0, f_1, f_2, f_3, \ldots, f_{G-1}$. The output of the data and control multiplexing operation is denoted by $g_0, g_1, g_2, g_3, \ldots, g_{H'-1}$, where $H=(G+N_L \cdot Q_{CQI})$ and $H'=H/(N_L \cdot Q_m)$, and where $g_i$, i=0, ..., H'−1 are column vectors of length $(Q_m \cdot N_L)$. H is the total number of coded bits allocated for data and CQI/PMI information across the $N_L$ transmission layers of the data TB. Control and data multiplexing in case more than one data TB is transmitted in a PUSCH is described in LTE specification and additional description in this disclosure is omitted for brevity.

For UCI multiplexing in a PUSCH as described in LTE specification, HARQ-ACK coded modulation symbol puncture data coded modulation symbols. This can be problematic in case of relatively large HARQ-ACK information payloads. Also, when a gNB does not correctly detect a RI value, the gNB does not have a correct understanding of an associated CSI payload that is transmitted from a UE. As a UE rate matches a transmission of data coded modulation symbols based on CSI coded modulation symbols, an incorrect understanding at a receiving gNB of a number of CSI coded modulation symbols (due to an incorrect understanding of CSI information payload) can lead to HARQ soft buffer corruption for data TBs.

A PUSCH transmission can convey only A-CSI, and can also include HARQ-ACK or RI, without including any data. When a UE detects an UL DCI format with a CSI request triggering an A-CSI report in a PUSCH transmission, the UE can determine to not include data in the PUSCH transmission when the UE reports CSI for one serving cell and the PUSCH is scheduled in 4 or less RBs and an MCS index in the UL DCI format is a last MCS index. Other condition can also apply depending on a respective operation scenario as described in LTE specification. A CSI request field in an UL DCI format includes a predefined number of bits, such as 1 bit or 2 bits. For example, a mapping of the 2 bits can be as in TABLE 1.

TABLE 1

Mapping of CSI request field to CSI reports a UE provides in a PUSCH

| Value of CSI request field | Description |
|---|---|
| "00" | No aperiodic CSI report is triggered |
| "01" | Aperiodic CSI report is triggered for serving cell c |

TABLE 1-continued

Mapping of CSI request field to CSI reports a UE provides in a PUSCH

| Value of CSI request field | Description |
|---|---|
| "10" | Aperiodic CSI report is triggered for a 1st set of serving cells configured by higher layers |
| "11" | Aperiodic CSI report is triggered for a 2nd set of serving cells configured by higher layers |

When a UE multiplexed only UCI (without data) in a PUSCH transmission and the UE also transmits HARQ-ACK bits or RI bits, the UE determines a number of coded symbols Q' for HARQ-ACK or RI as in Equation 3

$$Q' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right) \quad \text{(Equation 3)}$$

where O is a number of HARQ-ACK bits or RI/CRI bits and $O_{CQI-MIN}$ is a number of CQI bits including CRC bits assuming rank equals to 1 for serving cells that an A-CSI is triggered for. For HARQ-ACK $Q_{ACK}=Q_m \cdot Q'$ and $\beta_{offset}^{PUSCH}=\beta_{offset}^{HARQ-ACK}/\beta_{offset}^{CQI}$. For RI/CRI, $Q_{RI}=Q_m \cdot Q'$, $Q_{CRI}=Q_m \cdot Q'$ and $\beta_{offset}^{PUSCH}=\beta_{offset}^{RI}/\beta_{offset}^{CQI}$. For CSI, $Q_{CQI}=N_{symb}^{PUSCH} \cdot M_{sc}^{PUSCH} \cdot Q_m - Q_{RI}$. One problem with the determination of a number of HARQ-ACK or RI/CRI coded modulation symbols in Equation 3 is that the number is not based on an actual CSI MCS but is instead based on a smallest CSI MCS resulting from using the smallest possible CSI payload ($O_{CQI-MIN}$ bits). As a consequence, a number of HARQ-ACK or RI coded modulation symbols in Equation 3 can be significantly over-dimensioned, for example by more than 100%.

Figure 9:
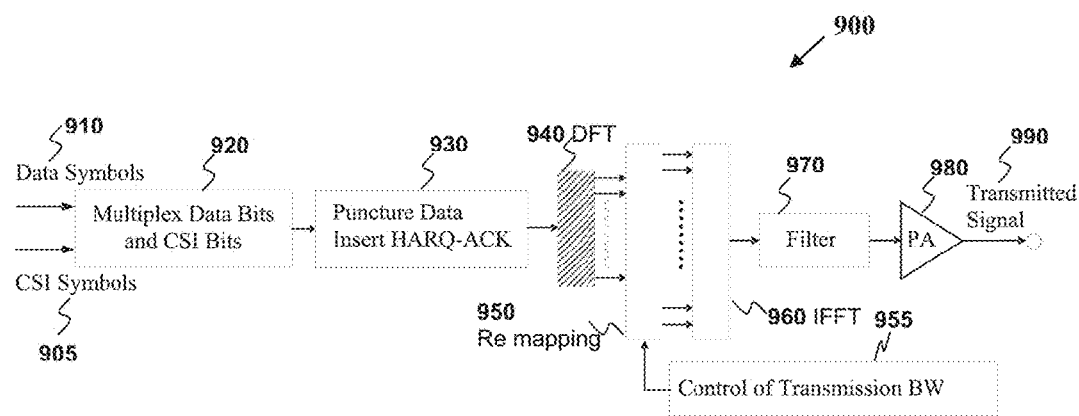
FIG. 9 illustrates an example transmitter block diagram for data information and UCI in a PUSCH according to this embodiments of the present disclosure.

FIG. 9 illustrates an example transmitter block diagram 900 for data information and UCI in a PUSCH according to embodiments of the present disclosure. An embodiment of the transmitter block diagram 900 shown in FIG. 9 is for illustration only. Other embodiments may be used without departing from the scope of the present disclosure.

Referring to FIG. 9, coded CSI symbols 905, when any, and coded data symbols 910, when any, are multiplexed by multiplexer 920. Coded HARQ-ACK symbols, when any, are then inserted by multiplexer 930 by puncturing data symbols and/or CSI symbols. A transmission of coded RI symbols, if any, is similar to one for coded HARQ-ACK symbols (not shown). When a DFT-S-OFDM waveform is used for transmission, a Discrete Fourier Transform (DFT) is applied by DFT unit 940 (no DFT is applied in case of an OFDM waveform), REs 950 corresponding to a PUSCH transmission BW are selected by selector 955, an IFFT is performed by IFFT unit 960, an output is filtered and by filter 970 and applied a certain power by Power Amplifier (PA) 980 and a signal is then transmitted 990. Due to the DFT mapping, the REs can be viewed as virtual REs but are referred to as REs for simplicity. If any of data, CSI, HARQ-ACK, or RI is not transmitted, a block in FIG. 9 corresponding to a respective transmitter processing function is omitted. For brevity, additional transmitter circuitry such as digital-to-analog converter, filters, amplifiers, and transmitter antennas as well as encoders and modulators for data symbols and UCI symbols are omitted for brevity.

Figure 10:
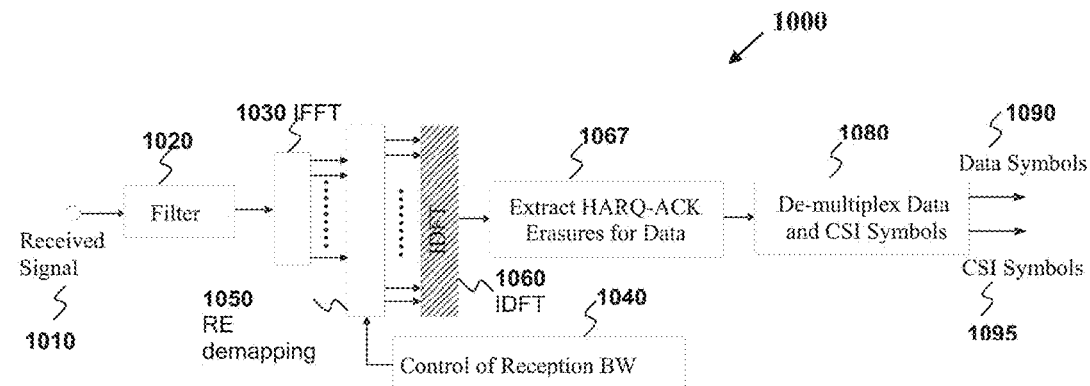
FIG. 10 illustrates an example receiver block diagram for data information and UCI in a PUSCH according to this embodiments of the present disclosure.

FIG. 10 illustrates an example receiver block diagram 1000 for data information and UCI in a PUSCH according to embodiments of the present disclosure. An embodiment of the receiver block diagram 1000 shown in FIG. 10 is for illustration only. Other embodiments may be used without departing from the scope of the present disclosure.

Referring to FIG. 10, a received signal 1010 is filtered by filter 1020, an FFT is applied by FFT unit 1030, a selector unit 1040 selects REs 1050 used by a transmitter, an Inverse DFT (IDFT) unit applies an IDFT 1060 when a DFT-S-OFDM waveform is used for transmission, a de-multiplexer 1070 extracts coded HARQ-ACK symbols, if any, and places erasures in corresponding REs for data symbols and CSI symbols and finally another de-multiplexer 1080 separates coded data symbols 1090, if any, and coded CSI symbols 1095, if any. A reception of coded RI symbols, if any, is similar to one for coded HARQ-ACK symbols (not shown). If any of data, CSI, HARQ-ACK, or RI is not transmitted, a block in FIG. 10 corresponding to a respective receiver processing function is omitted. Additional receiver circuitry such as a channel estimator, demodulators and decoders for data and UCI symbols are not shown for brevity.

The determination of a number of coded modulation symbols for a UCI type per layer Q', as in Equation 1 or Equation 2, is based on non-adaptive retransmissions and use parameters associated with an initial PUSCH transmission for the same data TB. Such determination is disadvantageous when UCI is multiplexed in an adaptive retransmission of a data TB that is in response to an UL DCI format or in an adaptive retransmission of some code blocks (CBs) of a TB, for example when a UE provides HARQ-ACK feedback per number of CBs in a TB instead of the whole TB.

A determination of a number of coded modulation symbols for a UCI type per layer Q', as in Equation 1 or Equation 2, is also based on a single respective $\beta_{offset}^{PUSCH}$ that a gNB configures to a UE by higher layer signaling. This is restrictive as it does not allow a gNB to target different BLERs for data transmissions corresponding to different services. Further, it is too restrictive and generally not possible for a gNB scheduler to maintain a same PUSCH transmission power for an initial data TB transmission and for a HARQ retransmission of the data TB. When a PUSCH transmission power is not same for an initial transmission and for a HARQ retransmission of a data TB, a determination of coded UCI symbols in a PUSCH conveying a retransmission of a data TB, as in Equation 1 or Equation 2, can be highly inaccurate when a respective transmission power is different than for the initial transmission of the data TB and either lead to unnecessary UCI overhead or to worse UCI BLER.

In a system operation as described in LTE specification, and for a slot that includes fourteen symbols, DMRS associated with a transmission of an UL data channel is placed in the fourth and eleventh slot symbols starting, HARQ-ACK information is equally distributed in the third, fifth, tenth, and twelfth slot symbols starting from a SC with a lowest index, RI/CRI information is equally distributed in the second, sixth, ninth, and thirteenth slot symbols starting from a SC with a lowest index while CSI is distributed across all symbols in a slot starting from a SC with a highest index. A reason for placing HARQ-ACK information next to slot symbols used for DMRS transmission is to provide robustness against Doppler shift to a reception reliability of HARQ-ACK information that is prioritized in importance over other UCI types.

In order to improve a decoding latency, a different slot structure can also be considered where DMRS transmission occurs at a first UL symbol of a slot in order to enable a receiver to obtain a channel estimate as soon as possible and then proceed with decoding of code blocks that are assumed to be first mapped in a frequency domain. Additional slot symbols can be used for DMRS transmission, when needed, for example to provide robustness against Doppler shift or to improve an accuracy of a channel estimate. A slot structure can also have a variable number of symbols available for transmission of data information, UCI, or DMRS. For example, a hybrid slot can include seven symbols where a first symbol can be used for transmission of DL control information, a second symbol can be a gap symbol, a next four symbols can be used for transmissions of DMRS, data, or UCI from UEs and a seventh symbol can be used for other transmissions such as for SRS or other UCI. A mapping of UCI types to slot symbols as described in LTE specification cannot apply when a first slot symbol is used for DMRS transmission, or when a variable number of slot symbols are used for DMRS transmission, or when a slot can include a variable number of symbols available for transmission of DMRS, data, and UCI.

Therefore, there is a need to improve a determination for a number of coded symbols per layer for transmission of a UCI type in a PUSCH conveying an initial transmission of a data TB or an adaptive retransmission of the data TB.

In some embodiments, there is another need to improve a determination for a number of coded symbols per layer for transmission of a UCI type in a PUSCH conveying an adaptive retransmission of data CBs where the adaptive retransmission includes different data CBs than the initial transmission of the data CBs.

In some embodiments, there is another need to improve a determination for a number of coded symbols per layer for transmission of a UCI type in a PUSCH when the PUSCH conveys only UCI.

In some embodiments, there is a need to determine a multiplexing of coded symbols for various UCI types in a PUSCH that minimizes an impact on data reception reliability and improves UCI reception reliability.

In the following, for brevity, data information is assumed to be transmitted using one data TB that can include one or more data CBs. Associated description of embodiments can be directly extended in case more than one data TBs are supported. Further, a DCI format scheduling a PUSCH transmission is referred to as UL DCI format while a DCI format scheduling a PDSCH transmission is referred to as DL DCI format.

In some embodiments, decoupling BLER of data information from BLER of UCI is multiplexed with data information in a PUSCH transmission.

In one example, a UE is configured different $\beta_{offset}^{PUSCH}$ values for use in determining a number of coded modulation symbols for multiplexing a UCI type in a PUSCH for when the PUSCH conveys an initial transmission of a data TB and when the PUSCH conveys a retransmission of a data TB. For example, a UE can be configured a first $\beta_{offset,0}^{PUSCH}$ value for multiplexing a respective UCI type in a PUSCH when the PUSCH conveys an initial data TB transmission and configured a second $\beta_{offset,1}^{PUSCH}$ value for multiplexing a respective UCI type in a PUSCH when the PUSCH conveys a HARQ retransmission of a data TB. The second $\beta_{offset,1}^{PUSCH}$ value can be same for all HARQ retransmissions even when incremental redundancy with a different redundancy version is used for each HARQ retransmission. Alternatively, a $\beta_{offset}^{PUSCH}$ value for an associated UCI type can be separately configured for each of the maximum number of HARQ retransmissions for a data TB.

A configuration of different $\beta_{offset}^{PUSCH}$ values for determining a number of coded modulation symbols for a respective UCI type when a PUSCH conveys an initial transmission of a data TB and when a PUSCH conveys a retransmission of a data TB is beneficial for enabling a scheduler to target different BLERs for the initial TB transmission and for the retransmission while achieving a UCI type BLER that is independent of whether the multiplexing occurs in a PUSCH that conveys an initial data TB transmission or a data TB retransmission.

As, for a given signal-to-interference and noise ratio (SINR), a BLER for a UCI type for transmission in a PUSCH is linked to a BLER of a data TB, for example as in Equation 1 or Equation 2, and $\beta_{offset}^{PUSCH}$ is the parameter that adjusts this link to establish independent BLER for the UCI type and for the data TB, a separate configuration of $\beta_{offset}^{PUSCH}$ values when a UCI type transmission is in a PUSCH that conveys an initial data TB transmission and when the UCI type transmission is in a PUSCH that conveys a HARQ retransmission for the data TB allows a scheduler to target different BLERs for an initial data TB transmission and for a data TB HARQ retransmission.

For example, as a target BLER for a HARQ retransmission of a data TB can be larger than a BLER for an initial transmission of the data TB, given that a receiver can combine data symbols in a retransmission of a data TB with data symbols in an initial transmission of the data TB to achieve a lower BLER than the BLER of the HARQ retransmission by itself, a UE can be configured a larger $\beta_{offset}^{PUSCH}$ value for determining a number of coded modulation symbols for a UCI type when a multiplexing is in a PUSCH conveying a HARQ retransmission for a data TB than when the multiplexing is in a PUSCH conveying an initial transmission for a data TB. For maximum flexibility in selecting target BLERs for data TB(s) for initial transmission and for each of a maximum number of HARQ retransmissions, a configuration of a $\beta_{offset}^{PUSCH}$ value for each UCI type can be separate for each corresponding transmission. Further, when it is desirable to reduce higher layer signaling overhead, a single $\beta_{offset}^{PUSCH}$ value configuration can apply for all HARQ retransmissions as the largest target BLER difference is typically between an initial transmission and a first HARQ retransmission of a data TB and HARQ retransmissions typically have a similar target BLER for a data TB.

Figure 11:
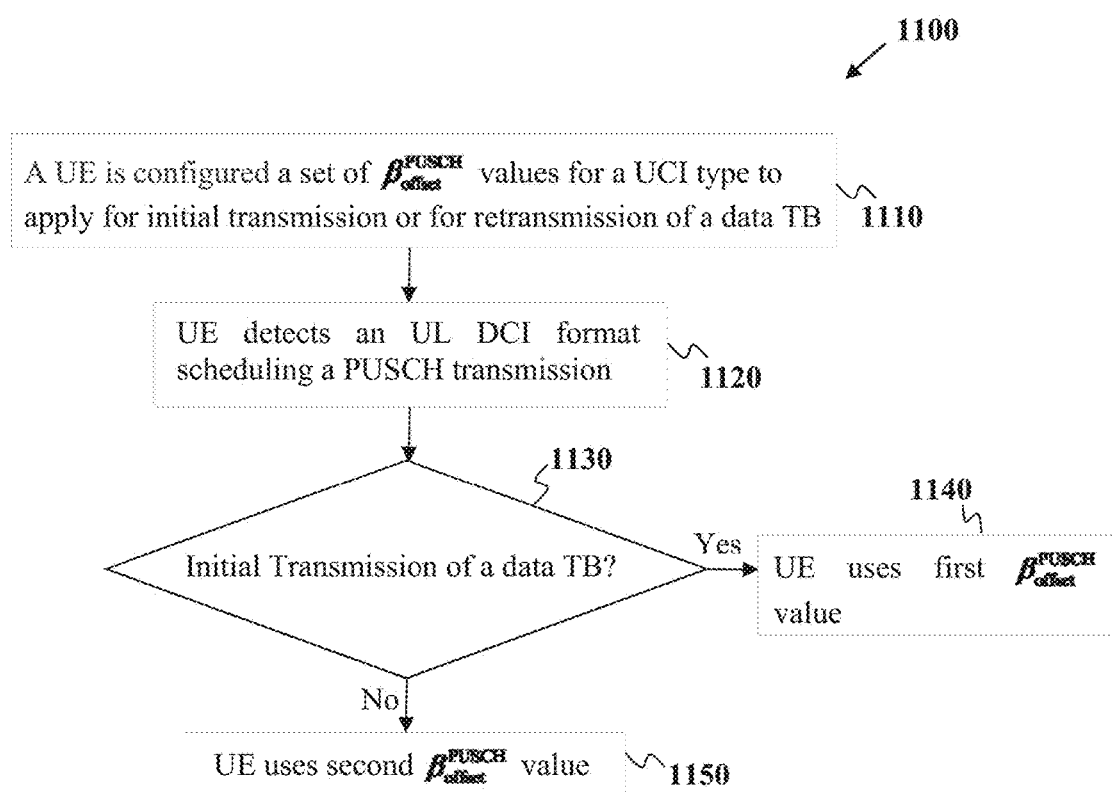
FIG. 11 illustrates an example process for a UE to determine a $\beta_{offset}^{PUSCH}$ value to apply for determining a number of coded modulation symbols in a PUSCH depending on whether or not the PUSCH conveys an initial transmission of a retransmission of a data TB according to this embodiments of the present disclosure.

FIG. 11 illustrates an example process 1100 for a UE to determine $\beta_{offset}^{PUSCH}$ value to apply for determining a number of coded modulation symbols in a PUSCH depending on whether or not the PUSCH conveys an initial transmission of a retransmission of a data TB according to embodiments of the present disclosure. An embodiment of the process 1100 shown in FIG. 11 is for illustration only. Other embodiments may be used without departing from the scope of the present disclosure.

A UE is configured by a gNB a set of $\beta_{offset}^{PUSCH}$ values for a UCI type for the UE to apply for determining a number of coded modulation symbols for the UCI type in a PUSCH transmission 1110. Each $\beta_{offset}^{PUSCH}$ value in the set of $\beta_{offset}^{PUSCH}$ values is associated with an initial transmission or a retransmission of a data TB and a same $\beta_{offset}^{PUSCH}$ value or different $\beta_{offset}^{PUSCH}$ values can apply to different retransmissions. The UE detects an UL DCI format scheduling a PUSCH transmission for a data TB associated with a HARQ process 1120. The UE determines a redundancy version associated with the transmission of a data TB, in case incremental redundancy is used for HARQ retransmissions, or whether the UE needs to retransmit a data TB for the HARQ process in case chase combining is used for HARQ retransmissions 1130. Based on the determination, the UE subsequently determines a first $\beta_{offset}^{PUSCH}$ value, when the PUSCH transmission conveys an initial transmission of a data TB, 1140 or determines a second $\beta_{offset}^{PUSCH}$ value, when the PUSCH transmission conveys a retransmission of a data TB, 1140 to use for determining a number of coded modulation symbols for the UCI type in the PUSCH transmission.

In many practical deployments, it is also beneficial for a scheduler to target different BLER values for an initial transmission of a data TB, or for a retransmission of a data TB, depending on a service type or depending on a network traffic or interference conditions, and so on. For example, a scheduler can target a lower BLER for transmissions from a UE of data TBs associated with service types requiring lower latency, or when an associated interference to other UEs is small, or when the UE is not power limited, and so on.

As such scheduler decisions can be dynamic, configuration of a $\beta_{offset}^{PUSCH}$ value to a UE by higher layer signaling for determining a number of coded modulation symbols for multiplexing a UCI type in a PUSCH can be suboptimal for achieving a target BLER for the UCI type or for improving scheduling of a data TB. Additionally, a number of coded modulation symbols obtained according to Equation 1 or Equation 2 is scaled linearly by a UCI type payload while a BLER for the UCI type is a non-linear function of the UCI type payload due to coding gains associated with a coding scheme such as a block code, a tail-biting convolutional code, or a polar code relative to a repetition code. A dynamic determination of a $\beta_{offset}^{PUSCH}$ value can account for coding gains according to the UCI type payload. Also, in Equation 1 or Equation 2, a number of coded modulation symbols for a UCI type are based on an initial transmission for a data TB and this can be problematic as it fails to account for a different transmission power when the UCI type is multiplexed in a PUSCH transmission conveying a retransmission of a data TB.

The above limitations associated with configuration by higher layer signaling of a single $\beta_{offset}^{PUSCH}$ value for determining a number of coded modulation symbols for a UCI type in a PUSCH can be remedied by configuring to a UE, through higher layer signaling, a set of $\beta_{offset}^{PUSCH}$ values for a respective UCI type and dynamically signaling $\beta_{offset}^{PUSCH}$ value in an UL DCI format that schedules a PUSCH transmission. For example, a gNB can configure a UE by higher layer signaling a set of four $\beta_{offset}^{PUSCH}$ values and a DCI format scheduling a PUSCH transmission from a UE can include a field of two bits to indicate a $\beta_{offset}^{PUSCH}$ value from the set of four $\beta_{offset}^{PUSCH}$ values.

Separate configurations can apply when a PUSCH conveys initial transmission of a data TB and when the PUSCH conveys retransmissions of a data TB. When multiple UCI types are multiplexed in a PUSCH transmission, a same UCI offset indicator field can apply for indexing a $\beta_{offset}^{PUSCH}$ value from the set of $\beta_{offset}^{PUSCH}$ values for each UCI type. For example, for a UCI offset indicator field of 2 bits, with possible values of "00," "01," "10," and "11." The "10" value can be used to indicate the third offset from the respective set of offsets for each UCI type, such as HARQ-ACK or CSI, that is multiplexed in a respective PUSCH transmission.

Figure 12:
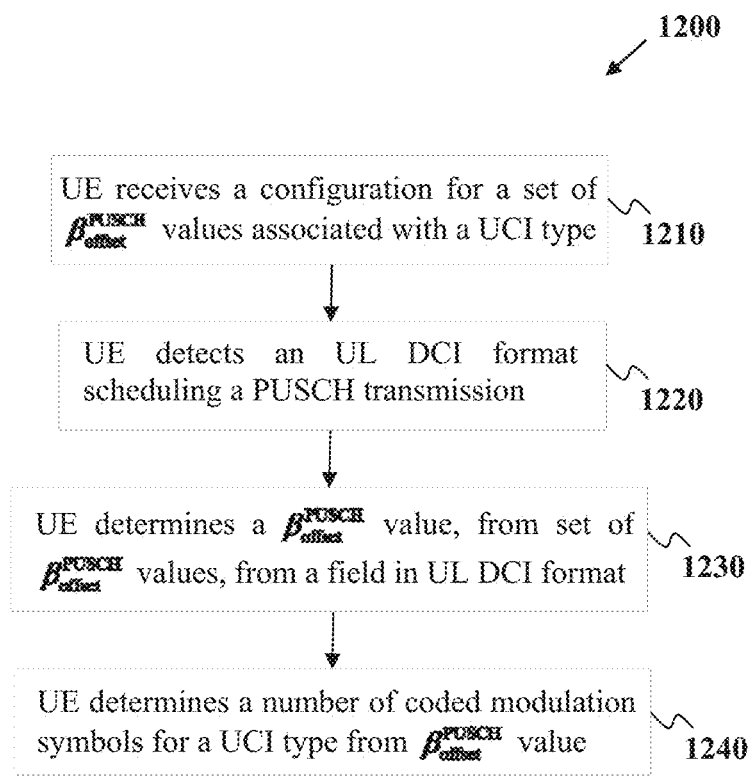
FIG. 12 illustrates an example process for a UE to determine a $\beta_{offset}^{PUSCH}$ value to apply for determining a number of coded modulation symbols in a PUSCH transmission based on signaling in an associated UL DCI format according to this embodiments of the present disclosure.

FIG. 12 illustrates an example process 1200 for a UE to determine a $\beta_{offset}^{PUSCH}$ value to apply for determining a number of coded modulation symbols in a PUSCH transmission based on signaling in an associated UL DCI format according to embodiments of the present disclosure. An embodiment of the process 1200 shown in FIG. 12 is for illustration only. Other embodiments may be used without departing from the scope of the present disclosure.

A UE receives a configuration for a set of $\beta_{offset}^{PUSCH}$ values associated with a UCI type for transmission in a PUSCH 1210. Subsequently, the UE detects an UL DCI format scheduling a PUSCH transmission where the UE is to multiplex the UCI type 1220. The UL DCI format includes a field indicating a $\beta_{offset}^{PUSCH}$ value from the set of $\beta_{offset}^{PUSCH}$ values 1230. Based on the indicated $\beta_{offset}^{PUSCH}$ value, the UE determines a number of coded modulation symbols for multiplexing in the PUSCH transmission 1240. For example, the determination can be according to Equation 1 or Equation 2.

When a PUSCH transmission is semi-persistently scheduled (SPS) by higher layer signaling, a gNB can configure a UE with a different $\beta_{offset}^{PUSCH}$ value for a UCI type for at least two different service types using SPS PUSCH transmissions.

When different DCI formats are used for scheduling PUSCH transmissions with different target BLERs and a UE is configured by higher layers different $\beta_{offset}^{PUSCH}$ values, the UE can determine a $\beta_{offset}^{PUSCH}$ value to use for determining a number of UCI coded modulation symbols based on the associated DCI format. When a same DCI format is used for scheduling PUSCH transmissions with different target BLERs and a UE is configured by higher layers different $\beta_{offset}^{PUSCH}$ values, the UE can determine $\beta_{offset}^{PUSCH}$ value to use for determining a number of UCI coded modulation symbols either explicitly based on a respective index field in the DCI format or implicitly based on an indication for a configuration of parameters for the UE to use in determining a PUSCH transmission power.

When a PUSCH transmission is initiated by a UE without an associated UL DCI format transmission from a gNB, UCI multiplexing in the PUSCH can be precluded as a reliability of such PUSCH transmissions can be unpredictable and a successful reception of associated data TB(s) can typically rely on repetitions or HARQ retransmissions that cannot typically benefit a UCI transmission. This UE behavior can be by network configuration where a UE can be configured whether to multiplex UCI in a PUSCH or drop the PUSCH transmission and transmit UCI in a PUCCH. Alternatively, a DL DCI format can include a field indicating a resource, from a set of resources configured by higher layers to the UE, for an associated HARQ-ACK transmission and one or more of the resources can also support a PUSCH transmission with a predetermined MCS and RB allocation.

For example, one or more resource from the configured resources can be associated with a set of a PUCCH resource and one or more PUSCH resources. When a UE does not have data to transmit, the UE can transmit HARQ-ACK by transmitting a PUCCH on the PUCCH resource. When the UE has data to transmit, the UE can transmit both HARQ-ACK and data by transmitting a PUSCH on one of the PUSCH resources. Each PUSCH resource can also be configured with an MCS for data transmission and a RB allocation and the UE can select a PUSCH resource according to a size of a data TB.

In some embodiments, a determination for a number of coded modulation symbols (per layer) for a UCI and a multiplexing of UCI types in a PUSCH are considered.

A PUSCH transmission from a UE in a slot includes, for example, one symbol for DMRS transmission that is a first UL symbol in the slot that can be used by the UE to transmit the PUSCH. This is not necessarily the first symbol of the slot as, for example, there can be DL transmissions at the beginning of the slot such as in case of a hybrid slot. In the following descriptions, unless otherwise explicitly mentioned, the term "first symbol of a slot" refers to a first symbol available for PUSCH transmission in a slot. Additional DMRS symbols can be configured to a UE for a PUSCH transmission in a slot by a DCI format scheduling the PUSCH transmission or by higher layer signaling.

Unlike UCI multiplexing as described in LTE specification where HARQ-ACK and RI/CRI are placed in different slot symbols and CSI is mapped in a time-first manner, differently than HARQ-ACK or RI/CRI, this disclosure considers that (a) mapping of different UCI types can be consecutive, first in frequency and then in time, (b) different UCI types can be mapped on a same slot symbol, (c) mapping is according to UCI type starting with HARQ-ACK symbols (when any), continuing with RI/CRI symbols (when any—can also be jointly coded with CSI), continuing with data symbols (when any) or CSI symbols of a first type (when any), and concluding with CSI symbols of a second type (when any) or data symbols (when any) Mapping of UCI coded modulation symbols or of data coded modulation excludes slot symbols, or SCs in slot symbols, used for DMRS transmission or for transmission of other signaling such as SRS. Remaining slot symbols or SCs are referred to as available slot symbols or as available SCs. As is subsequently described, a part of CSI and RI/CRI (CSI part 1) can also be jointly coded in a same codeword and remaining CSI (CSI part 2) can be coded in a second codeword.

UCI multiplexing in this disclosure considers that there is no ambiguity, with material probability, between a transmitting UE and a receiving gNB of whether or not a PUSCH transmission includes UCI multiplexing. Further, with an exception for CSI multiplexing as is subsequently discussed, there is also no ambiguity in a number of resources used for multiplexing each UCI type in a PUSCH transmission. Additionally, for a UCI type, such as for example HARQ-ACK or CSI, a gNB can configure a UE whether to multiplex the UCI type in a PUSCH transmission or to separately transmit the UCI type in a PUCCH.

When a UE is configured, by an UL DCI format or by higher layer signaling, to multiplex HARQ-ACK in a PUSCH transmission, there can be several mechanisms for the UE to determine a HARQ-ACK payload to multiplex in the PUSCH transmission. For example, an UL DCI format can include (a) DAI fields with operation as described in LTE specification for a TDD) system, including operation with carrier aggregation, or (b) an indication for the UE to multiplex HARQ-ACK information in the PUSCH where a HARQ-ACK payload is predetermined according to a codebook size, or (c) a direct indication of HARQ processes to be acknowledged by the UE. HARQ-ACK can be per TB, per group of CBs, or per CB. An RI/CRI payload is configured by higher layers and there is no ambiguity between a gNB and a UE regarding the RI/CRI payload.

When a UE determines a total CSI payload according to a RI value the UE transmits to a gNB either separately prior to or jointly simultaneously with the CSI transmission, there can be an ambiguity between the gNB and the U when the gNB fails to correctly detect the RI value. For example, a CSI payload (or CSI part 2) is typically larger when an associated rank is larger. A gNB can attempt to detect a CSI (or CSI part 2) codeword according to more than one hypothesis for an associated payload. F or example, when the gNB fails to detect a CSI (or CSI part 2) codeword according to a payload determined from a last detected value for RI (or CSI part 1 when it includes RI), the gNB can decode again the CSI (or CSI part 2) codeword assuming a different RI value corresponding to a different CSI (or CSI part 2) payload. However, when RI or CSI corresponds to multiple cells, a number of corresponding hypotheses increases due to the increased combinations for a possible CSI (or CSI part 2) payload. It is generally beneficial to minimize an impact on data detection when a gNB incorrectly detects a RI value and consequently incorrectly determines a CSI (or CSI part 2) payload multiplexed in a PUSCH transmission. This can be achieved, as is subsequently described, by making a starting position of each data CB in a PUSCH transmission independent of an actual CSI (or CSI part 2) payload.

A mapping of UCI coded modulation symbols to SCs can be defined to achieve at least a predetermined order of frequency diversity, such as an order of 2 or 4. Assuming a PUSCH transmission over a BW of $M_{sc}^{PUSCH}$ SCs, a number of $M_{sc}^{HARQ}$ SCs for transmission of HARQ-ACK coded modulation symbols, a number of $M_{sc}^{RI/CRI}$ SCs for transmission of RI/CRI coded modulation symbols, and a number of $M_{sc}^{CSI}$ SCs for transmission of CSI coded modulation symbols, the following can apply.

In one example, HARQ-ACK coded modulation symbols are first mapped to SCs of a PUSCH transmission. When $M_{sc}^{HARQ} \leq M_{sc}^{PUSCH}$ in a first slot symbol (and not used for DMRS transmission), HARQ-ACK transmission is in four groups of consecutive SCs to achieve a frequency diversity order of four. The first and second groups include $\lceil M_{sc}^{HARQ}/4 \rceil$ consecutive available SCs and the third and fourth groups include $\lfloor M_{sc}^{HARQ}/4 \rfloor$ consecutive available SCs (or the reverse), where $\lfloor \ \rfloor$ is the floor function that rounds a number to the previous higher integer. A first SC for the first, second, third, and fourth groups of SCs is determined as 0, $M_{sc}^{PUSCH}/4$, $M_{sc}^{PUSCH}/2$, and $3 \cdot M_{sc}^{PUSCH}/4$ (assuming that $M_{sc}^{PUSCH}$ is a multiple of 4). An offset can also be added to the above first SCs to shift their location. When $M_{sc}^{HARQ} \leq M_{sc}^{PUSCH}$, transmission of HARQ-ACK coded modulation symbols is in all available SCs of first $\lfloor M_{sc}^{HARQ}/M_{sc}^{PUSCH} \rfloor$ consecutive slot symbols that are not used for DMRS transmission and remaining $M_{sc,rem}^{HARQ} = M_{sc}^{HARQ} - \lfloor M_{sc}^{HARQ}/M_{sc}^{PUSCH} \rfloor \cdot M_{sc}^{PUSCH}$ HARQ-ACK coded modulation symbols are transmitted in a next slot symbol in a same manner as described for $M_{sc}^{HARQ} \leq M_{sc}^{PUSCH}$ by replacing $M_{sc}^{HARQ}$ with $M_{sc,rem}^{HARQ}$. The above can be generalized to any number of groups, other than four groups, such as two groups or eight groups for a corresponding frequency diversity order of two or eight.

For RI/CRI (or CSI part 1) transmission in a slot, when there is no HARQ-ACK transmission in the slot, the multiplexing of RI/CRI coded modulation symbols to SCs is as for HARQ-ACK transmission. When there is HARQ-ACK transmission in the slot, two options are considered. In a first option, transmission of RI/CRI (or CSI part 1) coded modulation symbols starts from a slot symbol that is not used for DMRS transmission and is after a last slot symbol used for transmission of HARQ-ACK coded modulation symbols, when any. The multiplexing of RI/CSI (or CSI part 1) coded modulation symbols to SCs is as for a HARQ-ACK transmission.

Figure 13:
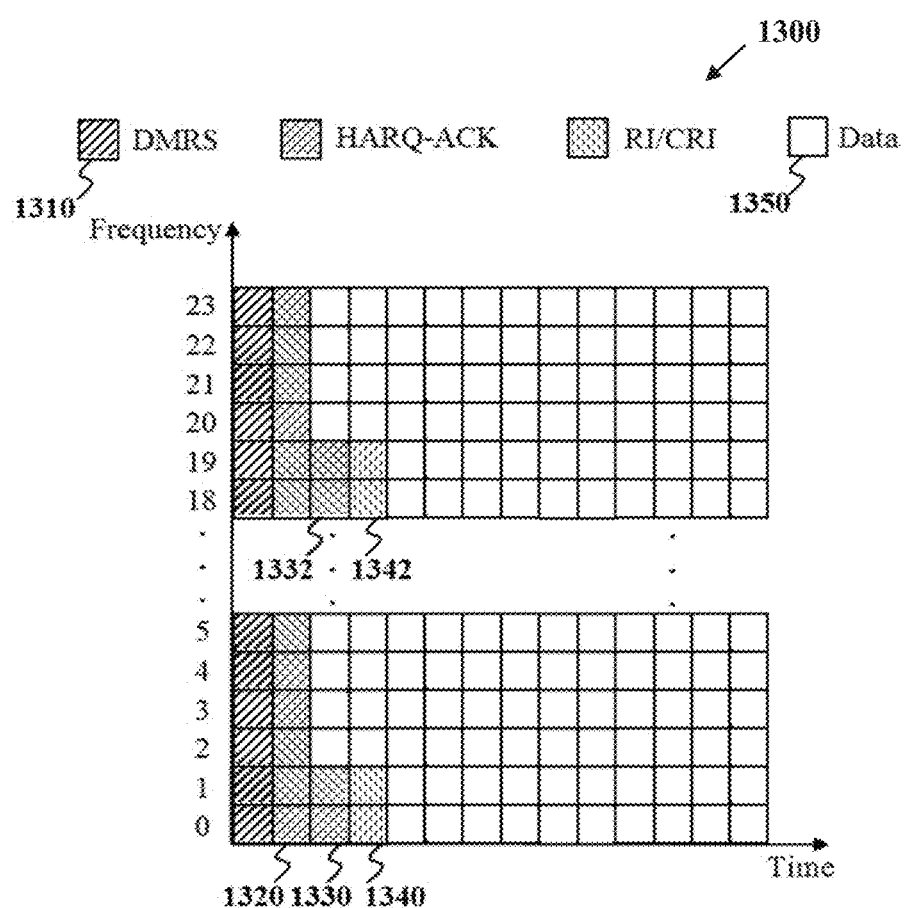
FIG. 13 illustrates an example mapping to sub-carriers on a PUSCH of coded modulation symbols conveying HARQ-ACK, RI/CRI (CSI part 1), and data according to this embodiments of the present disclosure.

FIG. 13 illustrates an example mapping 1300 to subcarriers on a PUSCH of coded modulation symbols conveying HARQ-ACK, RI/CRI (or CSI part 1), and data according to embodiments of the present disclosure. An embodiment of the mapping 1300 shown in FIG. 13 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1310 in a first slot symbol over the $M_{sc}^{PUSCH}=24$ SCs. The UE can also transmit DMRS in one or more other slot symbols. The UE requires $M_{sc}^{HARQ}=32$ SCs to transmit HARQ-ACK coded modulation symbols and $M_{sc}^{RI/CRI}=8$ SCs to transmit RI/CRI (or CSI part 1) coded modulation symbols. Since $M_{sc}^{HARQ}>M_{sc}^{PUSCH}$, the UE transmits HARQ-ACK coded modulation symbols on all $M_{sc}^{PUSCH}$ SCs in $\lfloor M_{sc}^{HARQ}/M_{sc}^{PUSCH} \rfloor=1$ slot symbol that is a second slot symbol 1320. The UE transmits HARQ-ACK coded modulation symbols on remaining $M_{sc,rem}^{HARQ}=M_{sc}^{HARQ}-\lfloor M_{sc}^{HARQ}/M_{sc}^{PUSCH} \rfloor \cdot M_{sc}^{PUSCH}=8$ SCs in a third slot symbol.

The $M_{sc,rem}^{HARQ}$ SCs are divided into four groups of $\lfloor M_{sc,rem}^{HARQ}/4 \rfloor = \lceil M_{sc,rem}^{HARQ}/4 \rceil = 2$ consecutive SCs where the first group starts from SC 0 1330, the second group starts from SC $M_{sc}^{PUSCH}/4=6$ (not shown), the third group starts from SC $M_{sc}^{PUSCH}/2=12$ (not shown), and the fourth group starts from SC $3 \cdot M_{sc}^{PUSCH}/4=18$ 1332. The UE transmits RI/CRI (or CSI part 1) coded modulation symbols in a fourth slot symbol over $M_{sc}^{RI/CRI}=8$ SCs 1340 that are divided into four groups of $\lfloor M_{sc}^{RI/CRI}/4 \rfloor = \lceil M_{sc}^{RI/CRI}/4 \rceil = 2$ consecutive SCs where the first group starts from SC 0 1340, the second group starts from SC $M_{sc}^{PUSCH}/4=6$ (not shown), the third group starts from SC $M_{sc}^{PUSCH}/2=12$ (not shown), and the fourth group starts from SC $3 \cdot M_{sc}^{PUSCH}/4=18$ 1342. The UE transmits data 1350 in remaining slot symbols.

In another example, RI/CRI (or CSI part 1) transmission starts from a last slot symbol used for transmission of HARQ-ACK coded modulation symbols when there are available SCs in that slot symbol. When RI/CRI (or CSI part 1) coded modulation symbols can be transmitted in a last slot symbol used for transmission of HARQ-ACK coded modulation symbols, when any, that is when $M_{sc}^{HARQ} - \lfloor M_{sc}^{HARQ}/M_{sc}^{PUSCH} \rfloor \cdot M_{sc}^{PUSCH} + M_{sc}^{RI/CRI} \leq M_{sc}^{PUSCH}$, there are again four groups of consecutive SCs for RI/CRI transmission, where a first SC for each RI/CRI SC group is after a last SC for a HARQ-ACK SC group with a same index. When $M_{sc}^{HARQ} - \lfloor M_{sc}^{HARQ}/M_{sc}^{PUSCH} \rfloor \cdot M_{sc}^{PUSCH} + M_{sc}^{RI/CRI} \leq M_{sc}^{PUSCH}$ a number of $M_{sc,0}^{RI/CRI} = M_{sc}^{PUSCH} - M_{sc}^{HARQ} - \lfloor M_{sc}^{HARQ}/M_{sc}^{PUSCH} \rfloor \cdot M_{sc}^{PUSCH}$ remaining sub-carries in the last slot symbol for HARQ-ACK transmission are used for RI/CRI (or CSI part 1) transmission and remaining SCs are determined as for the first option by using $M_{sc}^{RI/CRI} - M_{sc,0}^{RI/CRI}$, instead of $M_{sc}^{RI/CRI}$, for a number of SCs needed to multiplex RI/CRI coded modulation symbols.

Figure 14:
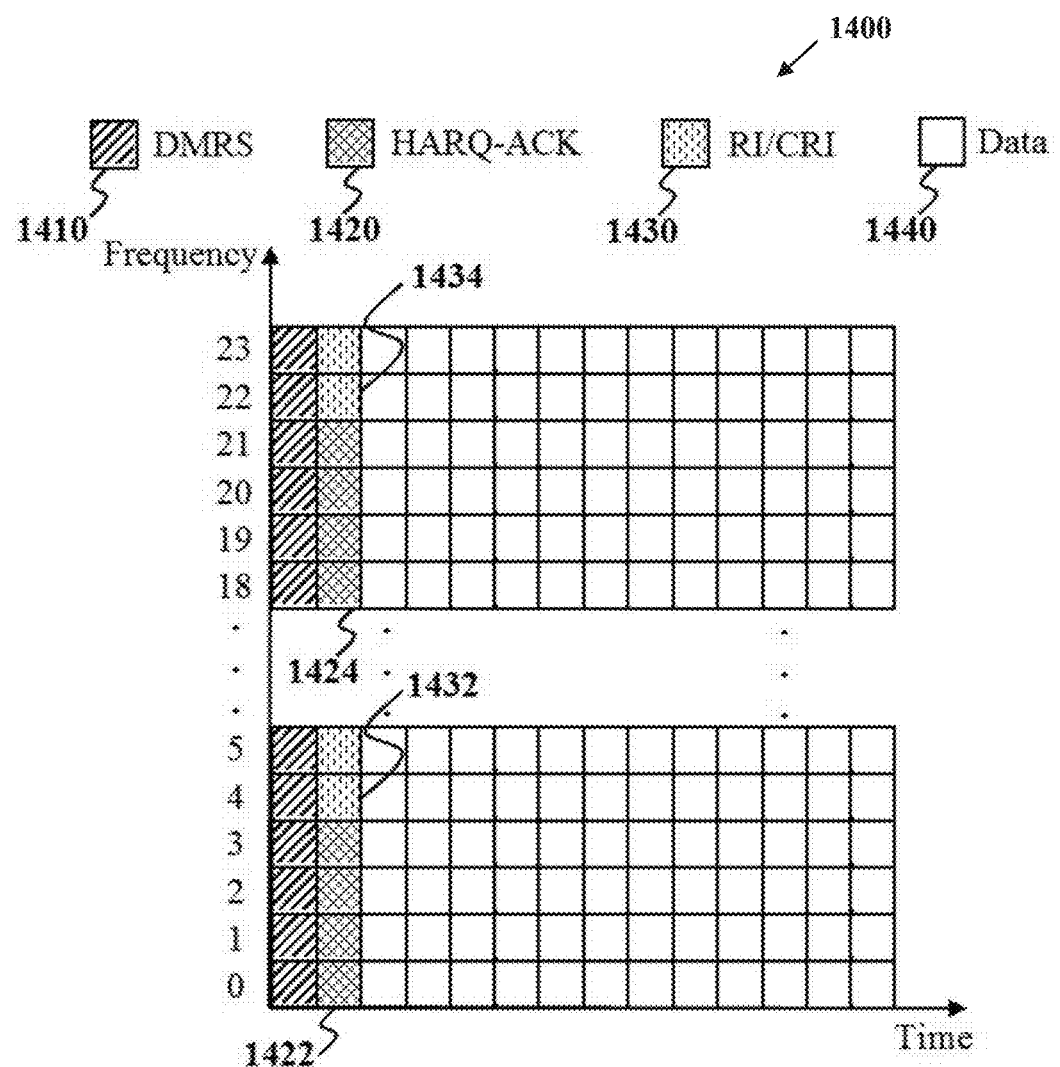
FIG. 14 illustrates an example mapping to sub-carriers on a PUSCH of coded modulation symbols conveying HARQ-ACK, RI/CRI (CSI part 1), and data according to this embodiments of the present disclosure.

FIG. 14 illustrates an example mapping 1400 to sub-carriers on a PUSCH of coded modulation symbols conveying HARQ-ACK, RI/CRI (or CSI part 1), and data according to embodiments of the present disclosure. An embodiment of the mapping 1400 shown in FIG. 14 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1410 in a first slot symbol over the $M_{sc}^{PUSCH}=24$ SCs. The UE can also transmit DMRS in one or more other slot symbols. The UE requires $M_{sc}^{HARQ}=16$ SCs to transmit HARQ-ACK coded modulation symbols and $M_{sc}^{RI/CRI}=8$ to transmit RI/CRI (or CSI part 1) coded modulation symbols. Since $M_{sc}^{HARQ} - \lfloor M_{sc}^{HARQ}/M_{sc}^{PUSCH} \rfloor \cdot M_{sc}^{PUSCH} + M_{sc}^{RI/CRI}=16+0 \cdot 24+8 = M_{sc}^{PUSCH}$, the UE transmits all HARQ-ACK and RI/CRI (or CSI part 1) coded modulation symbols in a second slot symbol.

The UE transmits HARQ-ACK coded modulation symbols over $M_{sc}^{HARQ}=16$ SCs 1420 that are divided into four groups of $\lfloor M_{sc}^{HARQ}/4 \rfloor = \lceil M_{sc}^{HARQ}/4 \rceil = 4$ consecutive SCs where the first group starts from SC 0 1422, the second group starts from SC $M_{sc}^{PUSCH}/4=6$ (not shown), the third group starts from SC $M_{sc}^{PUSCH}/2=12$ (not shown), and the fourth group starts from SC $3 \cdot M_{sc}^{PUSCH}/4=18$ 1424. The UE transmits RI/CRI (or CSI part 1) coded modulation symbols over $M_{sc}^{RI/CRI}=8$ SCs 1430 that are divided into four groups of $\lfloor M_{sc}^{RI/CRI}/4 \rfloor = \lceil M_{sc}^{RI/CRI}/4 \rceil = 2$ consecutive SCs where the first group starts from SC $\lfloor M_{sc}^{HARQ}/4 \rfloor = 4$ 1432, the second group starts from SC $M_{sc}^{PUSCH}/4 + \lfloor M_{sc}^{HARQ}/4 \rfloor = 10$ (not shown), the third group starts from SC $M_{sc}^{PUSCH}/2 + \lfloor M_{sc}^{HARQ}/4 \rfloor = 16$ (not shown), and the fourth group starts from SC $3 \cdot M_{sc}^{PUSCH}/4 + \lfloor M_{sc}^{HARQ}/4 \rfloor = 22$ 1434. The UE transmits data 1440 in remaining slot symbols.

In yet another example, a UE transmits UCI coded modulation symbols in a PUSCH across all available slot symbols where in a first number of available slot symbols, $N_{symb}^1$, the transmission is at (or near to) one end of a PUSCH transmission BW and in a second number of available slot symbols, $N_{symb}^2$, the transmission is at (or near to) the other end of the PUSCH transmission BW. For a total number of $N_{symb}^{PUSCH}$ available symbols, the first number can be the first $\lceil N_{symb}^{PUSCH}/2 \rceil$ available slot symbols and the second number can be the last $\lfloor N_{symb}^{PUSCH}/2 \rfloor$ available slot symbols (or the reverse). Instead of using a total number of available symbols for transmission, a number of slot symbols $N_{slot}$ can be used and the first number of slot symbols can be the number of available symbols in the first $\lceil N_{slot}/2 \rceil$ slot symbols and the second number of slot symbols can be the number of available symbols in the last $\lfloor N_{slot}/2 \rfloor$ slot symbols. For example, when $N_{slot}=14$ and when there are 5 available slot symbols for transmission in the first $\lceil N_{slot}/2 \rceil = 7$ slot symbols, then $N_{symb}^1=5$ while when there are 7 available slot symbols for transmission in the second $\lfloor N_{slot}/2 \rfloor = 7$ symbols, then $N_{symb}^2 = 7$.

When HARQ-ACK coded modulation symbols require $M_{sc}^{HARQ}$ SCs for transmission, a first $\lceil M_{sc}^{HARQ}/2 \rceil$ SCs are placed in the first number $N_{symb}^1$ of slot symbols, starting from a lowest SC index and a first available symbol from the $N_{symb}^1$ slot symbols, serially continuing across available symbols from the $N_{symb}^1$ slot symbols, and then continuing from a next higher SC index, in a time-first, frequency-second mapping. A last HARQ-ACK coded modulation symbol is mapped on SC with index $\lceil \lceil M_{sc}^{HARQ}/2 \rceil / N_{symb}^1 \rceil - 1$ and on symbol $\lceil M_{sc}^{HARQ}/2 \rceil \bmod (N_{symb}^1) - 1$ from the $N_{symb}^1$ slot symbols. A second $\lfloor M_{sc}^{HARQ}/2 \rfloor$ SCs are placed in the second number $N_{symb}^2$ of slot symbols, starting from a highest SC index and a first available symbol from the $N_{symb}^2$ slot symbols, serially continuing across available symbols from the $N_{symb}^2$ slot symbols, and then continuing from a next lower SC index, in a time-first, frequency-second mapping. A last HARQ-ACK coded modulation symbol is mapped on SC with index $M_{sc}^{PUSCH} - \lceil \lfloor M_{sc}^{HARQ}/2 \rfloor / N_{symb}^2 \rceil - 1$ and on symbol $\lfloor M_{sc}^{HARQ}/2 \rfloor \bmod (N_{symb}^2) - 1$ from the $N_{symb}^2$ slot symbols. The order of the mapping to the two ends of a PUSCH transmission BW can also be reversed.

RI/CRI (or CSI part 1) coded modulation symbols can be mapped to respective $M_{sc}^{RI/CRI}$ SCs for transmission in a same manner as HARQ-ACK coded modulation symbols. When a UE does not transmit HARQ-ACK, a mapping for RI/CRI coded modulation symbols is as for HARQ-ACK coded modulation symbols. When the UE transmits HARQ-ACK, in a first option, a first of the $\lceil M_{sc}^{RI/CRI}/2 \rceil$ SCs is a SC with index $\lceil \lceil M_{sc}^{HARQ}/2 \rceil / N_{symb}^1 \rceil - 1$ in symbol $\lceil M_{sc}^{HARQ}/2 \rceil \bmod (N_{symb}^1)$ from the $N_{symb}^1$ slot symbols when $\lceil M_{sc}^{HARQ}/2 \rceil \bmod (N_{symb}^1) > 0$ or is a SC with index $\lceil\lceil M_{sc}^{HARQ}/2\rceil/N_{symb}^{1}\rceil$ in symbol 0 from the $N_{symb}^{1}$ slot symbols. A first of the $\lfloor M_{sc}^{RI/CRI}/2\rfloor$ SCs is a SC with index $M_{sc}^{PUSCH}-\lceil\lfloor M_{sc}^{HARQ}/2\rfloor/N_{symb}^{2}\rceil-1$ in symbol $\lfloor M_{sc}^{HARQ}/2\rfloor\mod(N_{symb}^{2})$ from the $N_{symb}^{2}$ slot symbols when $\lfloor M_{sc}^{HARQ}/2\rfloor\mod(N_{symb}^{2})>0$ or is a SC with index $M_{sc}^{PUSCH}-\lceil\lfloor M_{sc}^{HARQ}/2\rfloor/N_{symb}^{2}\rceil$ in symbol 0 from the $N_{symb}^{2}$ slot symbols.

In one embodiment, a mapping of SCs for transmission of RI/CRI (or CSI part 1) coded modulation symbols is as for SCs for transmission of HARQ-ACK coded modulation symbols with the exception that a first SC of the $\lceil M_{sc}^{RI/CRI}/2\rceil$ SCs is SC $\lceil\lceil M_{sc}^{HARQ}/2\rceil/N_{symb}^{1}\rceil$ and a first SC of the $\lfloor M_{sc}^{RI/CRI}/2\rfloor$ SCs is SC $M_{sc}^{PUSCH}-\lceil\lfloor M_{sc}^{HARQ}/2\rfloor/N_{symb}^{2}\rceil-1$.

Figure 15:
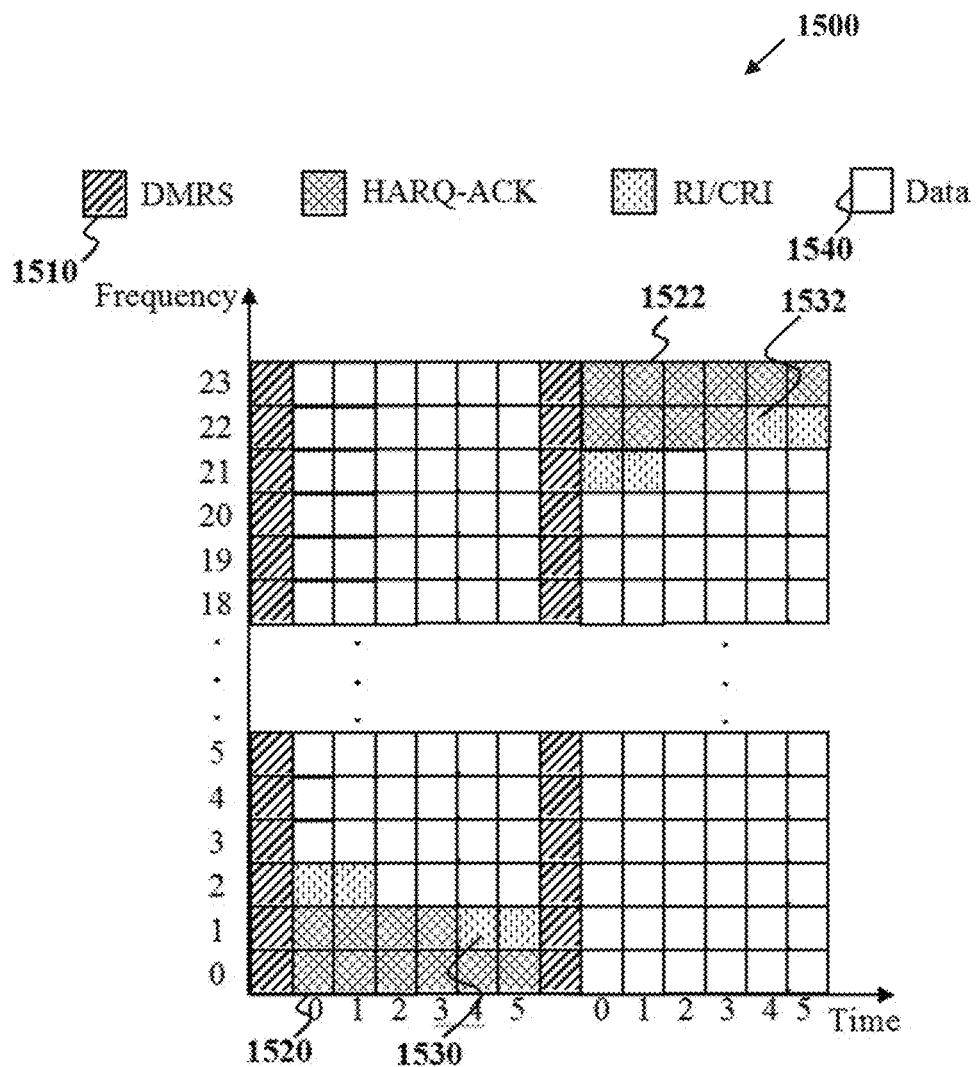
FIG. 15 illustrates an example mapping to PUSCH sub-carriers of coded modulation symbols conveying HARQ-ACK, RI/CRI (CSI part 1), and data according to this embodiments of the present disclosure.

FIG. 15 illustrates an example mapping 1500 to PUSCH sub-carriers of coded modulation symbols conveying HARQ-ACK, RI/CRI (CSI part 1), and data according to embodiments of the present disclosure. An embodiment of the mapping 1500 shown in FIG. 15 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1510 in a first slot symbol and in an eighth symbol over the $M_{sc}^{PUSCH}=24$ SCs. The UE requires $M_{sc}^{HARQ}=20$ SCs to transmit HARQ-ACK coded modulation symbols and $M_{sc}^{RI/CRI}=8$ SCs to transmit RI/CRI (or CSI part 1) coded modulation symbols. The UE transmits HARQ-ACK coded modulation symbols over $\lceil M_{sc}^{HARQ}/2\rceil=10$ SCs 1520 in $N_{symb}^{1}=6$ available slot symbols using a time-first mapping where a first HARQ-ACK coded modulation symbol is mapped on SC with index 0 and on symbol 0 and a last HARQ-ACK coded modulation symbol is mapped on SC with index $\lceil\lceil M_{sc}^{HARQ}/2\rceil/N_{symb}^{1}\rceil-1=1$ and on symbol $\lceil M_{sc}^{HARQ}/2\rceil\mod(N_{symb}^{1})-1=3$.

The UE transmits HARQ-ACK coded modulation symbols over $\lfloor M_{sc}^{HARQ}/2\rfloor=10$ SCs 1522 in $N_{symb}^{2}=6$ available slot symbols using a time-first mapping where a first HARQ-ACK coded modulation symbol is mapped on SC with index $M_{sc}^{PUSCH}-1=23$ and on symbol 0 and a last HARQ-ACK coded modulation symbol is mapped on SC with index $M_{sc}^{PUSCH}-\lceil\lfloor M_{sc}^{HARQ}/2\rfloor/N_{symb}^{2}\rceil=22$ and on symbol $\lfloor M_{sc}^{HARQ}/2\rfloor\mod(N_{symb}^{2})-1=3$. The UE transmits RI/CRI (or CSI part 1) coded modulation symbols over $\lceil M_{sc}^{RI/CRI}/2\rceil=4$ SCs 1230 in $N_{symb}^{1}=6$ available slot symbols using a time-first mapping where a first RI/CRI coded modulation symbol is mapped on SC with index $\lceil\lceil M_{sc}^{HARQ}/2\rceil/N_{symb}^{1}\rceil-1$ and on symbol $\lceil M_{sc}^{HARQ}/2\rceil\mod(N_{symb}^{1})=4$.

The UE transmits RI/CSI (or CSI part 1) coded modulation symbols over $\lfloor M_{sc}^{RI/CRI}/2\rfloor=4$ SCs 1532 in $N_{symb}^{2}=6$ available slot symbols using a time-first mapping where a first RI/CRI coded modulation symbol is mapped on SC with index $M_{sc}^{PUSCH}-\lceil\lfloor M_{sc}^{HARQ}/2\rfloor/N_{symb}^{2}\rceil-1=9$ and on symbol $\lfloor M_{sc}^{HARQ}/2\rfloor\mod(N_{symb}^{2})=4$. In remaining SCs and available symbols, the UE transmits data 1540 or other UCI such as CSI.

Figure 16:
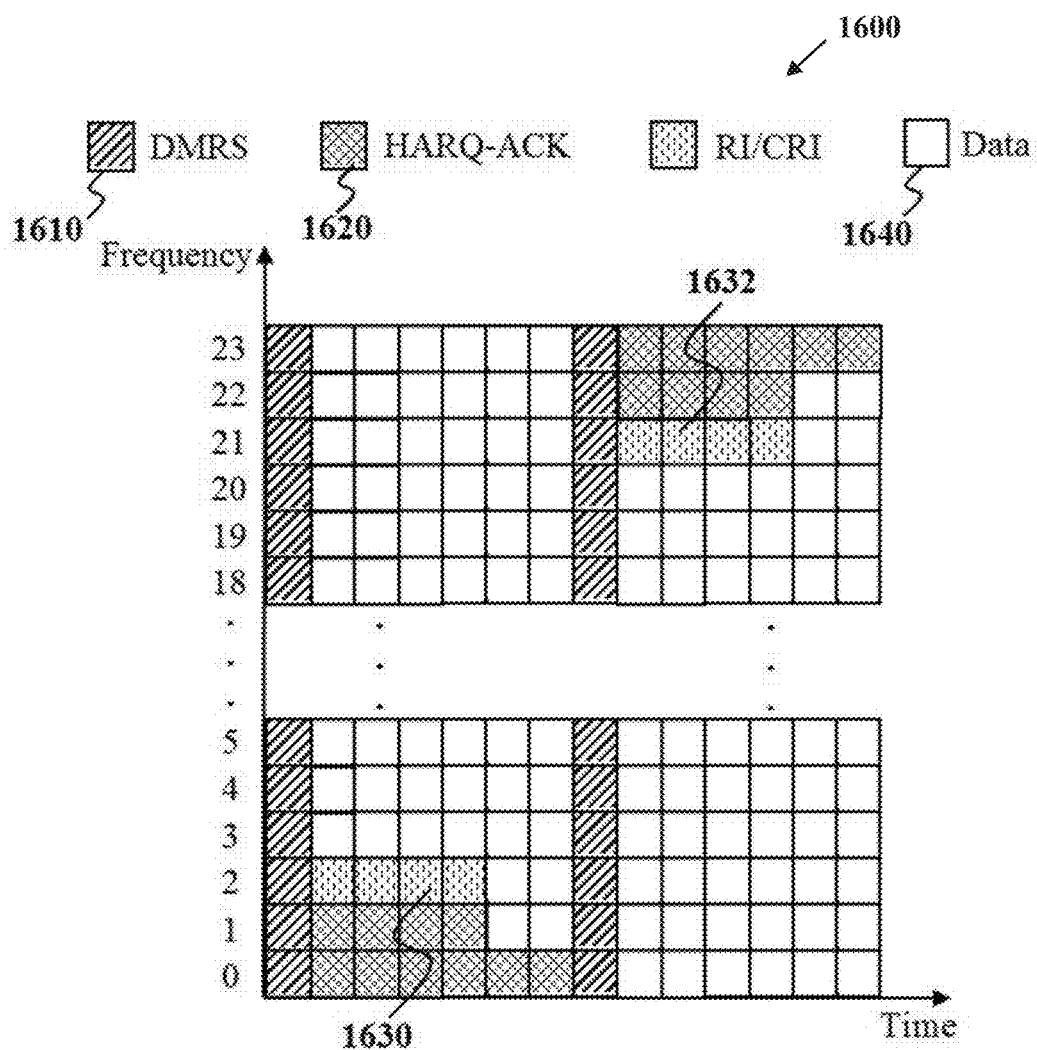
FIG. 16 illustrates an example mapping to PUSCH sub-carriers of coded modulation symbols conveying HARQ-ACK, RI/CRI (CSI part 1), and data according to this embodiments of the present disclosure.

FIG. 16 illustrates an example mapping 1600 to PUSCH sub-carriers of coded modulation symbols conveying HARQ-ACK, RI/CRI (CSI part 1), and data according to embodiments of the present disclosure. An embodiment of the mapping 1600 shown in FIG. 16 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1610 in a first slot symbol and in an eighth symbol over the $M_{sc}^{PUSCH}=24$ SCs. The UE requires $M_{sc}^{HARQ}=20$ SCs to transmit HARQ-ACK coded modulation symbols. A mapping to SCs is as described in FIG. 15 and is not repeated for brevity. The UE requires $M_{sc}^{RI/CRI}=8$ SCs to transmit RI/CRI (or CSI part 1) coded modulation symbols. The UE transmits RI/CRI (or CSI part 1) coded modulation symbols in a same manner as HARQ-ACK coded modulation symbols.

The UE transmits RI/CRI (or CSI part 1) coded modulation symbols over $\lceil M_{sc}^{RI/CRI}/2\rceil=4$ SCs 1630 in $N_{symb}^{1}=6$ available slot symbols using a time-first mapping where a first RI/CRI coded modulation symbol is mapped on SC with index $\lceil\lceil M_{sc}^{HARQ}/2\rceil/N_{symb}^{1}\rceil=2$ and on symbol 0 and the UE transmits RI/CRI coded modulation symbols over $\lfloor M_{sc}^{RI/CRI}/2\rfloor=4$ SCs 1632 in $N_{symb}^{2}=6$ available slot symbols using a time-first mapping where a first RI/CRI coded modulation symbol is mapped on SC with index $M_{sc}^{PUSCH}-\lceil\lfloor M_{sc}^{HARQ}/2\rfloor/N_{symb}^{2}\rceil-1=21$ and on symbol 0. In remaining SCs and available symbols, the UE transmits data 1640 or other UCI such as CSI.

UCI coded modulation symbols in a PUSCH can also be simultaneously mapped across all available $N_{symb}^{PUSCH}$ slot symbols. When HARQ-ACK coded modulation symbols require $M_{sc}^{HARQ}$ SCs for transmission, a first $\lceil M_{sc}^{HARQ}/2\rceil$ SCs are placed starting from a lowest SC index (index 0) and a first available slot symbol (index 0), serially continuing across available $N_{symb}^{PUSCH}$ slots symbols, and then continuing from the next higher SC index, in a time-first, frequency-second mapping. A last HARQ-ACK coded modulation symbol is mapped on SC with index $\lceil\lceil M_{sc}^{HARQ}/2\rceil/N_{symb}^{PUSCH}\rceil-1$ and on symbol $\lceil M_{sc}^{HARQ}/2\rceil\mod(N_{symb}^{PUSCH})-1$.

A second $\lfloor M_{sc}^{HARQ}/2\rfloor$ SCs are placed starting from the highest SC index (index $M_{sc}^{PUSCH}-1$) and a first available slot symbol (index 0), serially continuing across available $N_{symb}^{PUSCH}$ slot symbols, and then continuing from the next lower SC index, in a time-first, frequency-second mapping. A last HARQ-ACK coded modulation symbol is mapped on SC with index $M_{sc}^{PUSCH}-\lceil\lfloor M_{sc}^{HARQ}/2\rfloor/N_{symb}^{PUSCH}\rceil-1$ and on symbol $\lfloor M_{sc}^{HARQ}/2\rfloor\mod(N_{symb}^{PUSH})-1$. The order of the mapping to the two ends of a PUSCH transmission BW can also be reversed and a mapping of HARQ-ACK modulation symbols can be interleaved across SCs at the two ends of the PUSCH transmission BW (in order to obtained a frequency-first mapping according to the previous condition that this disclosure considers (a) mapping of different UCI types can be consecutive, first in frequency and then in time).

RI/CRI (or CSI part 1) coded modulation symbols can be mapped to respective $M_{sc}^{RI/CRI}$ SCs in a same manner as HARQ-ACK coded modulation symbols. When a UE does not transmit HARQ-ACK, a mapping to SCs for RI/CRI (or CSI part 1) coded modulation symbols is as for HARQ-ACK coded modulation symbols. When the UE transmits HARQ-ACK, in a first option, a first of the $\lceil M_{sc}^{RI/CRI}/2\rceil$ SCs is a SC with index $\lceil\lceil M_{sc}^{HARQ}/2\rceil/N_{symb}^{PUSCH}\rceil-1$ in symbol $\lceil M_{sc}^{HARQ}/2\rceil\mod(N_{symb}^{PUSCH})$ when $\lceil M_{sc}^{HARQ}/2\rceil\mod(N_{symb}^{PUSCH})>0$ or is a SC with index $\lceil\lceil M_{sc}^{HARQ}/2\rceil/N_{symb}^{PUSCH}\rceil$ in symbol 0. A first of the $\lfloor M_{sc}^{RI/CRI}/2\rfloor$ SCs is a SC with index $M_{sc}^{PUSCH}-\lceil\lfloor M_{sc}^{HARQ}/2\rfloor/N_{symb}^{PUSCH}\rceil-1$ in symbol $\lfloor M_{sc}^{HARQ}/2\rfloor\mod(N_{symb}^{PUSCH})$ when $\lfloor M_{sc}^{HARQ}/2\rfloor\mod(N_{symb}^{PUSCH})>0$ or is a SC with index $M_{sc}^{PUSCH}-\lceil\lfloor M_{sc}^{HARQ}/2\rfloor/N_{symb}^{PUSCH}\rceil$ in symbol 0. In a second option, a mapping of the $M_{sc}^{RI/CRI}$ SCs is as for the SCs for transmission of HARQ-ACK coded modulation symbols with the exception that a first SC of the $\lceil M_{sc}^{RI/CRI}/2\rceil$ SCs is SC $\lceil\lceil M_{sc}^{HARQ}/2\rceil/N_{symb}^{PUSCH}\rceil$ and a first SC of the $\lfloor M_{sc}^{RI/}$ $_{CRI}/2\rfloor$ SCs is SC $M_{sc}^{PUSCH} - \lceil \lfloor M_{sc}^{HARQ}/2 \rfloor / N_{symb}^{PUSCH} \rceil - 1$, where mod is the modulo function defined as $x \bmod(y) = x - y\lfloor x/y \rfloor$.

Figure 17:
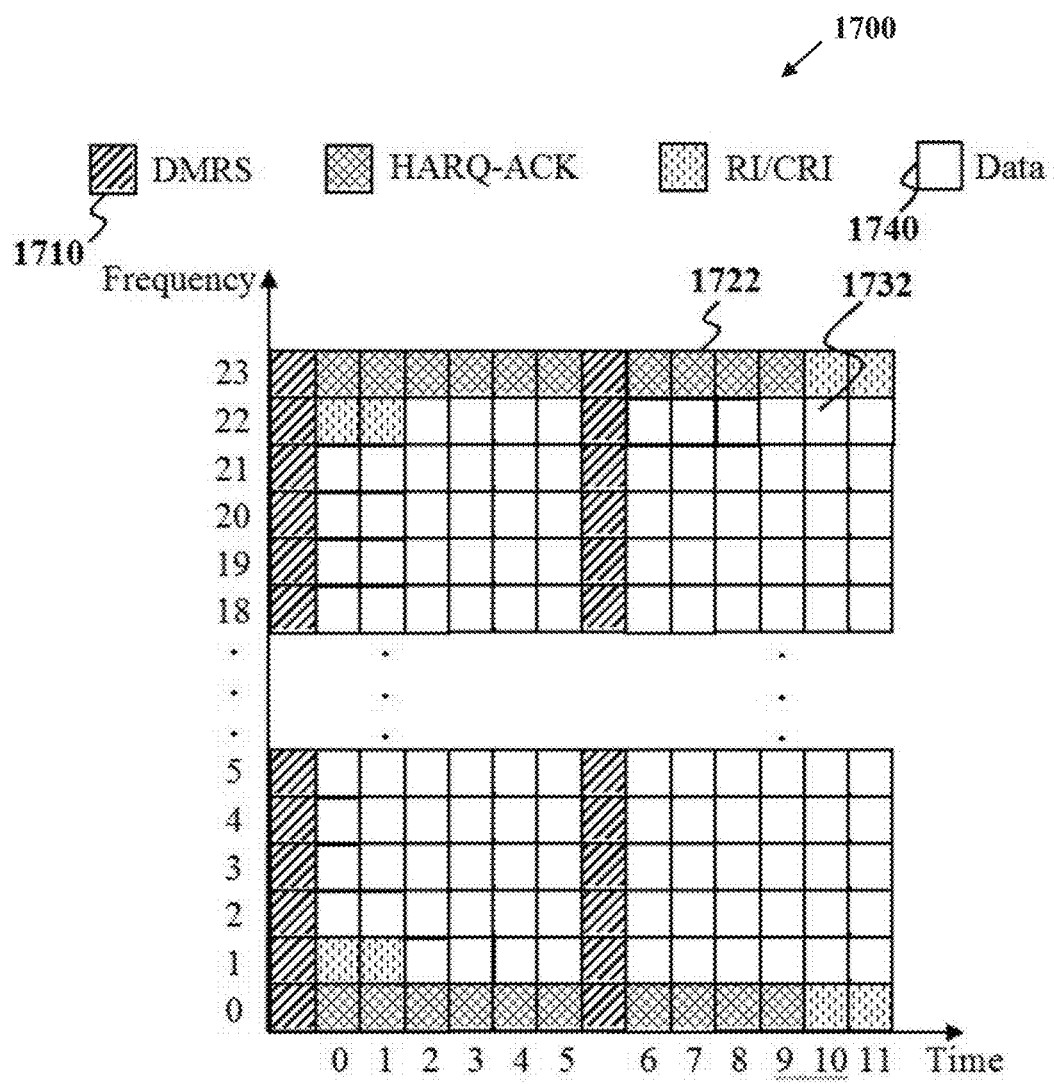
FIG. 17 illustrates an example mapping on PUSCH sub-carriers of coded modulation symbols conveying HARQ-ACK, RI/CRI (CSI part 1), and data according to the first option for mapping UCI coded modulation symbols across available PUSCH slot symbols according to this embodiments of the present disclosure.

FIG. 17 illustrates an example mapping 1700 on PUSCH sub-carriers of coded modulation symbols conveying HARQ-ACK, RI/CRI (CSI part 1), and data according to the first option for mapping UCI coded modulation symbols across all available PUSCH slot symbols according to embodiments of the present disclosure. An embodiment of the mapping 1700 shown in FIG. 17 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1710 in a first slot symbol and in an eighth symbol over the $M_{sc}^{PUSCH}=24$ SCs. The UE requires $M_{sc}^{HARQ}=20$ SCs to transmit HARQ-ACK coded modulation symbols and $M_{sc}^{RI/CRI}=8$ SCs to transmit RI/CRI (or CSI part 1) coded modulation symbols. The UE transmits HARQ-ACK coded modulation symbols over $\lceil M_{sc}^{HARQ}/2 \rceil = 10$ SCs 1720 in the $N_{symb}^{PUSCH}$ available slot symbols using a time-first mapping where a first HARQ-ACK coded modulation symbol is mapped on SC with index 0 and on symbol 0 and a last HARQ-ACK coded modulation symbol is mapped on SC with index $\lceil \lceil M_{sc}^{HARQ}/2 \rceil / N_{symb}^{PUSCH} \rceil - 1 = 0$ and on symbol $\lceil M_{sc}^{HARQ}/2 \rceil \bmod(N_{symb}^{PUSCH}) - 1 = 9$.

The UE transmits HARQ-ACK coded modulation symbols over $\lfloor M_{sc}^{HARQ}/2 \rfloor = 10$ SCs 1722 in the $N_{symb}^{PUSCH}$ available slot symbols using a time-first mapping where a first HARQ-ACK coded modulation symbol is mapped on SC with index $M_{sc}^{PUSCH}-1=23$ and on symbol 0 and a last HARQ-ACK coded modulation symbol is mapped on SC with index $M_{sc}^{PUSCH} - \lceil \lfloor M_{sc}^{HARQ}/2 \rfloor / N_{symb}^{PUSCH} \rceil = 23$ and on symbol $\lfloor M_{sc}^{HARQ}/2 \rfloor \bmod(N_{symb}^{PUSCH}) - 1 = 9$. The UE transmits RI/CRI (or CSI part 1) coded modulation symbols over $\lceil M_{RI/CRI}/2 \rceil = 4$ SCs 1730 using a time-first mapping where a first RI/CRI (or CSI part 1) coded modulation symbol is mapped on SC with index $\lceil \lceil M_{sc}^{HARQ}/2 \rceil / N_{symb}^{PUSCH} \rceil - 1 = 0$ and on symbol $\lceil M_{sc}^{HARQ}/2 \rceil \bmod(N_{symb}^{PUSCH}) = 10$.

The UE transmits RI/CSI (or CSI part 1) coded modulation symbols over $\lfloor M_{sc}^{RI/CRI}/2 \rfloor = 4$ SCs 1732 using a time-first mapping where a first RI/CRI (or CSI part 1) coded modulation symbol is mapped on SC with index $M_{sc}^{PUSCH} - \lceil \lfloor M_{sc}^{HARQ}/2 \rfloor / N_{symb}^{PUSCH} \rceil = 23$ and on symbol $\lfloor M_{sc}^{HARQ}/2 \rfloor \bmod(N_{symb}^{PUSCH}) = 10$. In remaining SCs and available symbols, the UE transmits data 1740 or other UCI such as CSI. FIG. 17 is an equivalent of FIG. 15 with the UCI transmitted across all available PUSCH symbols at the two ends of a PUSCH transmission BW. A similar structure can apply as an equivalent of FIG. 16 and a respective description is omitted for brevity.

An advantage of mapping UCI as in FIG. 16 or FIG. 17 is that an impact of UCI multiplexing on data code-blocks is uniformly distributed and, when possible or when needed, power boosting can apply to UCI transmissions as the UCI transmissions are distributed over all available PUSCH symbols. In case of QAM modulation, a power scaling factor for UCI transmissions can be signaled through a respective field in a DCI format scheduling the PUSCH transmission.

For CSI (or CSI part 2) multiplexing in a PUSCH transmission, a main issue is to avoid an error case resulting from a gNB incorrectly detecting a RI that is associated with the CSI (or CSI part 2). A UE can transmit a RI in a same slot as a CSI (or CSI part 2) or in a previous slot. When the UE transmits a smaller CSI (or CSI part 2) payload than the gNB expects, the gNB detects data CBs over a smaller number of SCs than the UE uses to transmit the data CBs. A consequence is that the gNB assumes an incorrect rate matching for the CBs and this leads to HARQ buffer corruption at the gNB. When the UE transmits a larger CSI (or CSI part 2) payload than the gNB expects, the gNB detects data CBs over a larger number of SCs than the LE uses to transmit the data CBs. A consequence is that the gNB either assumes an incorrect starting SC for the transmission of data CBs, leading to full HARQ buffer corruption, or includes in reception of data CBs SCs that the UE uses to transmit CSI (or CSI part 2) leading to partial HARQ buffer corruption. When an RI error occurs, the gNB also incorrectly receives an associated CSI (or CSI part 2) unless the gNB decodes the CSI (or CSI part 2) according to multiple hypotheses for the CSI (or CSI part 2) payload.

In one embodiment, to avoid error cases for multiplexing CSI (or CSI part 2) and data in a PUSCH that are caused by incorrect RI detection at a gNB, a reference CSI (or CSI part 2) payload is defined or configured by the gNB to a UE and a total number of coded modulation symbols for CSI multiplexing is determined relative to the reference CSI (CSI part 1) payload. For example, a reference CSI (CSI part 1) payload, $O_{CSI,ref}$, can be defined relative to rank 1 CSI reporting, or relative to rank 2 CSI reporting, or can be configured to the LE from the gNB by higher layer signaling. Then, RI/CRI and the reference CSI payload, such as for rank 1 CSI, can be jointly encoded. It is also possible to define or configure a reference MCS instead of a reference CSI payload.

In determining a number of coded modulation symbols for CSI multiplexing in a PUSCH, for example as in Equation 2, the UE applies the reference CSI payload $O_{CSI,ref}$. The gNB can indicate, jointly or separately in an associated UL DCI format, a first $\beta_{offset}^{CSI}$ value, $\beta_{offset,1}^{CSI}$, for CSI payload of $O_{CSI,ref}$ and a second $\beta_{offset}^{CSI}$ value, $\beta_{offset,2}^{CSI}$, for CSI payload of $O_{CSI}$, such as for rank 2 CQI and PMI. For example, $\beta_{offset,2}^{CSI}$ can approximate $\beta_{offset,1}^{CSI} \cdot O_{CSI}/O_{CSI,ref}$. The indicated $\beta_{offset}^{CSI}$ and $\beta_{offset,2}^{CSI}$ values can target a respective CSI BLER as set by the gNB. A UE can separately encode a $O_{CSI,ref}$ payload and a $O_{CSI} - O_{CSI,ref}$ payload (when not zero).

When only $\beta_{offset}^{CSI}$ is configured by a gNB, the indicated $\beta_{offset}^{CSI}$ value is likely to provide a number of CSI coded modulation symbols that are either smaller or larger than necessary to achieve the target BLER for the actual CSI payload $O_{CSI}$. In the former case, depending on the relative difference between the actual CSI payload transmitted from the UE and the CSI payload determined by the gNB, the actual CSI BLER may be larger than the target CSI BLER and there may be more resources available for data transmission. In the latter case, the actual CSI BLER may be smaller than the target CSI BLER and there may be fewer resources available for data transmission.

For example, when the $\beta_{offset}^{CSI}$ is set considering a CSI payload of $O_{CSI} > O_{CSI,ref}$ CSI bits such as for rank 2 CQI and for PMI, and the UE reports CQI with payload $O_{CSI,ref}$ such as for rank 1 CQI (and RI/CRI), a resulting number of coded modulation symbols can be larger than necessary (code rate lower than necessary) to achieve a target BLER. For example, when the $\beta_{offset}^{CSI}$ is set considering a CSI payload of $O_{CSI,ref}$ bits such as for rank 1 CQI and the UE reports CSI with total payload $O_{CSI} > O_{CSI,ref}$ such as for rank 2 CQI and for PMI, by separately encoding $O_{CSI} - O_{CSI,ref}$ CSI bits in addition to the $O_{CSI,ref}$ CSI bits, a resulting number of coded modulation symbols can be smaller than necessary (code rate larger than necessary) to achieve a target BLER.

Similar arguments apply when both $\beta_{offset}^{CSI}$ and $\beta_{offset,2}^{CSI}$ values are configured by the gNB, either by higher layers or by a DCI format scheduling an associated PUSCH transmission, where $\beta_{offset}^{CSI}$ can be set for the $O_{CSI,ref}$ payload and $\beta_{offset,2}^{CSI}$ can be set relative to the $O_{CSI,ref}$ payload, or relative to a (predetermined) $O_{CSI}-O_{CSI,ref}$ payload, or relative to another predetermined payload. Then, a resulting number of coded modulation symbols can be the expected one for the $O_{CSI,ref}$ payload (CSI part 1), for example for rank 1 CQI and RI/CRI, and can be larger or smaller than necessary for the $O_{CSI}-O_{CSI,ref}$ payload (CSI part 2), for example for rank 2 CQI and for PMI (the $O_{CSI,ref}$ payload is separately encoded than the $O_{CSI}-O_{CSI,ref}$). For example, when the UE reports rank 1 CQI and RI/CRI (CSI part 1), PUSCH resources reserved for multiplexing an $O_{CSI}-O_{CSI,ref}$ payload (CSI part 2) do not convey any information. In either case, there is no HARQ buffer corruption and there are no material consequences for CSI reception or for data reception.

Figure 18:
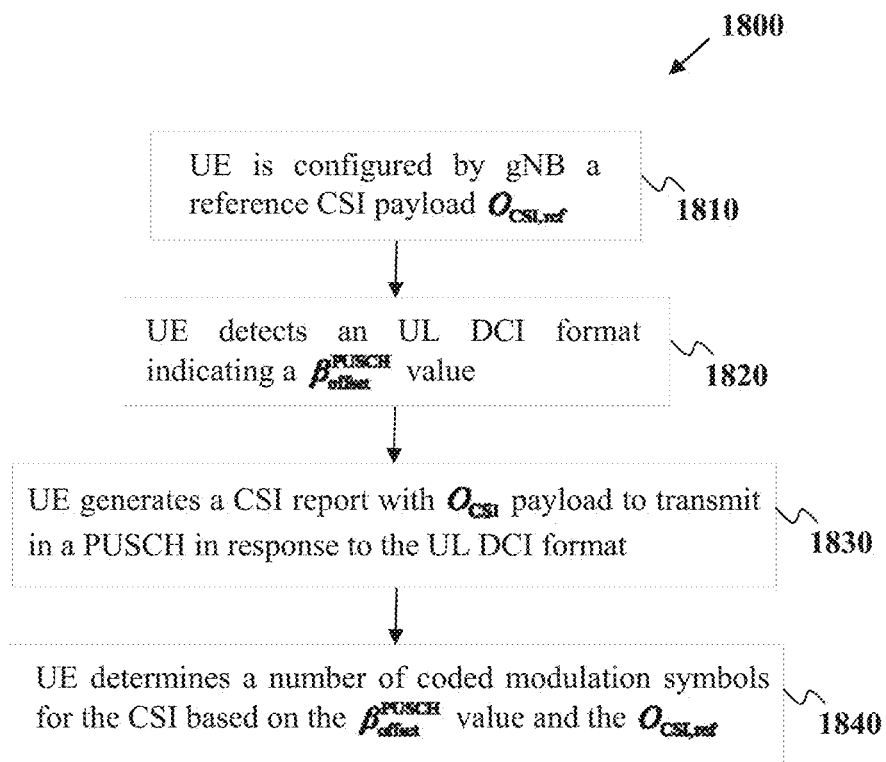
FIG. 18 illustrates an example determination for a number of CSI coded modulation symbols based on a reference CSI payload (CSI part 1) according to this embodiments of the present disclosure.

FIG. 18 illustrates an example determination 1800 for a number of CSI coded modulation symbols based on a reference CSI payload (CSI part 1) according to embodiments of the present disclosure. An embodiment of the determination 1800 shown in FIG. 18 is for illustration only. Other embodiments may be used without departing from the scope of the present disclosure.

A UE is configured by a gNB a reference CSI payload (CSI part 1), $O_{CSI,ref}$ for the UE to use in a formula for determining a number of CSI coded modulation symbols to map to SCs of a PUSCH transmission BW 1810. It is also possible that the configuration is avoided when $O_{CSI,ref}$ is predefined in a system operation, for example for the CSI part to correspond to rank-1 transmission per cell. The UE detects an UL DCI format that includes a field indicating a $\beta_{offset}^{CSI}$ value 1820. The UE generates a CSI report with a payload of $O_{CSI}$ information bits to transmit in the PUSCH 1830. The UE determines a number of coded modulation symbols for the CSI based on the indicated $\beta_{offset}^{CSI}$ value and on the CSI payload $O_{CSI,ref}$.

In one embodiment, to avoid error cases for multiplexing CSI and data in a PUSCH that are caused by incorrect RI detection at a gNB, a reference CSI payload, $O_{CSI,ref}$, is again defined in a system operation or is configured by the gNB to a UE. The UE rate matches the data transmission for a number of SCs corresponding to transmission of $O_{CSI,ref}$ in a respective slot. When an actual CSI payload $O_{CSI}$ is larger than $O_{CSI,ref}$, that is when there is a CSI part 2 in addition to CSI part 1, the UE determines a number of CSI coded modulated symbols according to transmission of $O_{CSI}$ information bits and punctures transmission of data coded modulation symbols in SCs other than SCs corresponding to transmission of $O_{CSI,ref}$ information bits. For example, for $O_{CSI,ref}=50$ bits and $O_{CSI}=100$ bits, when $M_{sc}^{CSI,ref}$ SCs are used for transmission of $O_{CSI,ref}$ information bits and $M_{sc}^{CSI}>M_{sc}^{CSI,ref}$ SCs are used for transmission of $O_{CSI}$ information bits, a UE rate matches a transmission of data coded modulation symbols for the $M_{sc}^{CSI,ref}$ SCs and punctures a transmission of data coded modulation symbols for the $M_{sc}^{CSI}-M_{sc}^{CSI,ref}$ SCs. When $O_{CSI}\leq O_{CSI,ref}$, the UE maps the CSI on $M_{sc}^{CSI}\leq M_{sc}^{CSI,ref}$ SCs and does not use remaining $M_{sc}^{CSI,ref}-M_{sc}^{CSI}$ SCs to transmit data coded modulation symbols.

In one embodiment, to reduce an impact from error cases for multiplexing CSI and data in a PUSCH that are caused by incorrect RI detection, a gNB implementation can set a target BLER for RI detection, or equivalently CSI part 1 detection, to be sufficiently low for such error cases to not have a material impact on the overall system operation. For example, when possible, a RI/CRI target BLER can be set to be in the order of 0.01% or less. To avoid an erroneous understanding of a CSI (CSI part 2) payload at a gNB affecting a detection of HARQ-ACK, or RI/CRI, or data, a UE can map SCs for transmission of CSI (CSI part 2) coded modulation symbols after the UE maps SCs for transmission of HARQ-ACK or RI/CRI (CSI part 1), or data coded modulation symbols.

In this manner, when a UE maps CSI on more SCs than expected by a gNB, a starting position of data coded modulation symbols is not affected. Although instead of data coded modulation symbols, the gNB receives CSI coded modulation symbols in some SCs when the actual CSI payload is larger than the CSI payload assumed by the gNB, full buffer corruption is avoided as the UE first maps to SCs the data coded modulation symbols and therefore the location of those SCs is independent of the SCs the UE maps the CSI coded modulation symbols. When a UE maps CSI on fewer SCs than expected by a gNB, a starting position of data information is not affected and the only impact is some unutilized SCs in a PUSCH.

When there is no ambiguity for a number of SCs needed for HARQ-ACK, RI/CRI (or CSI part 1), or data transmission, any mapping order for these information types can apply. Otherwise, when there is ambiguity for any of these information types, such as for example for HARQ-ACK, the mapping of that information type can be last, even after CSI, as HARQ-ACK or RI/CRI (or CSI part 1) can have a higher priority than CSI (or CSI part 2) and can overwrite SCs used for mapping CSI (or CSI part 2).

After sub-carrier mapping of HARQ-ACK, RI/CRI (or CSI part 1), and data (and DMRS), sub-carrier mapping of CSI (or CSI part 2) can be determined as SCs used for HARQ-ACK or RI/CRI (or CSI part 1) transmission and a respective description is not repeated for brevity. For example, CSI multiplexing is same as HARQ-ACK multiplexing when there is no HARQ-ACK or RI/CRI. For example, CSI (or CSI part 2) multiplexing is same as RI/CRI (or CSI part 1) multiplexing when there is HARQ-ACK but there is no RI/CRI in CSI part 1. For example, CSI multiplexing is same as RI/CRI (or CSI part 1) multiplexing after HARQ-ACK when there is HARQ-ACK and RI/CRI (or CSI part 1).

Figure 19:
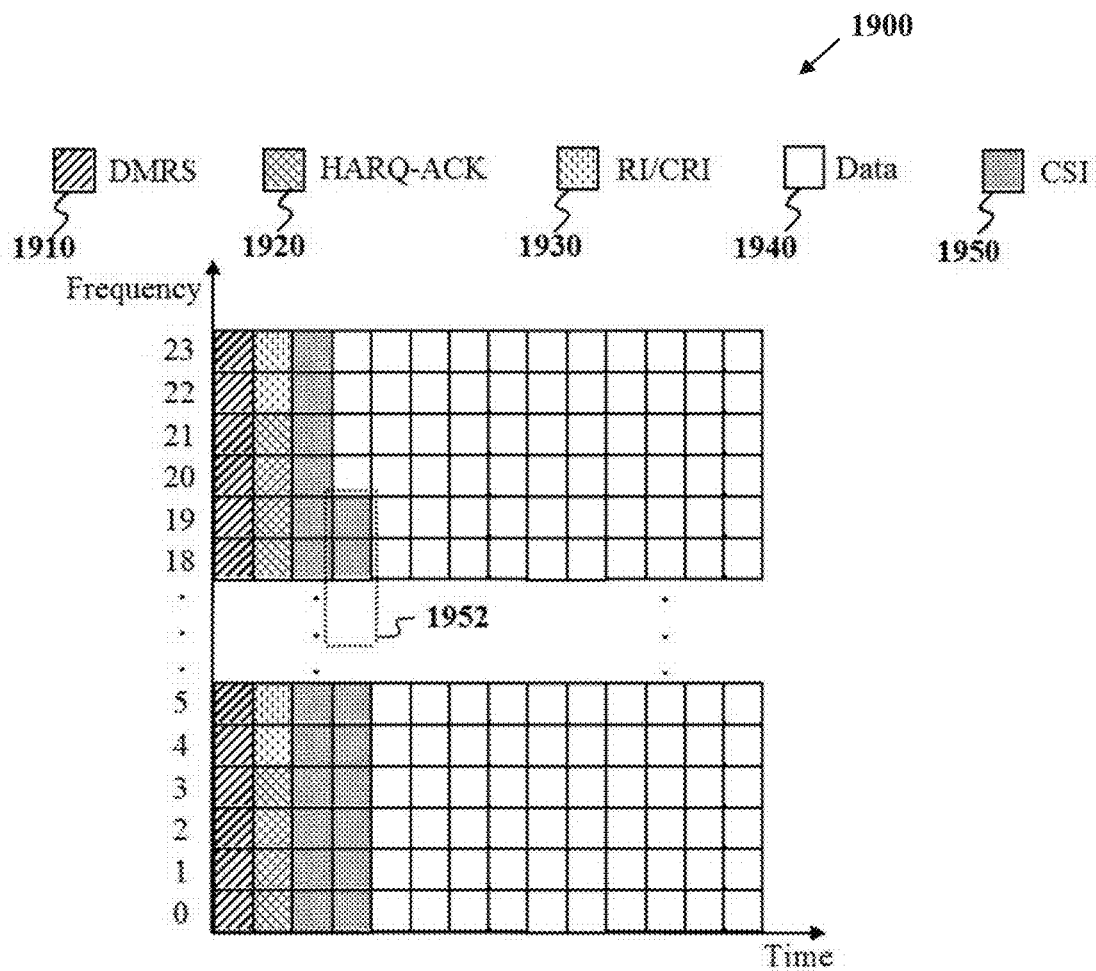
FIG. 19 illustrates an example first approach for mapping CSI to sub-carriers of a PUSCH transmission according to this embodiments of the present disclosure.

FIG. 19 illustrates an example first approach 1900 for mapping CSI to sub-carriers of a PUSCH transmission according to embodiments of the present disclosure. An embodiment of the first approach 1900 shown in FIG. 19 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 1910 in a first slot symbol over the $M_{sc}^{PUSCH}=24$ SCs. After mapping HARQ-ACK 1920 and RI/CRI (or CSI part 1) 1930 to SCs, the UE maps data to SCs 1940. Finally, the UE maps CSI (or CSI part 2) to SCs 1950. The UE maps CSI (or CSI part 2) coded modulation symbols to SCs after the UE maps HARQ-ACK, RI/CRI (or CSI part 1), and data coded modulation symbols to SCs. When the gNB assumes a smaller CSI (CSI part 2) payload than an actual CSI (CSI part 2) payload that the UE transmits, the gNB assumes that some SCs, such as SCs 1952, are used for data transmission instead of CSI (CSI part 2) transmission. However, as data is mapped to SCs prior to CSI (CSI part 2), the only consequence is that the gNB may receive CSI (CSI part 2) symbols as data symbols in SCs 1952 while in remaining SCs used for data multiplexing, the gNB receives data symbols correctly. Similar mapping of CSI (CSI part 2) coded modulation symbols to SCs can apply when a mapping to SCs for HARQ-ACK and RI/CRI (or CSI part 1) is as in FIG. 13.

Figure 20:
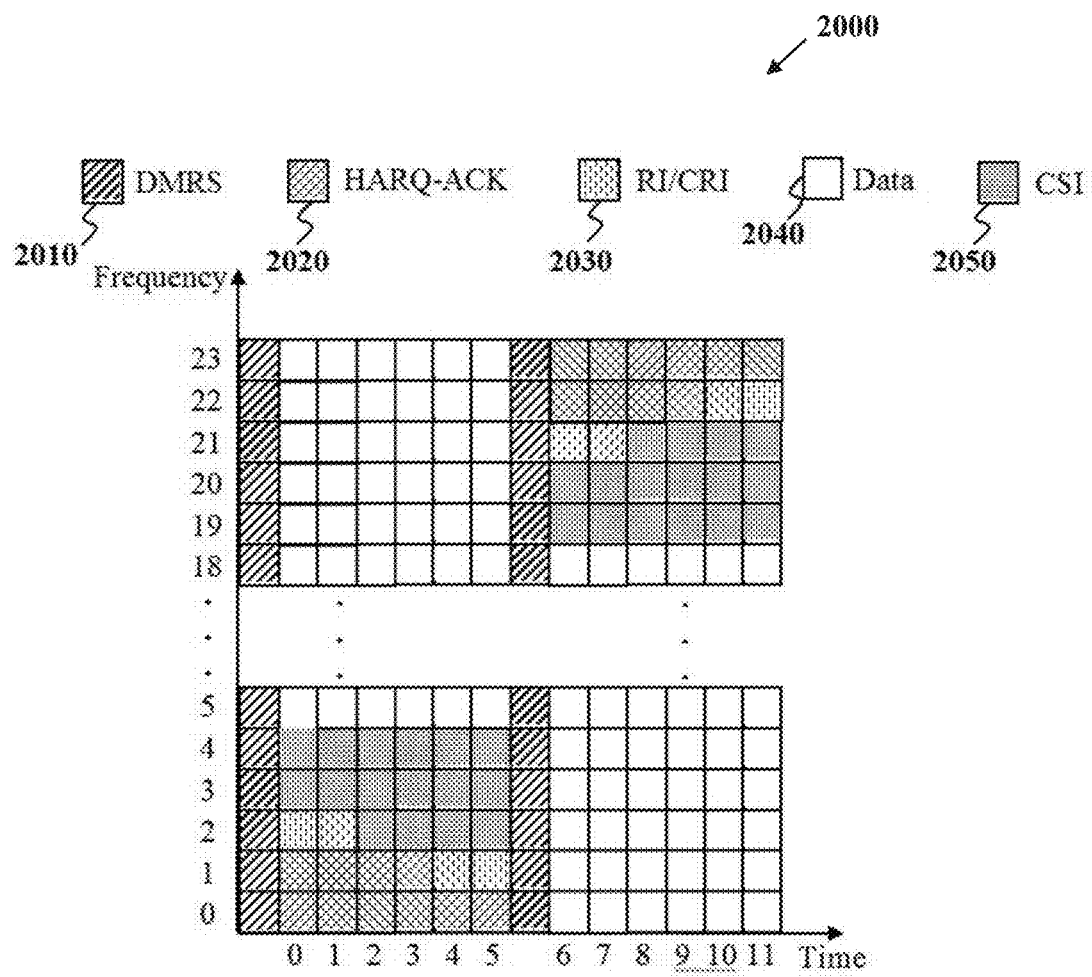
FIG. 20 illustrates an example second approach for mapping CSI to sub-carriers of a PUSCH transmission according to this embodiments of the present disclosure.

FIG. 20 illustrates an example second approach 2000 for mapping CSI to sub-carriers of a PUSCH transmission according to embodiments of the present disclosure. An embodiment of the second approach 2000 shown in FIG. 20 is for illustration only. Other embodiments may be used without departing from the scope of the present disclosure.

A UE transmits a PUSCH to a gNB in a slot over fourteen symbols and over $M_{sc}^{PUSCH}=24$ SCs. The UE transmits a DMRS 2010 in a first slot symbol over the $M_{sc}^{PUSCH}=24$ SCs. After mapping HARQ-ACK 2020 and RI/CRI (or CSI part 1) 2030 to SCs, for example as in FIG. 15, the UE maps data to SCs 2040. Finally, the UE maps CSI (CSI part 2) to SCs 2050. Similar comments as for FIG. 19 apply for a case when the gNB and the UE consider a different CSI (CSI part 2) payload.

When UCI multiplexing is across all available PUSCH symbols, for example as in FIG. 17, a mapping of CSI (CSI part 2) coded modulation symbols to PUSCH SCs is a direct extension of the one for HARQ-ACK or RI/CRI (CSI part 1) coded modulation symbols (a UE first maps HARQ-ACK, RI/CRI, or data coded modulation symbols to SCs) and a corresponding description is omitted for brevity.

UCI is typically associated with a lower target BLER than data information. For a given receiver and coherent demodulation, a BLER depends on a channel estimation accuracy that in turn depends on an associated DMRS SINR and on a code rate and SINR for the UCI coded modulation symbols. The code rate can be reduced by allocating more UCI coded modulation symbols for a given UCI payload. The DMRS SINR is determined by the DMRS transmission power. A first approach to increase a DMRS SINR is for a UE to increase a DMRS transmission power relative to than a UCI or data transmission power. For example, an UL DCI format can include a DMRS power offset field for the UE to determine a power offset for a DMRS transmission power relative to a UCI or data information transmission power.

A limitation of the first approach is that it is primarily beneficial for UEs with low SINR that can also be power limited. Another limitation is that a DMRS SINR increase due to a DMRS transmission power increase can be cancelled by respective DMRS transmission power increases from UEs in interfering synchronous cells as DMRS can be located on a same slot symbol. A second approach to increase a DMRS SINR is to include additional DMRS symbols and this can be indicated by an 'additional DMRS' field in a DCI format scheduling the PUSCH transmission.

As a main purpose of the additional DMRS is to improve a UCI BLER, the additional DMRS can be limited on SCs where UCI is transmitted, or on RBs that include SCs where UCI is transmitted, and need not extent over the entire PUSCH transmission BW. The field in the DCI format can also indicate whether or not the additional DMRS extents over the PUSCH transmission BW or only over SCs, or RBs that include SCs, used for mapping of UCI coded modulation symbols.

It is also possible for a UE to transmit an additional DMRS when UCI is multiplexed in a PUSCH through implicit signaling such as, for example, when a data MCS is below a predetermined MCS or when a field in an UL DCI format indicates a predetermined value (or values) for a cyclic shift of a default DMRS transmission (assuming the default DMRS is based on a ZC sequence). A UE can transmit an additional DMRS in one or more predetermined slot symbols, such as a middle or a last slot symbol, that are part of the PUSCH transmission. When an OFDM waveform is used for PUSCH transmission, the additional DMRS can be limited in BW and can be multiplexed with data in a same slot symbol. When a DFT-S-OFDM waveform is used for PUSCH transmission, the additional DMRS can be transmitted over the entire PUSCH BW in a slot symbol without multiplexing with data in the slot symbol in order to maintain a single-carrier property for the DFT-S-OFDM waveform.

Figure 21:
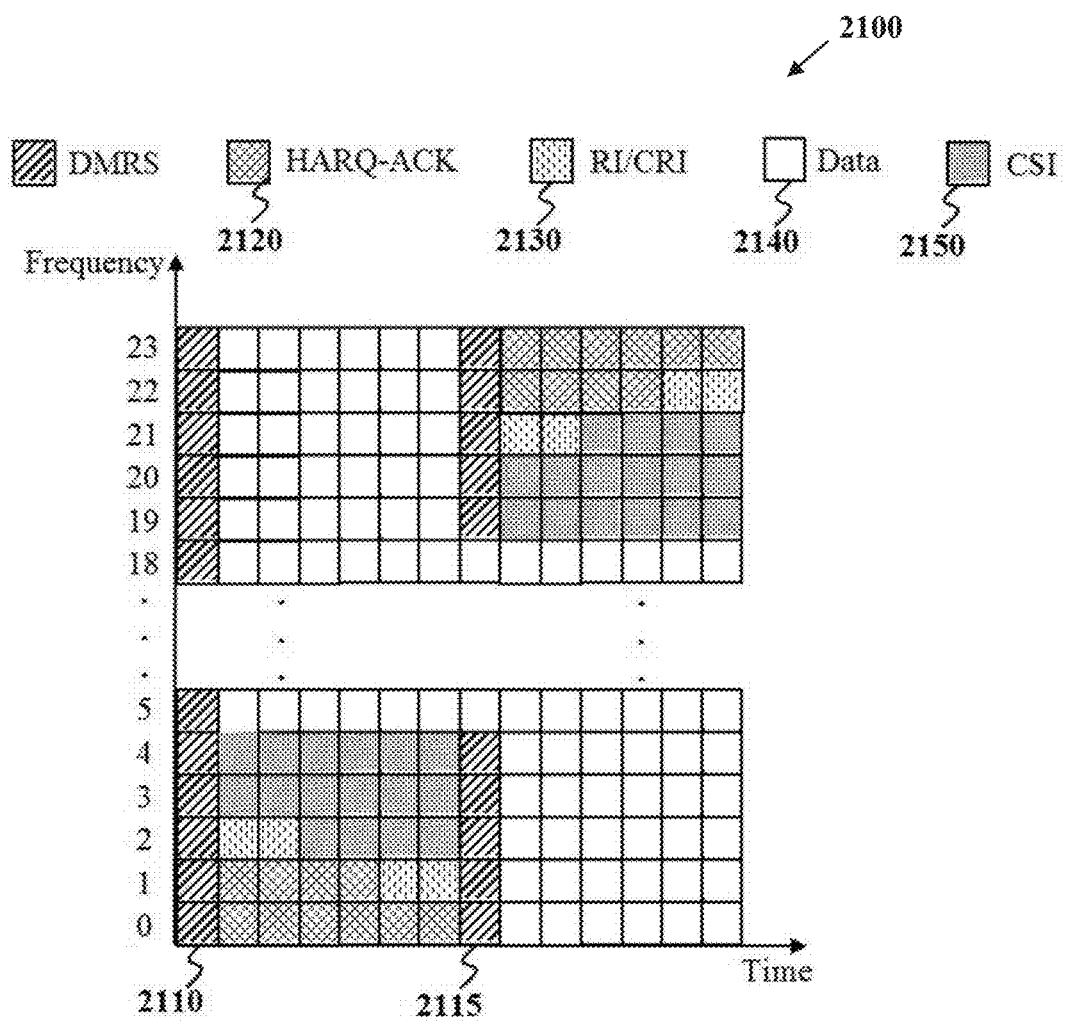
FIG. 21 illustrates an example existence of an additional DMRS when UCI is multiplexed in a PUSCH transmission according to this embodiments of the present disclosure.

FIG. 21 illustrates an example existence of an additional DMRS 2100 when UCI is multiplexed in a PUSCH transmission according to embodiments of the present disclosure. An embodiment of the existence of an additional DMRS 2100 shown in FIG. 21 is for illustration only. Other embodiments may be used without departing from the scope of the present disclosure.

A UE transmits a PUSCH in a slot and over a number of SCs (or RBs). A UCI multiplexing structure for mapping UCI coded modulation symbols to SCs is not material and the one in FIG. 20 is used for reference. The UE transmits a default DMRS 2110 in a first slot symbol over all PUSCH SCs (the default DMRS transmission can also be in some of the PUSCH SCs while still spanning the PUSCH transmission BW). The UE determines a set of SCs for UCI multiplexing in the PUSCH and transmits an additional DMRS, when so indicated by an associated UL DCI format or when the UE implicitly determines based on a predefined rule, in a slot symbol 2120.

The additional DMRS is transmitted at least in SCs where UCI is mapped (but in a different symbol). The additional DMRS can also be transmitted over a predetermined number of SCs, such as SCs over an integer number of RBs, which include the UCI SCs. This can be necessary when DMRS is constructed by a ZC sequence that needs to have a length from a predetermined number of lengths such as 12, 24, and so on. After the UE determines whether or not to transmit an additional DMRS, the UE can proceed with mapping to SCs HARQ-ACK (when any) 2130, RI/CRI (when any) 2140, data 2150, and CSI 2160 coded information symbols.

In order to avoid a link for a determination of a number of UCI coded modulation symbol on parameters of a PUSCH conveying an initial transmission of a data TB, such as a transmission BW or a transmission power, a number of UCI coded modulation symbols can be determined based on a current PUSCH transmission and a variability is a target BLER among HARQ retransmissions (including an initial transmission) of a data TB can be addressed through a field in an UL DCI format conveying a $\beta_{offset}^{PUSCH}$ value.

A UE can determines a number of coded modulation symbols per layer $Q'_{ACK}$ for HARQ-ACK as in Equation 4

$$Q'_{ACK} = \left\lceil \frac{O_{ACK} \cdot M_{sc}^{PUSCH} \cdot N_{symb}^{PUSCH} \cdot \beta_{offset}^{PUSCH}}{\sum_{r=0}^{C-1} K_r} \right\rceil \quad \text{(Equation 4)}$$

where $O_{ACK}$ is the number of HARQ-ACK bits, and $M_{sc}^{PUSCH}$ is a scheduled PUSCH transmission BW, in number of SCs, in the slot for the data TB(s), and $N_{symb}^{PUSCH}$ is a number of slot symbols available for transmission for the data TB(s), and $M_{sc}^{PUSCH}$, C, and $K_r$ are obtained from the UL DCI format conveyed in a DL control channel. When there is no DL control channel for the data TB, $M_{sc}^{PUSCH}$, C, and $K_r$ are determined from the most recent SPS assignment when the PUSCH for the data TB is SPS or from the random access response grant for the data TB when the PUSCH is initiated by the random access response grant. Further, C is a number of CBs for data TB and $K_r$ is a size of CB r for data TB.

A UE determines a number of coded modulation symbols per layer $Q'_{RI/CRI}$ for a number of RI/CRI $O_{RI/CRI}$ (or CSI part 1) information bits as in Equation 5 ($Q_{ACK}=0$ when the UE does not transmit HARQ-ACK)

$$Q'_{RI/CRI} = \min\left(\left\lceil \frac{O_{RI/CRI} \cdot M_{sc}^{PUSCH} \cdot N_{symb}^{PUSCH} \cdot \beta_{offset}^{PUSCH}}{\sum_{r=0}^{C-1} K_r} \right\rceil, M_{sc}^{PUSCH} \cdot N_{symb}^{PUSCH} - Q_{ACK}\right)$$ (Equation 5)

QPSK modulation ($Q_m=2$) is assumed for HARQ-ACK and RI/CSI (or CSI part 1). When a higher modulation order $Q_m>2$ is enabled, such as for QAM modulation, a number of coded information symbols can be scaled accordingly.

A UE determines a number of coded modulation symbols per layer $Q'_{CSI}$ for a number of CSI $O_{CSI}$ information bits as in Equation 6

$$Q' = \min\left(\left\lceil \frac{(O+L) \cdot M_{sc}^{PUSCH} \cdot N_{symb}^{PUSCH} \cdot \beta_{offset}^{PUSCH}}{\sum_{r=0}^{C-1} K_r} \right\rceil, M_{sc}^{PUSCH} \cdot N_{symb}^{PUSCH} - \frac{Q_{RI}}{Q_m} - \frac{Q_{ACK}}{Q_m}\right)$$ (Equation 6)

where L is the number of CRC bits and $Q_{CQI}=Q_m \cdot Q'$. When the UE does not transmit HARQ-ACK, $Q_{ACK}=0$. When the UE does not transmit RI/CRI, or when the UE jointly codes RI/CRI with CSI (CSI part 1), $Q_{RI/CRI}=0$.

A number of bits available for a data TB transmission over $N_L$ layers is $G=N_L \cdot (N_{symb}^{PUSCH} \cdot M_{sc}^{PUSCH} \cdot Q_m - Q_{CQI} - Q_{RI/CRI} - Q_{ACK})$.

In order to improve a dimensioning for HARQ-ACK or RI/CRI (or CSI part 1) coded modulation symbols in a PUSCH transmission that includes CSI (or CSI part 2) and does not include data, the present disclosure considers that an associated UL DCI format provides, either explicitly or implicitly, an MCS for the CSI transmission. An MCS set for CSI only transmission can be a subset of an MCS set for data transmission, for example, by not including QAM64 or QAM256 modulation or by not including certain code rate (spectral efficiency) values. When higher order modulations, such as 64QAM or 256QAM, are not supported for UCI then, when UCI is multiplexed with data in a PUSCH, the UCI is transmitted with a same modulation as the data unless a modulation order for the data is higher than a maximum supportable modulation order for the UCI and then the UCI is transmitted with a modulation corresponding to the highest supportable order for the UCI.

An explicit indication in an UL DCI format to schedule a PUSCH transmission that includes only UCI (and does not include data) can be through an "UCI-only" field that includes one bit indicating whether data or not a UE may transmit data in a PUSCH when the UE is triggered a CSI report by the UL DCI format through an A-CSI request field. An explicit indication can alternatively be provided by including a "UCI-only" component in some of the states that the values of the A-CSI request field map to.

An implicit indication can be provided by reserving a value of another field in an UL DCI format to indicate, in conjunction with a positive indication of the A-CSI request field, that only UCI is to be transmitted in an associated PUSCH. For example, when a DMRS transmitted in a PUSCH is based on a transmission of a ZC sequence and a field in an UL DCI format is used to indicate a cyclic shift value for the ZC sequence, a value of the field can be reserved to also indicate that only UCI is to be transmitted in a scheduled PUSCH.

When a UE is indicated that by an UL DCI format that an associated PUSCH transmission is to include only UCI (at least A-CSI), a MCS field in the UL DCI format can correspond to an MCS for the A-CSI transmission. Based on the indicated MCS value, the UE can determine a number of CSI bits $O_{CSI}$ for the UE to use in determining a number of HARQ-ACK coded modulation symbols as in Equation 7, a number of RI/CRI (or CSI part 1) coded modulation symbols as in Equation 8 and a number of CSI (or CSI part 2) coded modulation symbols as in Equation 9

$$Q'_{ACK} = \min\left(\left\lceil \frac{O_{ACK} \cdot M_{sc}^{PUSCH} \cdot N_{symb}^{PUSCH} \cdot \beta_{offset}^{PUSCH}}{O_{CSI}} \right\rceil, M_{sc}^{PUSCH} \cdot N_{symb}^{PUSCH}\right)$$ (Equation 7)

$$Q'_{RI/CRI} = \min\left(\left\lceil \frac{O_{RI/CRI} \cdot M_{sc}^{PUSCH} \cdot N_{symb}^{PUSCH} \cdot \beta_{offset}^{PUSCH}}{O_{CSI}} \right\rceil, M_{sc}^{PUSCH} \cdot N_{symb}^{PUSCH} - Q_{ACK}\right)$$ (Equation 8)

$$Q_{CSI} = \max(0, M_{sc}^{PUSCH} \cdot N_{symb}^{PUSCH} \cdot Q_m - Q_{ACK} - Q_{RI/CRI})$$ (Equation 9)

For HARQ-ACK, $Q_{ACK}=Q_m \cdot Q'_{ACK}$ and $\beta_{offset}^{PUSCH}=\beta_{offset}^{HARQ-ACK}/\beta_{offset}^{CSI}$. For RI/CRI, $Q_{RI/CRI}=Q_m \cdot Q'_{RI/CRI}$ and $\beta_{offset}^{PUSCH}=\beta_{offset}^{RI/CRI}/\beta_{offset}^{CSI}$.

As a UE determines a CSI (CSI part 2) payload according to a RI/CSI value the UE transmits to a gNB either prior to or simultaneously with the CSI (CSI part 2) transmission, there can be an ambiguity between the gNB and the UE when the gNB fails to correctly detect the RI value. For example, a CSI (CSI part 2) payload is typically larger when an associated rank is larger. A gNB can attempt to detect a CSI (CSI part 2) codeword according to more than one hypothesis for an associated payload. For example, when the gNB fails to detect a CSI (CSI part 2) codeword according to a payload determined from a last detected value for RI, the gNB can decode again the CSI (CSI part 2) codeword assuming a different RI value corresponding to a different CSI (CSI part 2) payload. However, when RI or CSI corresponds to multiple cells, or to multiple CSI processes, or to multiple CSI sets, a number of corresponding hypotheses increases due to the increased combinations for a possible CSI (CSI part 2) payload.

When a gNB incorrectly assumes a CSI (CSI part 2) payload, the gNB also incorrectly assumes a number of SCs in a PUSCH that a UE uses for CSI (CSI part 2) transmission and consequently a number of SCs that the UE uses for data transmission. Then, the gNB can include CSI (CSI part 2) coded modulation symbols as data coded modulation symbols leading to soft buffer corruption for the data especially when a starting position of data coded modulation symbols varies depending on a number of CSI (CSI part 2) coded modulation symbols. Therefore, it is beneficial to provide means for a gNB to determine whether or not the gNB correctly detects an RI value (or correctly detects CSI part 1). Such means are typically associated with an inclusion of a cyclic redundancy check (CRC) in an information codeword prior to encoding.

While a CRC check after decoding is an effective way to confirm an incorrect or correct detection of an associated information codeword, an associated encoding method such as tail biting convolutional code (TBCC) or polar code is effective only when an payload for the information codeword is sufficiently large, such as for example more than ten bits. However, even when a UE reports RI (or CSI part 1) for multiple cells, a total RI (or CSI part 1) payload is often ten bits or less and this limits the applicability of encoding methods that can utilize CRC protection to confirm a correct or incorrect decoding outcome for an information codeword.

A UE can also report HARQ-ACK information for multiple CBs of a TB, or for multiple DL cells where the UE is configured to receive PDSCH transmissions, or for multiple slots where the UE is configured to receive PDSCH transmissions. As a consequence, a HARQ-ACK information codeword can include several tens or even several hundreds of bits for respective receptions of CBs or TBs across cells or across slots. An incorrect detection of a HARQ-ACK information codeword by a gNB may require re-scheduling and retransmission of all data CBs. Even when a low target BLER is set for an HARQ-ACK information codeword, due to errors in link adaptation, or due to channel variations such as short-term fading, or due to transmission power control errors, it can often happen in practice that an actual BLER for a HARQ-ACK codeword is materially larger than a target BLER.

Therefore, instead of a gNB retransmitting all PDCCHs and PDSCHs to reschedule retransmissions of data CBs to a UE when the gNB incorrectly detects an HARQ-ACK information codeword, it is beneficial for the gNB to trigger a retransmission of HARQ-ACK information codeword from the UE as this can avoid a DL spectral efficiency and throughput loss and an increase in an average communication latency that are associated with such rescheduling.

When a UE multiplexes UCI in a PUSCH transmission, a target BLER for the UCI codeword at a gNB can be achieved by the gNB allocating a sufficient number of SCs in the PUSCH for UCI multiplexing. Although this is typically a functional approach, it can occasionally require a large number of SCs for UCI transmission, for example when a UCI payload is large, and it is not always possible to increase a BW allocation for a PUSCH transmission as this can result to power limitation for the UE. Therefore, it can be beneficial to contain a number of SCs allocated to UCI multiplexing in a PUSCH transmission in order to avoid a high code rate for transmission of data information using OFDM because a respective data BLER can materially increase, for example when the code rate is above 0.6 particularly for a QAM-based data modulation.

As a UCI code rate is typically sufficiently low even when an allocated number of SCs is smaller than a nominal one for achieving a target BLER, the target UCI BLER can still be achieved by increasing a UCI transmission power. Then, to maintain a same total transmission power per PUSCH symbol, a transmission power for data information decreases. However, as more SCs are available for multiplexing data information in the PUSCH transmission, a sufficiently low code rate can be maintained for the data information leading to improved data BLER despite the lower transmission power for data coded modulation symbols.

A gNB can schedule a PUSCH transmission from a UE to occur over multiple slots. The PUSCH transmission can convey a same data TB in all multiple slots or can convey a different data TB is each of the multiple slots. When the UE multiplexes UCI in the PUSCH transmission, the multiplexing can occur either only in one slot, such as a first slot, for example when each slot conveys a different data TB, or across all multiple slots for example when all multiple slots convey a same data TB. When an UL DCI format scheduling a PUSCH transmission in multiple slots indicates a same MCS for data transmission in each of the multiple slots and the PUSCH in each of the multiple slots conveys a different data TB and uses a same transmission power in each of the multiple slots, a reception reliability for a data TB depends on whether or not UCI is multiplexed in the PUSCH. It is therefore beneficial to have a different adjustment for parameters of a multi-slot PUSCH transmission in slots with UCI multiplexing than in slots without UCI multiplexing.

In some embodiments, there is a need to support encoding of UCI payloads that are smaller than or equal to a predetermined value using an encoding method that is applicable to UCI payloads above the predetermined value.

In some embodiments, there is another need to enable a gNB to schedule a retransmission of a HARQ-ACK codeword from a UE.

In some embodiments, there is another need to enable transmission of HARQ-ACK information per code block group.

In some embodiments, there is a need to apply a different adjustment for parameters of a PUSCH transmission from a UE in slots with UCI or SRS multiplexing than in slots without UCI or SRS multiplexing.

In the following, for brevity, data information is assumed to be transmitted using one data TB that can include one or more data CBs. Associated description of embodiments can be directly extended in case more than one data TBs are supported. Further, a DCI format scheduling a PUSCH transmission is referred to as UL DCI format while a DCI format scheduling a PDSCH transmission is referred to as DL DCI format.

In some embodiments, mapping a small number of information bits to a codeword having a larger number of information bits is considered in order to enable computation of a CRC that is appended to the codeword and to enable a determination at a receiver of a correct or incorrect detection of the codeword.

A number of original information bits, such as less than twelve information bits for HARQ-ACK or RI/CRI (CSI part 1), are mapped to a codeword having a predetermined larger number of information bits, such as twelve information bits. A CRC for the codeword is subsequently obtained, the CRC is appended to the codeword, and the output is then encoded using for example a TBCC or a polar code. Using CRC protection for a HARQ-ACK or RI/CRI (CSI part 1) codeword also enables operation with higher BLERs for the codeword and scheduling of retransmissions for the codeword as is described in the next embodiment of this disclosure.

A mapping of original information bits to a codeword is not material but an exemplary mapping can be as follows. For $I_o$ original information bits and $I_{CW} > I_o$ codeword information bits, the first $I_o$ codeword information bits can be the $I_o$ original information bits and remaining $I_{CW}-I_o$ codeword information bits can have predetermined values such as (binary) zero, or one, or a series of alternating zeroes and ones. It is also possible for the $I_o$ original information bits to be the last $I_o$ codeword information bits, for example as decoding accuracy for polar codes can improve when the first $I_{CW}-I_o$ codeword information bits have known value, or to be distributed within the $I_{CW}$ codeword information bits. A CRC of length L, such as for example L=8, is computed for the codeword of length $I_{CW}$ and appended to the codeword to produce a total number of $I_{CW}+L$ bits.

Even though a larger number of bits than the original $I_o$ information bits are transmitted, a resulting overhead increase is smaller than a factor of $(I_{CW}+L)/I_o$ as an associated coding scheme, such as TBCC or polar coding, provides coding gains over repetition coding or block coding, that would otherwise be used for the original $I_o$ information bits, and as a target BLER for the $I_{CW}+L$ bits, such as 1%, can be materially smaller than a target BLER for the original $I_o$ information bits, such as 0.01%, because the former are protected by CRC and an incorrect detection can be identified.

Figure 22:
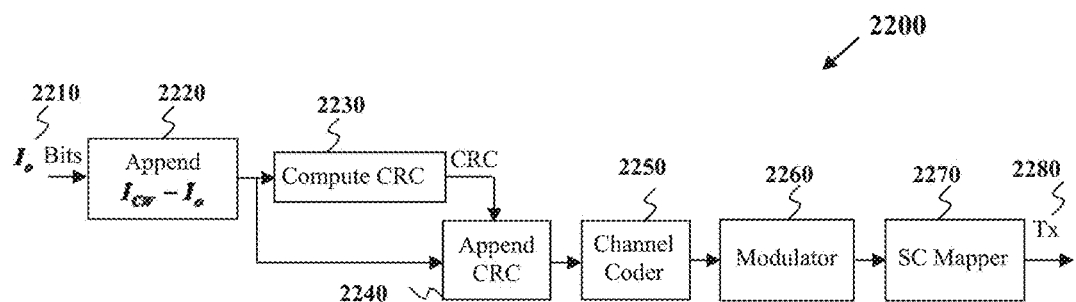
FIG. 22 illustrates an example mapping and encoding process for an original information payload though a use of a codeword with larger length that the original information payload according to this embodiments of the present disclosure.

FIG. 22 illustrates an example mapping and encoding process 2200 for an original information payload though a use of a codeword with larger length that the original information payload according to embodiments of the present disclosure. An embodiment of the mapping and encoding process 2200 shown in FIG. 22 is for illustration only. Other embodiments may be used without departing from the scope of the present disclosure.

A UE generates the original $I_o$ information bits, for example for HARQ-ACK information or RI/CRI (CSI part 1) 2210. The UE appends $I_{CW}-I_o$ bits with predetermined values to the original $I_o$ information bits (it is also possible to have different combination for the $I_o$ and the $I_{CW}-I_o$ bits) to form a codeword of $I_{CW}$ bits 2220. The UE computes a CRC of L bits 2230 for the codeword of $I_{CW}$ bits and appends the L bits to the $I_{CW}$ bits 2240. An encoder 2250, such as a TBCC or a polar encoder, subsequently encodes the $I_{CW}+L$ bits, a modulator 2260 modulates the encoded bits, a SC mapper 2270 maps encoded modulation symbols to SCs and a transmitter 2280 transmits the resulting signal.

Figure 23:
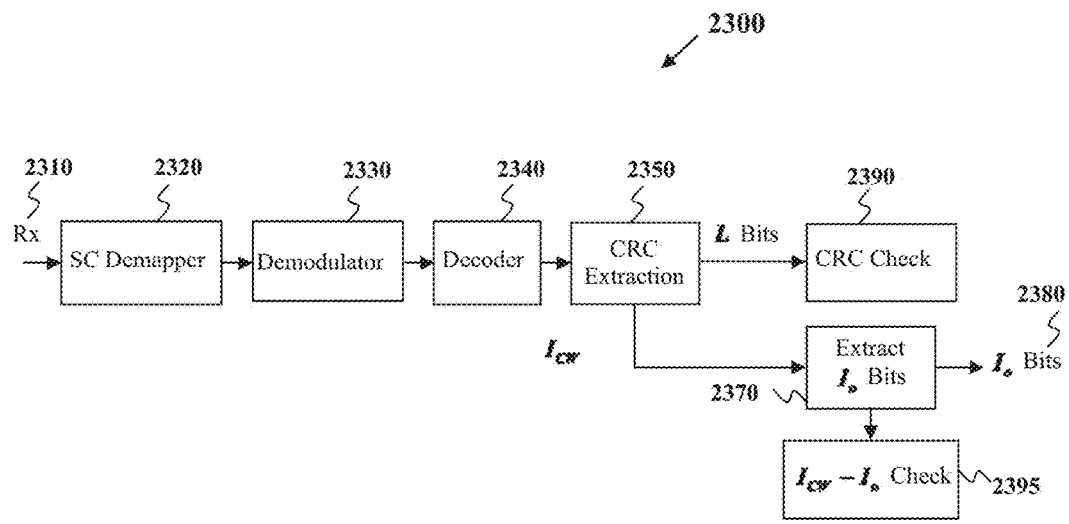
FIG. 23 illustrates an example decoding and de-mapping process for an original information payload though a use of a codeword with larger length that the original information payload according to this embodiments of the present disclosure.

FIG. 23 illustrates an example decoding and de-mapping process 2300 for an original information payload though a use of a codeword with larger length that the original information payload according to embodiments of the present disclosure. An embodiment of the decoding and de-mapping process 2300 shown in FIG. 23 is for illustration only. Other embodiments may be used without departing from the scope of the present disclosure.

A gNB receiver 2310 receives a signal, a demapper 2320 de-maps coded modulation symbols, a demodulator 2330 demodulates the modulated received symbols to provide coded information bits, and a decoder 2340 decodes the coded information bits to provide $I_{CW}+L$ estimated codeword bits and CRC bits. A CRC extraction unit 2350 extracts $I_{CW}$ bits for a codeword and L bits for a CRC. The $I_{CW}$ bits are provided to an information extraction unit (controller) 2370 that extracts $I_o$ original information bits 2380. The receiver can determine whether or not the codeword was correctly decoded by performing a CRC check 2390 or examining the values for the $I_{CW}-I_o$ bits 2395. When the CRC check is positive or the values of the $I_{CW}-I_o$ bits are the predetermined ones, the receiver can consider the $I_o$ bits as valid; otherwise, the receiver can consider the $I_o$ bits as invalid.

When a value of $I_o$ is sufficiently smaller than a value of $I_{CW}$, such as $I_o=2$ and $I_{CW}=12$, it is possible to avoid including additional CRC bits in an encoded codeword as there are $I_{CW}-I_o=10$ bits with predetermined values for a receiver to check in order to determine whether or not the receiver correctly decoded the codeword of $I_{CW}$ bits. For example, when a decoding is actually incorrect and bit errors are random, a probability that the decoded $I_{CW}-I_o$ bits are same as the predetermined $I_{CW}-I_o$ bits is $\frac{1}{2}^{(I_{CW}-I_o)}$ or, for $I_{CW}-I_o=10$, $\frac{1}{1024}$. For a relatively small codeword BLER, such as 1%, an additional protection provided by checking the values of the decoded $I_{CW}-I_o$ bits against predetermined values of the $I_{CW}-I_o$ bits is sufficient as the relatively small codeword BLER further scales an incorrect receiver decision by a factor of $\frac{1}{2}^{(I_{CW}-I_o)}$. When a value of $I_o$ is not sufficiently smaller than a value of $I_{CW}$, such as for example $I_o=8$ and $I_{CW}=12$, CRC bits can be added to an encoded codeword. A number of CRC bits can be predetermined, such as L=8, or can depend on the value of $I_{CW}-I_o$ such as for example, L=4 for $3<I_{CW}-I_o\leq7$ and L=8 for $0<I_{CW}-I_o\leq3$ (and L=0 for $7<I_{CW}-I_o\leq11$).

In some embodiments, scheduling transmissions by a gNB for one or more HARQ-ACK codewords from a UE is considered.

A first aspect for scheduling a transmission of a HARQ-ACK codeword is to define signaling for indicating such scheduling from a gNB to a UE. The signaling can be explicit or implicit. For example, explicit signaling can be by including a "HARQ-ACK report request" field in either or both DL DCI formats and UL DCI formats that a UE is configured to decode. When a HARQ-ACK codeword size is predetermined, such as one corresponding to HARQ-ACK for all HARQ processes, the "HARQ-ACK report" field can include 1 binary element where, for example, a UE transmits a HARQ-ACK codeword when the "HARQ-ACK report request" field value is "0" and the UE does not transmit a HARQ-ACK codeword when the "HARQ-ACK report request" field value is "1." Implicit signaling can be by reserving a state of another field in a DCI format to indicate scheduling of a HARQ-ACK codeword. For example, when DMRS transmissions use a ZC sequence, a field in a DCI format indicating a cyclic shift value can have a reserved value to indicate scheduling of a HARQ-ACK codeword and in that case the cyclic shift value can be a default one such as zero.

When increased granularity for a number of HARQ processes with HARQ-ACK reporting is needed, the "HARQ-ACK report request" field can have a larger number of bits, such as two bits, where a "00" state can indicate no transmission of a HARQ-ACK codeword, and a "01," "10," or "11" state can respectively indicate transmission of a first set, a second set, or a third set of HARQ processes for the serving cell associated with the DCI format transmissions. The first, second, and third sets can be configured to the UE by a serving gNB through higher layer signaling. When a UE is configured to operate with DL carrier aggregation, the HARQ processes can be the ones associated with a cell of a scheduled PDSCH transmission from a DL DCI format that includes the "HARQ-ACK report request" field.

A second aspect is for scheduling retransmission of a HARQ-ACK codeword. A HARQ-ACK codeword scheduled for transmission from a UE is same as a HARQ-ACK codeword the UE transmitted at a previous slot. An earliest previous slot can be defined in a system operation, such as for example to be the slot that is two slots prior to the slot of the HARQ-ACK codeword scheduling, or can be configured from a gNB to a UE. Then, a transmission of a HARQ-ACK codeword is a retransmission of a same HARQ-ACK codeword with same contents as in an initial transmission of the HARQ-ACK codeword. This can enable a gNB to apply soft combining on the encoded HARQ-ACK codeword symbols prior to decoding, similar to the gNB applying soft combining for HARQ retransmissions of encoded data information.

A DCI format can include a "HARQ-ACK codeword indicator" field to indicate a HARQ-ACK codeword, from a number of HARQ-ACK codewords, a UE transmitted in previous slots. For example, a "HARQ-ACK codeword indicator" field can include two bits where a value of "00," "01," "10," and "11" can indicate respectively a retransmission of a fourth last, or third last, or second last, or last HARQ-ACK codeword transmitted by a UE. It is also possible for a "HARQ-ACK codeword indicator" field to indicate transmission of multiple HARQ-ACK codewords. For example, a "HARQ-ACK codeword indicator" field can include two bits where a value of "00," "01," "10," and "11" can indicate respectively a retransmission of a third last, or a second last, or a last, or all of third last, second last, and last HARQ-ACK codewords transmitted by a UE. To enable soft combining at a gNB with previous transmissions for a HARQ-ACK codeword, when a UE simultaneously transmit multiple HARQ-ACK codewords, the UE separately encodes the multiple HARQ-ACK codewords.

A "HARQ-ACK codeword indicator" field can also act as a "HARQ-ACK report" field by reserving one state to indicate no triggering of a HARQ-ACK codeword transmission. For example, a "HARQ-ACK codeword indicator" field can include two bits where a value of "01," "10," and "11" can indicate respectively a retransmission of a third last, or second last, or last HARQ-ACK codeword transmitted by a UE while a value of "00" can indicate no retransmission of a HARQ-ACK codeword. More states can be reserved when a HARQ-ACK codeword does not always include HARQ-ACK information for all HARQ processes. When a "HARQ-ACK codeword indicator" field is included in an UL DCI format, the UE can multiplex the HARQ-ACK codeword in an associated PUSCH transmission. The PUSCH transmission can either include a data TB or not include a data TB and a respective indication can be explicit, through a corresponding field in an UL DCI format, or implicit by using predetermined values for one or more predetermined fields in the UL DCI format.

For example, when a "HARQ-ACK report" field is included in an UL DCI format, the "HARQ-ACK report" field can act as an explicit indicator that an associated PUSCH transmission does not include data information. Conversely, an explicit additional "HARQ-ACK codeword indicator" field in a DL DCI format or an UL DCI format can be omitted when the DL DCI format or the UL DCI format does not schedule data transmission from the UE when a "HARQ-ACK report" field indicates a HARQ-ACK codeword transmission. Then, one or more other existing fields in the DL DCI format or the UL DCI format, such as for example a HARQ process number field, can be reinterpreted and function as a "HARQ-ACK codeword indicator" field.

Figure 24:
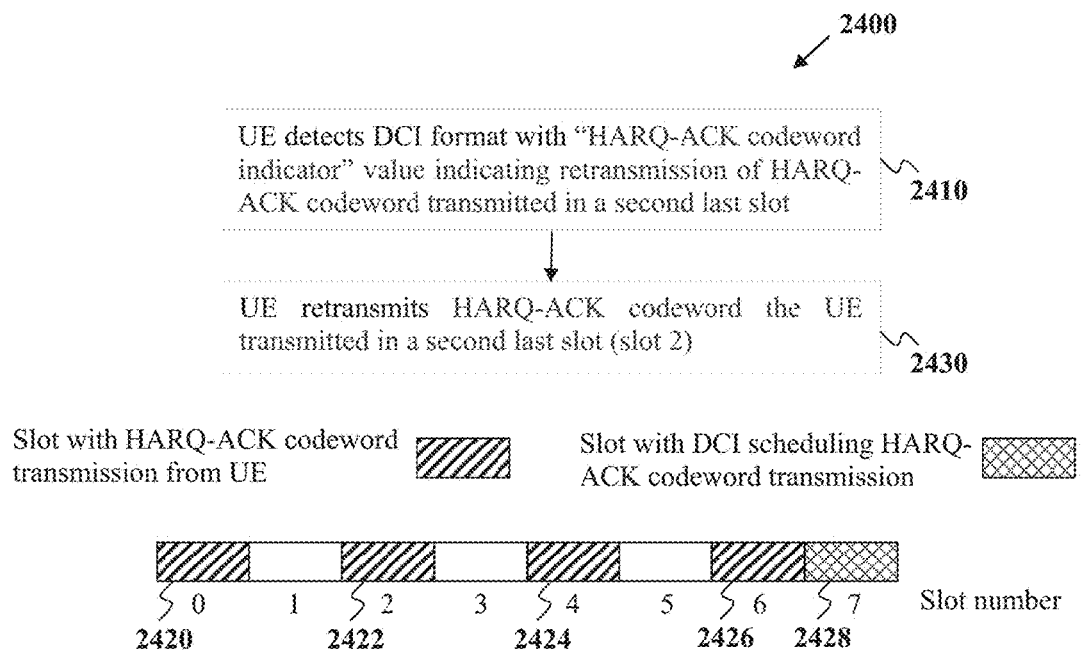
FIG. 24 illustrates an example scheduling for a HARQ-ACK codeword retransmission according to this embodiments of the present disclosure.

FIG. 24 illustrates an example scheduling 2400 for a HARQ-ACK codeword retransmission according to embodiments of the present disclosure. An embodiment of the scheduling 2400 shown in FIG. 24 is for illustration only. Other embodiments may be used without departing from the scope of the present disclosure.

A UE detects a DCI format with "HARQ-ACK codeword indicator" value indicating retransmission of a HARQ-ACK codeword transmitted in a second last slot 2410. Even though the UE transmits a HARQ-ACK codeword in slots 0 2420, 2 2422, 4 2424, and 6 926, the second last slot is slot 2, and not slot 4, because slot 6 is not at least two slots (specified in a system operation of configured to the UE) before slot 7 2418 where the UE detects the DCI format. Upon the detection of the DCI format, the UE retransmits in a later slot the HARQ-ACK codeword that the UE transmitted in the second last slot (slot 2) 2430.

A third aspect for scheduling a transmission of a HARQ-ACK codeword from a UE is to define respective transmission timing and resources. When a transmission of a HARQ-ACK codeword is triggered by an UL DCI format, with or without multiplexed data information, transmission timing and the resources for the HARQ-ACK codeword are the ones that the UL DCI format indicates for a PUSCH transmission. When a transmission of a HARQ-ACK codeword is triggered by a DL DCI format, the fields of the DL DCI format indicating transmission timing and associated resources can be reinterpreted by the UE to act as corresponding fields of an UL DCI format. When a transmission timing field or a resource allocation field in a DL DCI format is not identical as a respective field in an UL DCI format, additional adjustments can be made by either reducing a number of bits for the field or by increasing a number of bits for the field using bits from other fields in the DL DCI format that are not needed for a HARQ-ACK codeword transmission.

In some embodiments, signaling mechanisms to enable support for HARQ-ACK information corresponding to correct or incorrect detection of code block groups is considered according to this disclosure.

HARQ-ACK information can be dimensioned with finer granularity than per TB and can correspond to a group of data CBs in a data TB for a respective HARQ process.

In one example, a number of (data) CBs per (data) TB, $N_{CB}^{TB}$ can be determined as $N_{CB}^{TB} = \lceil TBS/CBS_{max} \rceil$ where TBS is the TB size in bits and $CBS_{max}$ is a predetermined maximum CB size in bits. A maximum number of CBs per group of CBs (CB-group or CBG), $N_{CB}^{CBG}$ can be configured to a UE by a gNB. As a TB size can vary for PDSCH transmissions in different slots or different cells, a number of CBGs per TB can also vary and consequently a number of HARQ-ACK information bits per TB can also vary.

A number of HARQ-ACK information bits per TB can be determined as $N_{HARQ-ACK}^{TB} = \lceil N_{CB}^{TB}/N_{CB}^{CBG} \rceil$. For example, for configuration of $N_{CB}^{CBG}=4$ CBs per CBG, a first TB includes N=8 CBs and HARQ-ACK information corresponds to $N_{HARQ-ACK}^{TB} = \lceil N_{CB}^{TB}/N_{CB}^{CBG} \rceil = 2$ CBGs, while a second TB includes $N_{CB}^{TB}=2$ CBs and HARQ-ACK information is provided for a $N_{HARQ-ACK}^{TB} = \lceil N_{CB}^{TB}/N_{CB}^{CBG} \rceil = 1$ CBG (for the second TB, there are fewer than $N_{CB}^{CBG}=4$ CBs per CBG as there are only 2 CBs in the TB) (therefore, the number of HARQ-ACK bits is reduced when the number of CBs is less than the number of CBs per CBG). As different TBs can be associated with different HARQ processes and can include a different number of CBGs, each HARQ process for a respective TB can be associated with a different number of HARQ-ACK information bits that is equal to a number of CBGs in the TB.

A UE can determine a HARQ-ACK codeword length either by explicitly, by respective signaling from a gNB, or implicitly by other signaling from the gNB. For explicit signaling, the gNB can configure the UE with a HARQ-ACK codeword length that includes $N_{HARQ-ACK}^{CW}$ HARQ-ACK information bits. The configuration can be by higher layer signaling or through a "HARQ-ACK codeword length" field in a DCI format. For example, a "HARQ-ACK codeword length" field of 2 bits can indicate a HARQ-ACK codeword length of 1, 2, 4, or 8. A configuration for a HARQ-ACK codeword length is equivalent to a configuration for a number of CBGs. For a UE configured with DL CA, a HARQ-ACK codeword length can be scaled by a number of configured DL cells or can be separately configured per DL cell. A UE initializes a HARQ-ACK codeword with 'NACK' values, such as binary zeros, and subsequently populates the HARQ-ACK codeword with actual HARQ-ACK values based on decoding outcomes for data CBs. Therefore, for a single cell, when $N_{CB}^{TB} < N_{HARQ-ACK}^{CW}$, $N_{HARQ-ACK}^{CW} - N_{CB}^{TB}$ bits have a 'NACK' value.

For implicit signaling, a UE determines a HARQ-ACK codeword length after a detection of a DL DCI format. The DL DCI format can include a "CBG counter" field that indicates a number of a CBG where a number of CBGs increases sequentially first within a TB and then across TBs based on an ascending order of a slot index or of a DL cell index associated with a transmission of a TB. As there can be multiple CBGs per TB and as a UE can fail to detect a number of DL DCI formats scheduling transmissions of TBs in slots or DL cells with consecutive indexes then, in order for a UE to be able to identify such event, the CBG counter field needs to have a range that can unambiguously identify a predetermined number of CBGs that a UE failed to receive in order for the UE to determine a proper arrangement of HARQ-ACK information bits in a HARQ-ACK codeword.

In another example, a gNB can configure to a UE a maximum number of CBGs per TB, or equivalently a maximum number $N_{HARQ-ACK}^{TB,max}$ of HARQ-ACK information bits per TB ($N_{HARQ-ACK}^{TB,max} = N_{HARQ-ACK}^{CW}$ in case of one slot). The configuration of $N_{HARQ-ACK}^{TB,max}$ can be separate per cell. Then, the CBG counter field requires $\lceil \log_2(N_{DCI}^{misdetect} \cdot N_{HARQ-ACK}^{TB,max}) \rceil$ bits to enable a UE to determine a proper arrangement of HARQ-ACK information bits in a HARQ-ACK codeword when the UE fails to detect up to $N_{DCI}^{misdetect}$ DCI formats scheduling transmissions of TBs in slots or DL cells with consecutive indexes. The value of $N_{HARQ-ACK}^{TB,max}$ (number of CBG per TB) can be configured to a UE by higher layers or can be specified in a system operation. As a gNB is unlikely to require the maximum number $N_{HARQ-ACK}^{TB,max}$ of HARQ-ACK information bits per TB for $N_{DCI}^{misdetect}$ TBs scheduled in slots or DL cells with consecutive indexes, the CBG counter index can identify a statistical maximum of CBGs, $N_{HARQ-ACK}^{serial\ TBs,max}$, in multiple TBs scheduled in slots or DL cells with consecutive indexes and require $\lceil \log_2(N_{HARQ-ACK}^{serial\ TBs,max}) \rceil$ bits. A gNB can configure to a UE the number of $\lceil \log_2(N_{HARQ-ACK}^{serial\ TBs,max}) \rceil$ bits to be included in DCI formats.

Regardless of an approach to determine a number of bits for the CBG counter, this number of bits needs to be larger than a number of bits in a DL assignment index (DAI) field used to identify $N_{DCI}^{misdetect}$ DCI formats when HARQ-ACK information is provided per TB and not per CBG. For example, for $N_{DCI}^{misdetect}=4$ and $N_{HARQ-ACK}^{TB,max}=8$, a DAI field requires two bits while a CBG counter index field requires $\lceil \log_2(N_{DCI}^{misdetect} \cdot N_{HARQ-ACK}^{TB,max}) \rceil = 5$ bits. Even when a number of successive HARQ-ACK information bits that correspond to CBGs that are not received by the UE and are identifiable by the UE is reduced from $N_{DCI}^{misdetect} \cdot N_{HARQ-ACK}^{TB,max}=32$ to $N_{HARQ-ACK}^{serial\ TBs,max}=16$, a CBG counter index field requires four bits.

A number of additional NDI bits in a DL DCI format can be equal to $N_{HARQ-ACK}^{TB,max}$ in order for the NDI bits to uniquely to identify CBGs for retransmission. A number of $N_{HARQ-ACK}^{TB,max}$ NDI bits are included in a DL DCI format even when there are fewer than $N_{HARQ-ACK}^{TB,max}$ CBGs in a data TB, that is when $N_{CB}^{TB} < N_{HARQ-ACK}^{TB,max}$, in order to maintain a predetermined number of NDI bits that a UE needs to know in order to detect a DL DCI format.

An inclusion of the additional $N_{HARQ-ACK}^{TB,max}$ NDI bits can be omitted from a DL DCI format (and only the NDI for a data TB is included) when there is no ambiguity between the HARQ-ACK information transmitted by a UE and the HARQ-ACK information detected by a gNB. This can occur when a HARQ-ACK codeword transmitted by the UE is protected with a CRC as in such case the gNB can identify a correct or incorrect reception of a HARQ-ACK codeword. When a gNB incorrectly receives a HARQ-ACK codeword, the gNB can indicate transmission of same CBGs in a PDSCH through a DL DCI format by (a) not toggling an NDI bit for a TB in the DL DCI format, (b) indicating a same value for a redundancy version (RV) as in a previous DL DCI format scheduling a previous transmission of the CBGs, and (c) indicating a same HARQ process number as in the previous DL DCI format scheduling a previous transmission of the CBGs.

When the UE detects a DL DCI format with a same NDI value for a TB, a same RV value, and a same HARQ process number as in a previous DL DCI format, the UE can interpret that the DL DCI format schedules same CBGs as the previous DL DCI format. When a gNB correctly receives a HARQ-ACK codeword, the gNB can indicate transmission of new CBGs in a PDSCH through a DL DCI format by (a) not toggling an NDI bit for a TB in the DL DCI format, (b) indicating a next value for a RV as in a previous DL DCI format scheduling a previous transmission of the CBGs, and (c) indicating a same HARQ process number as in the previous DL DCI format scheduling a previous transmission of the CBGs. When there are no CBGs requiring retransmission, a gNB can schedule a new data TB for a HARQ process number through a DL DCI format by (a) toggling an NDI bit for a TB in the DL DCI format, (b) indicating a first value for a RV in the DL DCI format, and (c) indicating the HARQ process number. The previous conditions on the RV value can also be skipped and be left to gNB implementation.

UL DCI formats can also include additional $N_{HARQ-ACK}^{TB,max}$ NDI bits for indicating CBGs that a UE needs to retransmit. A gNB can separately configure a UE with a value of $N_{HARQ-ACK}^{TB,max}$ for transmissions of data TBs from the gNB to the UE and a value of $N_{HARQ-ACK}^{TB,max}$ for transmissions of data TBs from the UE to the gNB.

A configured HARQ-ACK codeword length is beneficial in avoiding ambiguities that can occur when a UE fails to detect at least one DL DCI format transmitted by a gNB and scheduling transmission of a respective at least one TB in respective at least one slot or DL cell with index larger than a largest index of a slot or DL cell where the UE receives a TB scheduled by a respective DL DCI format that the UE detects and where the UE is expected to transmit HARQ-ACK information in a same HARQ-ACK codeword for the TBs. As the gNB cannot be aware that the UE failed to detect the at least one DL DCI format, the gNB cannot be aware that the UE does not include HARQ-ACK information for respective data TBs in a HARQ-ACK codeword and therefore, unless the gNB configures to the UE the HARQ-ACK codeword length, the gNB and the UE consider different lengths for the HARQ-ACK codeword.

A DL DCI format scheduling transmission of one or more TBs to a UE can include a "HARQ-ACK codeword location" field, represented by $\lceil \log_2(N_{HARQ-ACK}^{CW}) \rceil$ bits, that indicates a location for a first HARQ-ACK information bit from a number of HARQ-ACK information bits that the UE generates in response to a reception of TBs scheduled by the DL DCI format. A "HARQ-ACK codeword location" field provides similar functionality as a "CBG counter" field and a DL DCI format can include one of these two fields.

In another example, a number of HARQ-ACK information bits per TB, $N_{HARQ-ACK}^{TB}$ can be signaled in a DL DCI format by a corresponding "HARQ-ACK information bits number" field. When a same DL DCI format schedules transmissions of multiple TBs in multiple slots, a same value of $N_{HARQ-ACK}^{TB}$ can apply per TB when the DL DCI does not include a CBG counter field. Signaling a $N_{HARQ-ACK}^{TB}$ value in a DL DCI format can be beneficial when a HARQ-ACK codeword size $N_{HARQ-ACK}^{CW}$ (or $N_{HARQ-ACK}^{TB,max}$ per slot) is configured in advance as the signaling enables a gNB scheduler to schedule transmissions for different number of TBs and with different TB sizes at different instances. Also, signaling a $N_{HARQ-ACK}^{TB}$ value in a DL DCI format can apply when a HARQ-ACK codeword includes CRC bits as there is no need to include a $N_{HARQ-ACK}^{TB,max}$ field in the DL DCI format and therefore can have a dynamically determined value of $N_{HARQ-ACK}^{TB}$ without having a varying size for the DL DCI format. For example, for $N_{HARQ-ACK}^{CW}=10$, when a gNB schedules a data TB transmission on each of $N_{Cells}^{DL}=10$ cells in a slot, assuming for simplicity a same TB size on each cell, the gNB can set $N_{HARQ-ACK}^{TB}=1$ while when the gNB schedules a data TB transmission on each of $N_{Cells}^{DL}=5$ cells in a slot, the gNB can set $N_{HARQ-ACK}^{TB}=2$. In general, DL DCI formats scheduling different data TBs can indicate a different value for $N_{HARQ-ACK}^{TB}$ as respective TB sizes can be different. A gNB can set a value of $N_{HARQ-ACK}^{TB}$ in each DL DCI format so that a total number of respective HARQ-ACK bits is less than or equal to $N_{HARQ-ACK}^{CW}$.

A value of $N_{HARQ-ACK}^{TB}$, or equivalently a number of CBGs per TB, determines a number of CBs per CBG, $N_{CB}^{CBG}$, as $N_{CB}^{CBG}=\lceil N_{CB}^{TB}/N_{HARQ-ACK}^{TB}\rceil$ for the first (or last) $\mod(N_{CB}^{TB},N_{HARQ-ACK}^{TB})$ CBGs and as $N_{CB}^{CBG}=\lfloor N_{CB}^{TB}/N_{HARQ-ACK}^{TB}\rfloor$ for the last (or first) $N_{HARQ-ACK}^{TB}-\mod(N_{CB}^{TB},N_{HARQ-ACK}^{TB})$ CBGs. A UE can expect that $N_{HARQ-ACK}^{TB}\leq N_{CB}^{TB}$, that is $N_{HARQ-ACK}^{TB}=\min(N_{HARQ-ACK}^{TB,max},N_{CB}^{TB})$. When a UE correctly detects all data CBs in a CBG, the UE generates an ACK value (binary one); otherwise, the UE generates a NACK value. Therefore, a DL DCI format can indicate a number of CBGs per TB and a location for associated HARQ-ACK information bits in a HARQ-ACK codeword.

Figure 25:
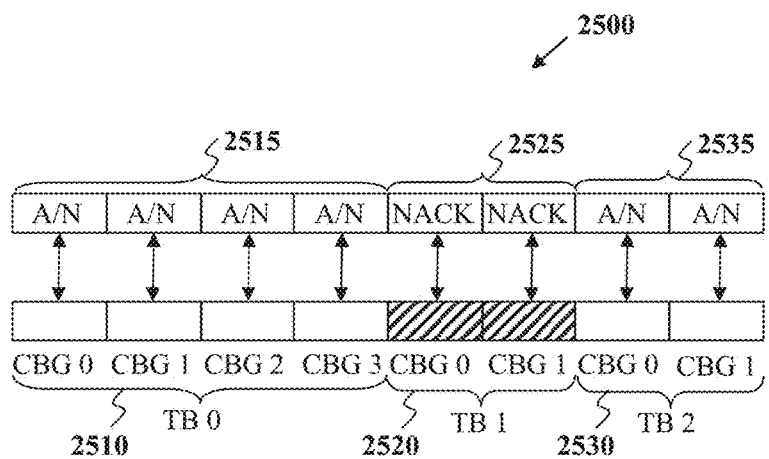
FIG. 25 illustrates an example adaptive partitioning of a data code block to data code block groups and a respective adaptive generation of an HARQ-ACK codeword of predetermined length according to this embodiments of the present disclosure.

FIG. 25 illustrates an example adaptive partitioning of a data code block 2500 to data code block groups and a respective adaptive generation of an HARQ-ACK codeword of predetermined length according to embodiments of the present disclosure. An embodiment of the adaptive partitioning of a data code block 2500 shown in FIG. 25 is for illustration only. Other embodiments may be used without departing from the scope of the present disclosure.

A UE detects a first DL DCI format transmitted from a gNB and scheduling in a first slot or on a first cell a reception of a first TB for a first HARQ process and indicating a generation of $N_{HARQ-ACK}^{TB1}=4$ HARQ-ACK information bits from the UE and a first element in a HARQ-ACK codeword as a starting location for a consecutive placement of the HARQ-ACK information bits ($\min(N_{HARQ-ACK}^{TB,max},N_{CB}^{TB})=4$). The UE partitions the CBs of the first data TB into four CBGs 2510, generates four respective HARQ-ACK information bits with either "ACK" (A) or "NACK" (N) value, and places them as the first four elements in the HARQ-ACK codeword 2515.

The UE fails to detects a second DL DCI format transmitted from the gNB and scheduling in a second slot or on a second cell a reception of a second TB for a second HARQ process and indicating a generation of $N_{HARQ-ACK}^{TB2}=2$ HARQ-ACK information bits from the UE and a fifth element in the HARQ-ACK codeword as a starting location for a consecutive placement of the HARQ-ACK information bits ($\min(N_{HARQ-ACK}^{TB,max},N_{CB}^{TB})=2$). The second DCI format indicates a partition for the CBs of the second data TB into two CBGs 2520 and a generation of two respective HARQ-ACK information bits with placement at the fifth and sixth elements in the HARQ-ACK codeword 2525.

The UE detects a third DL DCI format transmitted from the gNB scheduling in a third slot or a on third cell a reception of a third TB for a third HARQ process and indicating a generation of $N_{HARQ-ACK}^{TB3}=2$ HARQ-ACK information bits from the UE and a seventh element in the HARQ-ACK codeword as a starting location for a consecutive placement of the HARQ-ACK information bits ($\min(N_{HARQ-ACK}^{TB,max},N_{CB}^{TB})=2$). The UE partitions the CBs of the third data TB into two CBGs 2530, generates two respective HARQ-ACK information bits and places them as the seventh and eight elements in the HARQ-ACK codeword 2535. When the UE is configured a HARQ-ACK codeword with length $N_{HARQ-ACK}^{CW}>8$ bits, such as $N_{HARQ-ACK}^{CW}=3\cdot N_{HARQ-ACK}^{TB,max}\cdot N_{CB}^{TB}=12$, the UE sets the value of remaining last $N_{HARQ-ACK}^{CW}-8$ bits to "NACK" (binary zero) and transmits the HARQ-ACK codeword.

Figure 26:
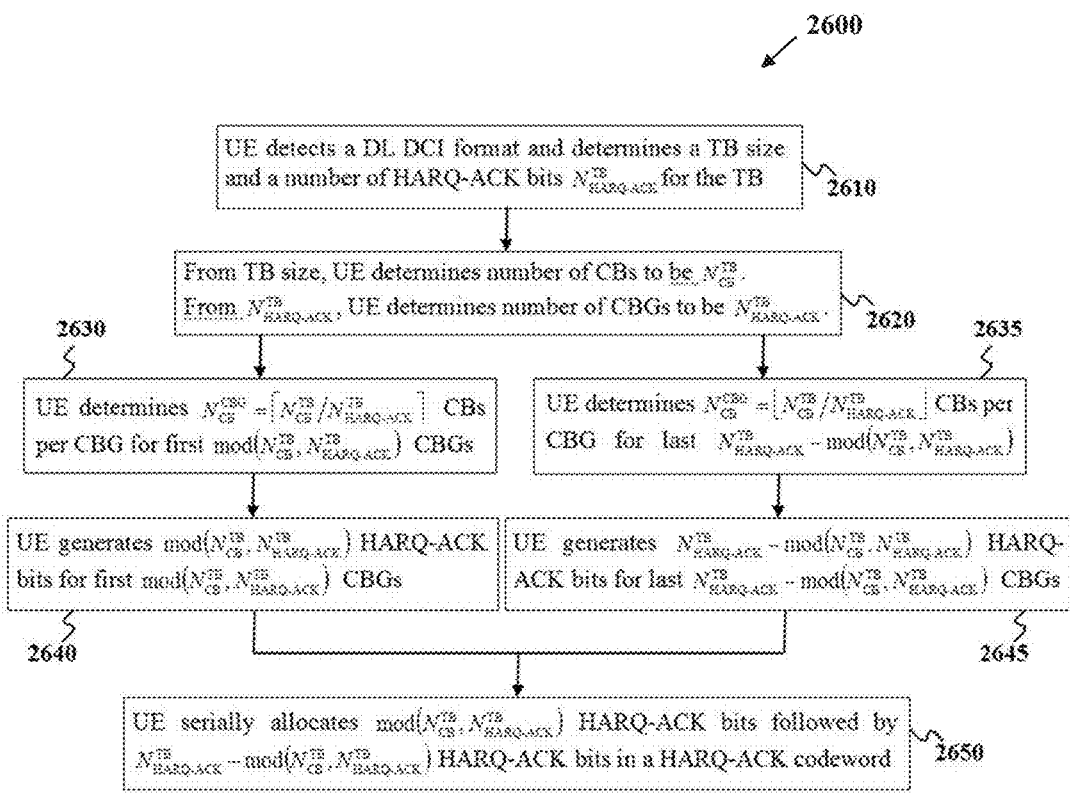
FIG. 26 illustrates an example receiver block diagram for data information and UCI in a PUSCH according to this embodiments of the present disclosure.

FIG. 26 illustrates an example receiver block diagram 2600 for data information and UCI in a PUSCH according to embodiments of the present disclosure. An embodiment of the receiver block diagram 2600 shown in FIG. 26 is for illustration only. Other embodiments may be used without departing from the scope of the present disclosure.

A UE detects a DL DCI format and determines a TB size, for example from a resource allocation field and from a MCS field to determine a number of HARQ-ACK information bits $N_{HARQ-ACK}^{TB}$ for the TB, for example, from a HARQ-ACK information bits number field or from higher layer configuration of $N_{HARQ-ACK}^{TB,max}$ 2610. From the TB size, the UE determines a number of CBs, for example as $N_{CB}^{TB}=\lceil TBS/CBS_{max}\rceil$ where TBS is the TB size in bits and $CBS_{max}$ is a predetermined maximum CB size in bits, and a number of CBGs as $N_{HARQ-ACK}^{TB}$ ($N_{HARQ-ACK}^{TB}=\min(N_{HARQ-ACK}^{TB,max},N_{CB}^{TB})$) 2620.

The UE determines $N_{CB}^{CBG}=\lceil N_{CB}^{TB}/N_{HARQ-ACK}^{TB}\rceil$ CBs per CBG for first $\mod(N_{CB}^{TB},N_{HARQ-ACK}^{TB})$ CBGs 2630 and determines $N_{CB}^{CBG}=\lfloor N_{CB}^{TB}/N_{HARQ-ACK}^{TB}\rfloor$ CBs per CBG for last $N_{HARQ-ACK}^{TB}-\mod(N_{CB}^{TB},N_{HARQ-ACK}^{TB})$ CBGs 2635. The UE generates $\mod(N_{CB}^{TB},N_{HARQ-ACK}^{TB})$ HARQ-ACK information bits for first (or last) $\mod(N_{CB}^{TB},N_{HARQ-ACK}^{TB})$ CBGs 1140 and generates $N_{HARQ-ACK}^{TB}-\mod(N_{CB}^{TB},N_{HARQ-ACK}^{TB})$ HARQ-ACK information bits for last (or first) $N_{HARQ-ACK}^{TB}-\mod(N_{CB}^{TB},N_{HARQ-ACK}^{TB})$ CBGs 2645. Finally, the UE serially allocates $\mod(N_{CB}^{TB},N_{HARQ-ACK}^{TB})$ HARQ-ACK information bits followed by $N_{HARQ-ACK}^{TB}-\mod(N_{CB}^{TB},N_{HARQ-ACK}^{TB})$ HARQ-ACK information bits in a HARQ-ACK codeword.

When a HARQ-ACK codeword length is dynamically determined from signaling in associated DL DCI formats, ambiguities for the HARQ-ACK codeword length can occur when a UE fails to detect at least one DL DCI format transmitted by a gNB and respectively scheduling transmission of at least one TB in at least one slot or DL cell with index larger than a largest index of a slot or DL cell where the UE receives a TB scheduled by a DL DCI format that the UE detects and where the UE is expected to transmit HARQ-ACK information in a same HARQ-ACK codeword for the TBs. As the gNB cannot be aware that the UE failed to detect the at least one DL DCI format, the gNB cannot be aware that the UE does not include HARQ-ACK information for respective data TBs in a HARQ-ACK codeword and therefore the gNB and the UE consider different lengths for the HARQ-ACK codeword.

The gNB can resolve this by decoding a HARQ-ACK codeword according to multiple hypotheses for the HARQ-ACK codeword length, for example according to $N_{DCI}^{mis\text{-}detect}+1$ hypotheses, where each hypothesis corresponds to a UE failing to detect a number of DL DCI formats such as for example, 0, 1, . . . , $N_{DCI}^{misdetect}-1$ DL DCI formats. An implicit configuration of a HARQ-ACK codeword length can be beneficial in avoiding redundant information in a HARQ-ACK codeword, leading to increased reception reliability, or reduced inter-cell interference, or reduced UL resource consumption. Further, when a UE transmits HARQ-ACK for CBGs instead of TBs, an implicit configuration of a HARQ-ACK codeword length can enable a gNB to practically arbitrarily select a number of HARQ-ACK information bits per TB as scheduling for the UE progresses across slots since the gNB is not restricted by a predetermined HARQ-ACK codeword length.

In some embodiments, an adjustment in a code rate for data TBs or data CBs is considered when UCI such as HARQ-ACK is multiplexed with data in a PUSCH transmission.

When UCI is multiplexed in a PUSCH transmission, an effective data code rate is increased as some SCs (or REs) are used for UCI transmission and are not available for data transmission. When an UL DCI format schedules a transmission of a single data TB from a UE, a gNB scheduler can account for the increase in the effective code rate for the data TB by indicating to the UE a lower MCS than necessary for achieving a target BLER for the data TB when there is no UCI multiplexing and an over-dimensioning in a number of UCI coded modulation symbols (due to the low MCS) can be mitigated by adjusting a respective $\beta_{offset}^{PUSCH}$ value through the UL DCI format.

When an UL DCI format schedules transmissions of multiple data TBs from a UE over multiple slots, the UL DCI format needs to either separately indicate a MCS value for data TB transmission in PUSCH without UCI multiplexing and a MCS value for data TB transmission in PUSCH with UCI multiplexing, or indicate a single MCS value, for example with reference to data TB transmission in PUSCH without UCI multiplexing, and the UE can adjust a MCS value (or a TBS value) for data TB transmission in PUSCH with UCI multiplexing based on a number of UCI coded modulation symbols in that PUSCH. The former approach provides robust behavior at the expense of increasing a size of an UL DCI format to provide multiple MCS fields.

The latter approach can avoid the disadvantage of the former approach by establishing a mechanism for adjusting a MCS value, or a data TB size, or a transmission power for data TB transmission in a PUSCH with UCI multiplexing. An alternative is to distribute a transmission of UCI coded modulation symbols across the multiple slots, for an associated UCI latency penalty, and then a MCS value indicated by an UL DCI format can be applicable for transmission of data information in all multiple slots.

An MCS value for data TB transmission in a PUSCH with UCI multiplexing can be adjusted by adjusting an associated code rate. TABLE 2 indicates an exemplary association of an MCS index in an UL DCI format to a modulation order, a TBS index, and a code rate. A mapping of the TBS index to an actual TBS can be provided by a separate Table also considering a number of RBs and slot symbols for a PUSCH transmission.

TABLE 2

Mapping of MCS Index to Modulation Order, TBS Index, and Code Rate

| MCS Index | Modulation Order | TBS Index | Code Rate |
|---|---|---|---|
| 0 | 2 | 0 | 0.1019 |
| 1 | 2 | 1 | 0.1236 |
| 2 | 2 | 2 | 0.1538 |
| 3 | 2 | 3 | 0.2051 |
| 4 | 2 | 4 | 0.2507 |
| 5 | 2 | 5 | 0.3101 |
| 6 | 2 | 6 | 0.3638 |
| 7 | 2 | 7 | 0.4289 |
| 8 | 2 | 8 | 0.4882 |
| 9 | 2 | 9 | 0.5534 |
| 10 | 2 | 10 | 0.6152 |
| 11 | 4 | 10 | 0.3096 |
| 12 | 4 | 11 | 0.3582 |
| 13 | 4 | 12 | 0.4024 |
| 14 | 4 | 13 | 0.4590 |
| 15 | 4 | 14 | 0.5013 |
| 16 | 4 | 15 | 0.5355 |
| 17 | 4 | 16 | 0.5688 |
| 18 | 4 | 17 | 0.6311 |
| 19 | 4 | 18 | 0.6921 |
| 20 | 4 | 19 | 0.7520 |
| 21 | 6 | 19 | 0.5013 |
| 22 | 6 | 20 | 0.5420 |
| 23 | 6 | 21 | 0.5851 |
| 24 | 6 | 22 | 0.6283 |
| 25 | 6 | 23 | 0.6689 |
| 26 | 6 | 24 | 0.7104 |
| 27 | 6 | 25 | 0.7406 |
| 28 | 6 | 26 | 0.8743 |

A UE can determine (from an associated UL DCI format) a total number of SCs available for data transmission in case of no UCI multiplexing, $Q_{Data}^{w/o\ UCI}$, a total number of SCs used for UCI multiplexing, $Q_{UCI}$, based on a UCI payload and associated $\beta_{offset}^{PUSCH}$ values, and then determine a remaining number of SCs available for data transmission after UCI multiplexing $Q_{Data}^{w\ UCI} = Q_{Data}^{w/o\ UCI} - Q_{UCI}$. An increase in an effective data code rate is by a factor of $f = Q_{Data}^{w/o\ UCI}/Q_{Data}^{w\ UCI}$. To offset this increase, the UE can reduce a code rate, $r_{MCS}^{DCI}$, corresponding to a signaled MCS index in an UL DCI format by the factor $f = Q_{Data}^{w/o\ UCI}/Q_{Data}^{w\ UCI}$ and determine an adjusted MCS index through a corresponding code rate $r_{MCS}^{new}$ that is a largest code rate mapping to an MCS index that is smaller than or equal to $r_{MCS}^{adjust} = (Q_{Data}^{w\ UCI}/Q_{Data}^{w/o\ UCI}) \cdot r_{MCS}^{DCI}$. A same principle can apply in general for a data TB transmission when a number of SCs are not used for transmission of data information.

For example, when an UL DCI format signals MCS index 18 corresponding to a code rate of $r_{MCS}^{DCI}=0.6311$ and $Q_{Data}^{w\ UCI}/Q_{Data}^{w/o\ UCI}=0.8$, the UE determines $r_{MCS}^{adjust} = (Q_{Data}^{w\ UCI}/Q_{Data}^{w/o\ UCI}) \cdot r_{MCS}^{DCI} = 0.8 \cdot 0.6311 = 0.5049$ and then determines an adjusted MCS with index 15 that corresponds to code rate of $r_{MCS}^{new}=0.5013$ that is the largest code rate in the mapping Table that is smaller than 0.5049. For example, when an UL DCI format signals MCS index 12 corresponding to a code rate of $r_{MCS}^{DCI}=0.3532$ and $Q_{Data}^{w\ UCI}/Q_{Data}^{w/o\ UCI}=0.6$, the UE determines $r_{MCS}^{adjust} = (Q_{Data}^{w\ UCI}/Q_{Data}^{w/o\ UCI}) \cdot r_{MCS}^{DCI} = 0.6 \cdot 0.3532 = 0.2119$ and then determines an adjusted MCS with index 3 that corresponds to code rate of $r_{MCS}^{new}=0.2043$. In the first example only a code rate is adjusted while in the second example both a modulation order and a code are adjusted. In addition to UCI multiplexing, a code rate for data transmission in a PUSCH can also be adjusted for SRS multiplexing, when any, in a similar manner by discounting SCs used for SRS transmission from SCs that are available for data transmission in a slot.

Figure 27:
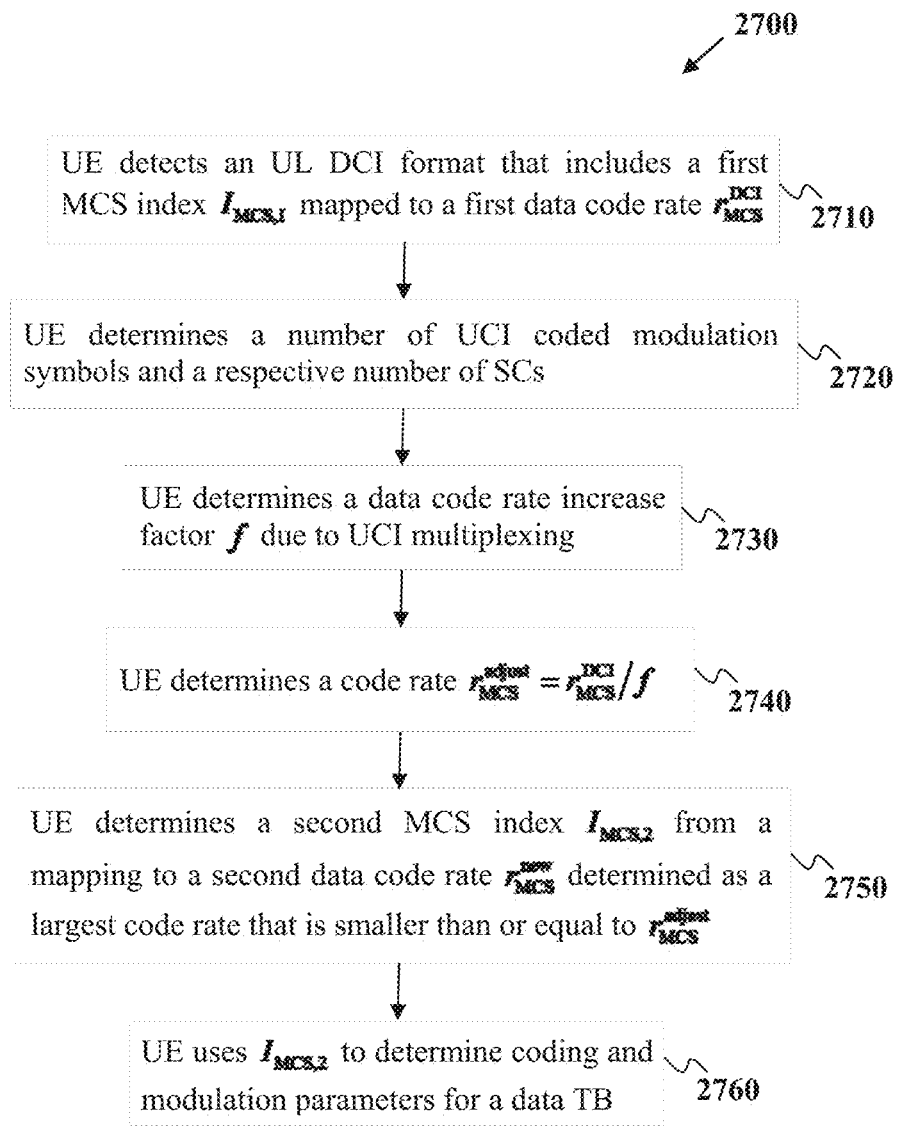
FIG. 27 illustrates an example process for a UE to adjust a MCS index signaled in an UL DCI format and determine an adjusted MCS index in order to account for an increase in a code rate due to UCI multiplexing according to this embodiments of the present disclosure.

FIG. 27 illustrates an example process 2700 for a UE to adjust a MCS index signaled in an UL DCI format and determine an adjusted MCS index in order to account for an increase in a code rate due to UCI multiplexing according to embodiments of the present disclosure. An embodiment of the process 2700 shown in FIG. 27 is for illustration only. Other embodiments may be used without departing from the scope of the present disclosure.

A UE detects an UL DCI format that includes a MCS field with a first value $I_{MCS,1}$ and, based for example on a predetermined mapping Table, the UE determines a first code rate $r_{MCS}^{DCI}$ for data transmission in a PUSCH 2710. The UE also determines a number of UCI coded modulation symbols and a respective number of SCs for multiplexing the number of UCI coded modulation symbols in the PUSCH 2720. The determination by the UE to multiplex the UCI in the PUSCH can be by an associated field in the UL DCI format or by higher layer configuration to the UE to multiplex UCI in the PUSCH when the UE is to transmit UCI in a same slot as a slot of a PUSCH transmission.

Based on the number of UCI coded modulation symbols and on a number of available SCs for data transmission without UCI multiplexing, the UE determines a data code rate increase factor f due to UCI multiplexing reducing the number of available SCs that can be used for data transmission 2730. The UE subsequently determines a resulting code rate $r_{MCS}^{adjust}$ for data transmission, after excluding SCs used for UCI multiplexing, as $r_{MCS}^{adjust}=r_{MCS}^{DCI}/f$ 2740. The UE then determines a second MCS index $I_{MCS,2}$ from a predetermined mapping to a second data code rate $r_{MCS}^{new}$ that is a largest code rate that is smaller than or equal to $r_{MCS}^{adjust}$ 2750. Finally, the UE uses the $I_{MCS,2}$ value to determine coding and modulation parameters for a data TB scheduled by the UL DCI format for transmission in the PUSCH. The UE can adjust a PUSCH transmission power according to $I_{MCS,2}$.

A data TBS for transmission in a PUSCH is determined from an MCS index field included in an UL DCI format scheduling a PUSCH transmission and from a reference number of RBs in a frequency domain and a reference number of slot symbols in a time domain, such as slot SCs/symbols excluding ones used for RS transmission, that are available for data transmission. For example, for a RB that includes 12 SCs and a slot that includes 14 symbols, a total of 24 SCs can be assumed for DMRS transmission and remaining 14×12−24=144 SCs can be assumed available for data transmission. Therefore, a reference number of SCs do not consider UCI multiplexing or SRS transmissions in a slot.

A data TBS for transmission in a PUSCH scheduled by an UL DCI format can be determined from (a) a TBS index and (b) a time/frequency resource allocation for the PUSCH. The TBS index is determined by an UL DCI format field providing an MCS index and by a predetermined mapping between MCS index and TBS index, for example as in TABLE 2. TABLE 3 indicates an exemplary association (mapping) for a TBS index and a time/frequency resource allocation for a PUSCH transmission to a TBS value. A first ten $I_{TBS}$ values and up to ten PUSCH RBs are included but the association and can directly extend to more $I_{TBS}$ values or PUSCH RBs. For example, a time resource allocation is one slot of fourteen symbols with two symbols used for DMRS transmission (leaving twelve slot symbols for data transmission) and a frequency resource allocation is a number of RBs.

TABLE 3

Mapping of TBS Index and Number of PUSCH RBs to TBS value

| | $N_{RB}$ over 1 Slot of 14 Symbols | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |

When UCI or SRS or PUCCH is multiplexed in some SCs or symbols of a PUSCH transmission, a data TBS value can be adjusted to reflect a reduction in a number of SCs available for data transmission for a same $I_{TBS}$ value. Denote by $N_{slot}$ a number of slot symbols, by $N_{sc}^{RB}$ a number of SCs per RB, and by $N_{sc,RS}^{slot,RB}$ a number of SCs per slot and per RB used for DMRS transmission. The value of $N_{sc,RS}^{slot,RB}$ can be different for PUSCH transmissions in different slots or for PUSCH transmissions from different UEs.

The TBS determination in TABLE 3 is based on using $(N_{slot} \cdot N_{sc}^{RB} - N_{sc,RS}^{slot,RB}) \cdot N_{RB}$ SCs for data transmission where a fixed reference value for $N_{sc,RS}^{slot,RB}$ is used. When $N_{sc,UCI}^{slot,RB}$ SCs per RB and $N_{sc,RS}^{slot,RB}$ SCs per RB are used respectively for UCI multiplexing and SRS multiplexing in a PUSCH transmission, or when a value of $N_{sc,RS}^{slot,RB}$ can be variable for example as indicated by an UL DCI format scheduling the PUSCH or as configured to a UE by higher layers, a total number of REs available for data transmission is $(N_{slot} \cdot N_{sc}^{RB} - N_{sc,RS}^{slot,RB} - N_{sc,UCI}^{slot,RB} - N_{sc,RS}^{slot,RB}) \cdot N_{RB}$.

A TBS for data transmission in the PUSCH can then be adjusted to be the TBS corresponding to a $N_{RB}$ value determined as $$N_{RB} = \left\lceil \frac{(N_{slot} \cdot N_{sc}^{RB} - N_{sc,RS}^{slot,RB} - N_{sc,UCI}^{slot,RB} - N_{sc,SRS}^{slot,RB})}{(N_{slot} \cdot N_{sc}^{RB} - N_{sc,RS}^{slot,RB})} \cdot N_{RB} \right\rceil$$

or as $$N_{RB} = \left\lceil \frac{(N_{slot} \cdot N_{sc}^{RB} - N_{sc,RS}^{slot,RB} - N_{sc,UCI}^{slot,RB} - N_{sc,SRS}^{slot,RB})}{(N_{slot} \cdot N_{sc}^{RB} - N_{sc,RS}^{slot,RB})} \cdot N_{RB} \right\rceil$$

when $N_{RB} > 0$ and as $N_{RB} = 1$, otherwise. For example, when $$\frac{(N_{slot} \cdot N_{sc}^{RB} - N_{sc,RS}^{slot,RB} - N_{sc,UCI}^{slot,RB} - N_{sc,SRS}^{slot,RB})}{(N_{slot} \cdot N_{sc}^{RB} - N_{sc,RS}^{slot,RB})} = \frac{2}{3}$$

and an UL DCI format indicates $N_{RB}=9$, a TBS size can be determined according to Table 3 using $N_{RB}=\frac{2}{3} \cdot 9 = 6$. The UE can adjust a PUSCH transmission power according to the determined TBS.

Figure 28:
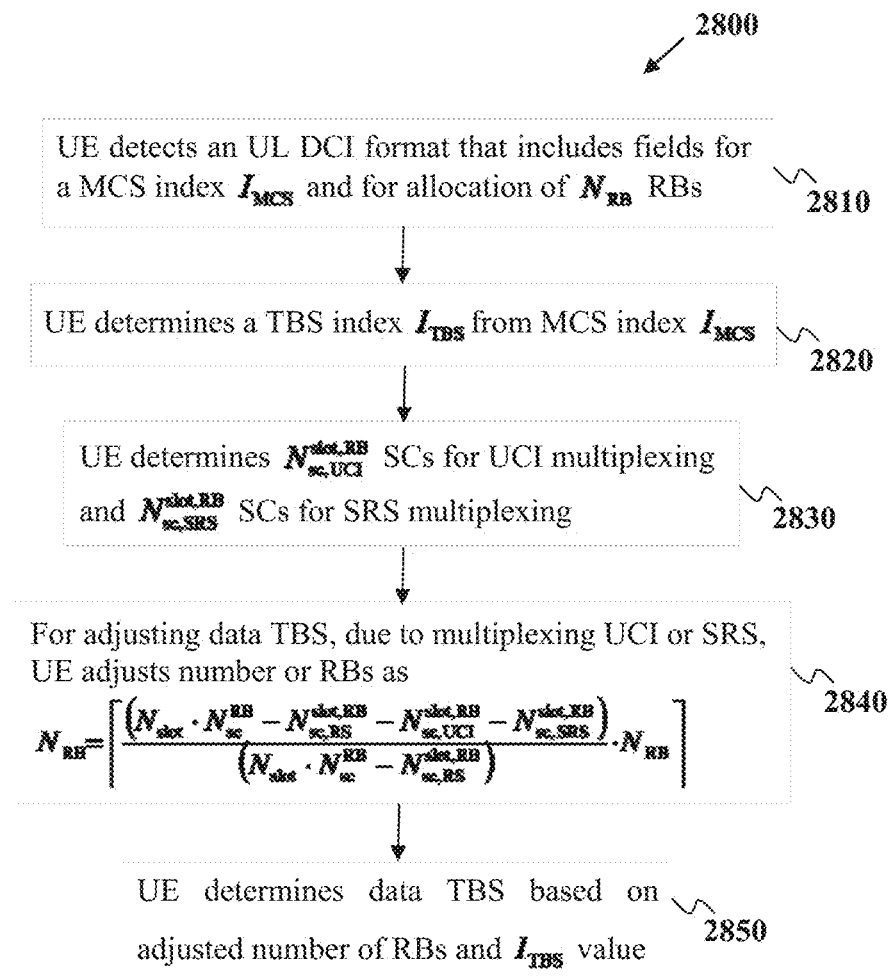
FIG. 28 illustrates an example process for a UE to adjust a number of RBs signaled in an UL DCI format for determining a data TBS in order to account for an increase in a code rate due to UCI or SRS multiplexing in a PUSCH according to this embodiments of the present disclosure.

FIG. 28 illustrates an example process 2800 for a UE to adjust a number of RBs signaled in an UL DCI format for determining a data TBS in order to account for an increase in a code rate due to UCI or SRS multiplexing in a PUSCH according to embodiments of the present disclosure. An embodiment of the process 2800 shown in FIG. 28 is for illustration only. Other embodiments may be used without departing from the scope of the present disclosure.

A UE detects an UL DCI format scheduling PUSCH transmissions conveying one or more data TBs in one or more slots. A slot includes $N_{slot}$ symbols. The UL DCI format includes a frequency resource allocation field providing $N_{RB}$ RBs for the PUSCH transmissions, where a RB includes $N_{sc}^{RB}$ SCs, and also includes a MCS field providing an MCS index, $I_{MCS}$ 2810. Based on a predetermined mapping, such as for example as in Table 2, the UE determines a TBS index $I_{TBS}$ 2820. A number of $N_{sc,RS}^{slot,RB}$ SCs per RB are used for DMRS transmissions. The UE also determines a number of UCI coded modulation symbols, when any, and a respective number of SCs $N_{sc,UCI}^{slot,RB}$ for multiplexing the number of UCI coded modulation symbols and a number of SCs $N_{sc,SRS}^{slot,RB}$ for multiplexing a SRS transmission, when any, in the PUSCH 2830.

For adjusting a TBS determination, due to the multiplexing of UCI or SRS, the UE determines a new number or RBs as $$N_{RB} = \left\lceil \frac{(N_{slot} \cdot N_{sc}^{RB} - N_{sc,RS}^{slot,RB} - N_{sc,UCI}^{slot,RB} - N_{sc,SRS}^{slot,RB})}{(N_{slot} \cdot N_{sc}^{RB} - N_{sc,RS}^{slot,RB})} \cdot N_{RB} \right\rceil 2840.$$

It is also possible that the UE determines a new number of RBs as $$N_{RB} = \left\lceil \frac{(N_{slot} \cdot N_{sc}^{RB} - N_{sc,RS}^{slot,RB} - N_{sc,UCI}^{slot,RB} - N_{sc,SRS}^{slot,RB})}{(N_{slot} \cdot N_{sc}^{RB} - N_{sc,RS}^{slot,RB})} \cdot N_{RB} \right\rceil$$

when $N_{RB} > 0$ and as $N_{RB} = 1$, otherwise. Based on the new number of RBs and on the $I_{TBS}$ value, the UE determines a TBS for transmission in a PUSCH over the number of RBs indicated by the UL DCI format (the original value of $N_{RB}$) 2850.

An UL DCI format can also schedule UCI-only transmission in a slot, such as a first slot, when the UL DCI format includes a "CSI-only" field or a "HARQ-ACK-only" field set to a respective value. Then, a UE can interpret that the UL DCI format schedules UCI-only transmission in the slot and interpret the UL DCI format as scheduling data transmissions, and possibly other UCI transmissions, in remaining slots.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
   a receiver configured to receive:
      a configuration for a first set of values; and
      a downlink control information (DCI) format scheduling a transmission of a physical uplink shared data channel (PUSCH) over a set of resource elements (REs) and including a field providing an index;
   a processor configured to determine:
      a first value from the first set of values based on the index; and
      a first subset of REs, from the set of REs, for multiplexing first uplink control information (UCI) based on the first value; and
   a transmitter configured to transmit the first UCI in the PUSCH.

2. The UE of claim 1, wherein:
   the receiver is further configured to receive a configuration for a second set of values and a configuration for third set of values, the second and third sets of values having a same size as the first set of values;
   the processor is further configured to determine:
      a second value from the second set of values based on the index;
      a third value from the third set of values based on the index;
      a second subset of REs, from the set of REs, for multiplexing second UCI based on the second value; and
      a third subset of REs, from the set of REs, for multiplexing third UCI based on the third value; and
   the transmitter is further configured to transmit the second UCI and the third UCI in the PUSCH.

3. The UE of claim 2, wherein:
   the first UCI is hybrid automatic repeat request acknowledgement (HARQ-ACK) information,
   the second UCI is a first part of channel state information (CSI), and
   the third UCI is a second part of CSI that includes two parts.

4. The UE of claim 3, wherein the first part of CSI includes a first predetermined number of information bits and the second part of CSI includes a number of information bits indicated by the first part of CSI.

5. The UE of claim 4, wherein when the first predetermined number of information bits is smaller than a second predetermined number of information bits, a number of additional bits equal to a difference between the second predetermined number and the first predetermined number and with a predetermined value are included in the first part of CSI.

6. The UE of claim 2, wherein:
a same mapping to the set of REs is used for the first subset of REs, the second subset of REs, and the third subset of REs; and
the mapping is sequential, first in frequency domain and second in time domain, starting with the first subset of REs, continuing with the second subset of REs, and concluding with the third subset of REs.

7. The UE of claim 1, wherein:
the DCI format includes a field indicating retransmission of a hybrid automatic repeat request acknowledgement (HARQ-ACK) information codeword; and
the UCI includes the HARQ-ACK information codeword.

8. A base station comprising:
a transmitter configured to transmit:
a configuration for a first set of values; and
a downlink control information (DCI) format scheduling a reception of a physical uplink shared data channel (PUSCH) over a set of resource elements (REs) and including a field providing an index;
a processor configured to determine:
a first value from the first set of values based on the index; and
a first subset of REs, from the set of REs, for de-multiplexing first uplink control information (UCI) based on the first value; and
a receiver configured to receive the first UCI in the PUSCH.

9. The base station of claim 8, wherein:
the transmitter is further configured to transmit a configuration for a second set of values and a configuration for third set of values, the second and third sets of values having a same size as the first set of values;
the processor is further configured to determine:
a second value from the second set of values based on the index;
a third value from the third set of values based on the index;
a second subset of REs, from the set of REs, for de-multiplexing second UCI based on the second value; and
a third subset of REs, from the set of REs, for de-multiplexing third UCI based on the third value; and
the receiver is further configured to receive the second UCI and the third UCI in the PUSCH.

10. The base station of claim 9, wherein:
the first UCI is hybrid automatic repeat request acknowledgement (HARQ-ACK) information,
the second UCI is a first part of channel state information (CSI), and
the third UCI is a second part of CSI that includes two parts.

11. The base station of claim 10, wherein the first part of CSI includes a first predetermined number of information bits and the second part of CSI includes a number of information bits indicated by the first part of CSI.

12. The base station of claim 11, wherein when the first predetermined number of information bits is smaller than a second predetermined number of information bits, a number of additional bits equal to a difference between the second predetermined number and the first predetermined number and with a predetermined value are included in the first part of CSI.

13. The base station of claim 9, wherein:
a same mapping to the set of REs is used for the first subset of REs, the second subset of REs, and the third subset of REs; and
the mapping is sequential, first in frequency domain and second in time domain, starting with the first subset of REs, and continuing with the second subset of REs, and concluding with the third subset of REs.

14. The base station of claim 8, wherein:
the DCI format includes a field indicating retransmission of a hybrid automatic repeat request acknowledgement (HARQ-ACK) information codeword; and
the UCI includes the HARQ-ACK information codeword.

15. A method comprising:
receiving a configuration for a first set of values;
receiving a downlink control information (DCI) format scheduling a transmission of a physical uplink shared data channel (PUSCH) over a set of resource elements (REs) and including a field providing an index;
determining a first value from the first set of values based on the index;
determining a first subset of REs from the set of REs, for multiplexing first uplink control information (UCI), based on the first value; and
transmitting the first UCI in the PUSCH.

16. The method of claim 15, further comprising:
receiving a configuration for a second set of values and a configuration for third set of values, the second and third sets of values having a same size as the first set of values;
determining a second value from the second set of values based on the index;
determining a third value from the third set of values based on the index;
determining a second subset of REs from the set of REs, for multiplexing second UCI, based on the second value;
determining a third subset of REs from the set of REs, for multiplexing third UCI based, on the third value; and
transmitting the second UCI and the third UCI in the PUSCH.

17. The method of claim 16, wherein:
the first UCI is hybrid automatic repeat request acknowledgement (HARQ-ACK) information,
the second UCI is a first part of channel state information (CSI), and
the third UCI is a second part of CSI that includes two parts.

18. The method of claim 17, wherein the first part of CSI includes a first predetermined number of information bits and the second part of CSI includes a number of information bits indicated by the first part of CSI.

19. The method of claim 18, wherein when the first predetermined number of information bits is smaller than a second predetermined number of information bits, a number of additional bits equal to a difference between the second predetermined number and the first predetermined number and with a predetermined value are included in the first part of CSI.

20. The method of claim 16, wherein:
a same mapping to the set of REs is used for the first subset of REs, the second subset of REs, and the third subset of REs; and
the mapping is sequential, first in frequency domain and second in time domain, starting with the first subset of REs, continuing with the second subset of REs, and concluding with the third subset of REs.

* * * * *